United States Patent
Nelson et al.

(10) Patent No.: US 7,860,615 B2
(45) Date of Patent: Dec. 28, 2010

(54) METHOD AND APPARATUS FOR CONTROL OF AN ELECTRIC POWER DISTRIBUTION SYSTEM IN RESPONSE TO CIRCUIT ABNORMALITIES

(75) Inventors: William Christian Tracy Nelson, Duvall, WA (US); Kenneth James Biallas, Carnation, WA (US); Eddie W. Brasher, Pinole, CA (US); Thomas Chapman Fix, Bellevue, WA (US)

(73) Assignee: S&C Electric Company, Chicago, IL (US)

(*) Notice: Subject to any disclaimer, the term of this patent is extended or adjusted under 35 U.S.C. 154(b) by 0 days.

(21) Appl. No.: 11/516,279

(22) Filed: Sep. 6, 2006

(65) Prior Publication Data

US 2007/0005193 A1 Jan. 4, 2007

Related U.S. Application Data

(63) Continuation of application No. 11/102,379, filed on Apr. 8, 2005, now abandoned, which is a continuation of application No. PCT/US03/33026, filed on Oct. 17, 2003.

(60) Provisional application No. 60/474,349, filed on May 30, 2003, provisional application No. 60/474,130, filed on May 29, 2003, provisional application No. 60/421,755, filed on Oct. 28, 2002, provisional application No. 60/421,180, filed on Oct. 25, 2002.

(51) Int. Cl.
*H02J 13/00* (2006.01)
*H02H 3/00* (2006.01)

(52) U.S. Cl. .................. 700/286; 700/292; 361/64; 361/66; 361/68

(58) Field of Classification Search ................. 700/286, 700/292–294; 361/62, 64, 66, 68
See application file for complete search history.

(56) References Cited

U.S. PATENT DOCUMENTS

| | | | | |
|---|---|---|---|---|
| 5,784,237 | A | * | 7/1998 | Velez ............................ 361/62 |
| 6,018,449 | A | * | 1/2000 | Nelson et al. .................. 361/66 |
| 7,372,808 | B2 | * | 5/2008 | Spiess et al. ................. 370/228 |
| 2002/0064010 | A1 | * | 5/2002 | Nelson et al. .................. 361/64 |

FOREIGN PATENT DOCUMENTS

| | | | |
|---|---|---|---|
| WO | WO 00/48284 | * | 8/2000 |
| WO | WO 00/48288 | * | 8/2000 |

* cited by examiner

*Primary Examiner*—Albert DeCady
*Assistant Examiner*—Steven R Garland

(57) ABSTRACT

A methodology and related system apparatus is provided to most efficiently and flexibly respond to abnormalities to reconfigure and restore service to end customers in commodity distribution systems to enhance circuit reconfiguration in an electrical power distribution system. Methodology is also provided to appropriately allocate system resources of the distribution system to prevent the potential overloading of electrical power sources. In one illustrative arrangement, the methodology is characterized by resources at each node and communications of source allocation data or messages to other nodes to request and establish an appropriate allocation of system resources. In a preferred arrangement and especially useful for larger distribution systems, "teams" of nodes are defined in the distribution system having associated switching controls with the various teams communicating amongst each other to "negotiate" or work out the most efficient and expeditious reconfiguration of the system in response to fault conditions and other circuit abnormalities.

5 Claims, 72 Drawing Sheets

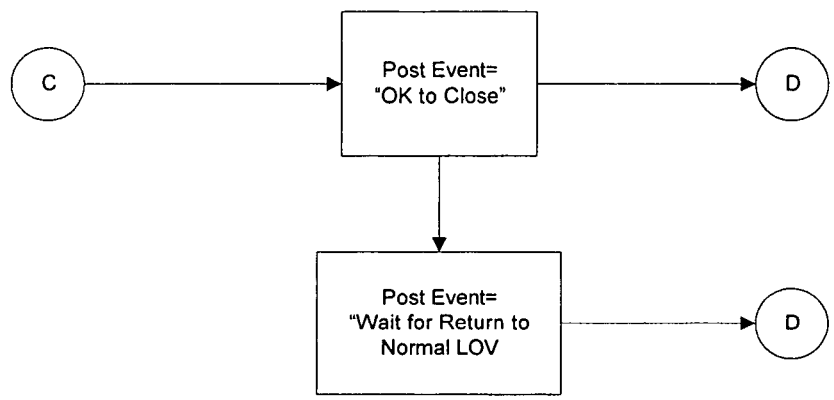
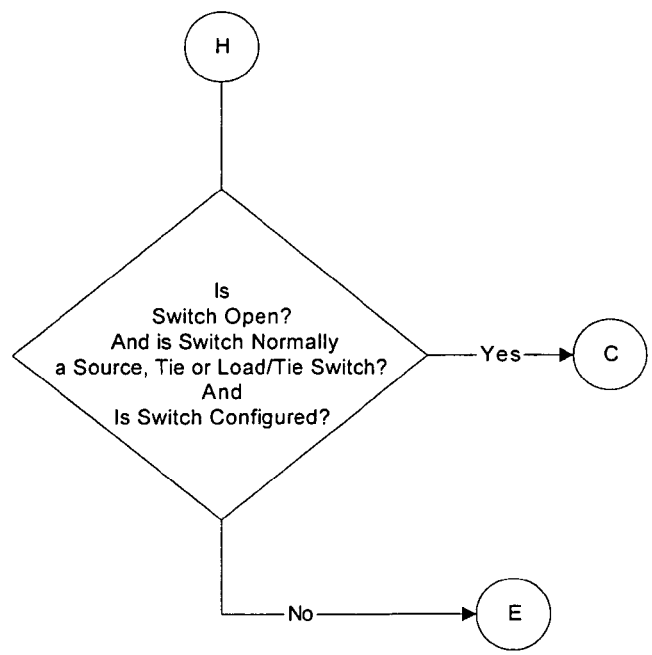
Figure 22b

Figure S2

METHOD AND APPARATUS FOR CONTROL OF AN ELECTRIC POWER DISTRIBUTION SYSTEM IN RESPONSE TO CIRCUIT ABNORMALITIES

This application is a continuation of application Ser. No. 11/102,379 filed Apr. 8, 2005, now abandoned which is a continuation of application Ser. No. PCT/US03/33026 filed Oct. 17, 2003, which claims the benefit of U.S. Provisional Application Nos. 60/421,180 filed Oct. 25, 2002, 60/421/755 filed Oct. 28, 2002, 60/474,130 filed May 29, 2003, and 60/474,349 filed May 30, 2003.

BACKGROUND OF THE INVENTION

1. Field of the Invention

The present invention generally relates to improvements in control of commodity distribution systems, e.g. an electric power distribution system, and more specifically to the use of intelligent autonomous nodes for isolating faulted sections of distribution lines, restoring service to end customers, improving circuit protection and allocation of system resources.

2. Description of Related Art

In general, a distribution system comprises one or more sources connected through a distribution network to one or more delivery points. As the commodity (material or energy) is transported through the network, abnormalities (e.g., faults) may develop that can lead to a disruption of the normal flow of the commodity or a loss of the commodity from the system. In order to help minimize the effects of these abnormalities, a distribution system will typically have nodes at various locations throughout the network which operate to monitor or control the flow of the commodity through the system. It is desirable to not only minimize the loss of the commodity when an abnormality occurs, but also to minimize the number of users who experience an interruption of the delivery of the commodity due to any abnormality. In order to reduce the loss of the commodity, the nodes in a system may have the capability to respond individually to system abnormalities without coordinating with other nodes. In such a system, nodes can prevent the commodity from flowing through the part of the distribution system where the abnormality exists. However, this system may interrupt service to more users than is absolutely necessary.

The power distribution systems for which this invention is most useful are generally of low to medium-voltage distribution feeders (ranging from approximately 4 KV to 69 KV) originating in power distribution substations and leading to the source of supply for end customers of an electrical supply utility or agency. Although the electrical principles governing operation of these feeders are identical to those governing the operation of the higher voltage generation and transmission systems, the methodologies for building, operating and maintaining the lower voltage systems are different. These methodologies are dictated by much larger quantities and geographical dispersion of distribution equipment, and by much lower quantities of electrical power supplied per mile of circuit. This creates requirements for lower cost, modular, standardized equipment, which can be installed, operated and maintained with minimal labor and human supervision.

Failures of the distribution feeder (faults) occur due to downed power lines, excavation of underground cable or other causes and are typically detectable by sensing excess (short circuit/overcurrent) current, and occasionally by detecting loss of voltage. In distribution systems, it is sometimes the case that a loss of voltage complaint by the customer is the means by which the utility senses the outage, responding by dispatching a crew to isolate the fault and reconfigure the distribution system. The typical devices for isolating these faults are circuit breakers located primarily in distribution substations and fuses located on tap lines or at customer transformers. The substation breakers are generally provided with reclosing relays that cause the breaker to close several times after the breaker has detected an overcurrent condition and tripped open. If during any of these "reclosures", the fault becomes undetectable, service is restored and no extended outage occurs. Particularly on overhead distribution lines, temporary arcing due to wind, lightening, etc causes many faults. Thus, the majority of faults are cleared when the breaker opens and service is restored on the automatic reclose. Alternatively, after some number of reclosure attempts, if the overcurrent condition continues to be present, the recloser goes into a "lockout" state which prevents further attempts to clear the fault.

Other than manually operated switches, most distribution feeders have no other means to isolate a fault between the substation and the fuses, thus any failure of the feeder results in lengthy, costly, inconvenient and potentially dangerous outages. The primary exceptions to this involve the use of devices known as "line reclosers", "interrupters" and "automatic line sectionalizing switches" or "sectionalizers". These are automatically operated devices, well known to those skilled in the art, and are referred to categorically in this document as "fault isolating devices". The term "sectionalizer" refers to a specific family of automatic, fault isolating devices described below, while the terms "sectionalizing" and sectionalize" are used to describe the process of isolating a faulted section of line, which can be performed by all of the classes of switches described above.

The "line recloser" is typically a pre-packaged, version of the substation breaker with reclosing relay. Line reclosers typically consist of a fault-break switching device with integrated current sensing, plus a control enclosure containing fault detection hardware, control logic, user interface module, and battery-backed power supply. When placed on the distribution line between the substation and customer loads, a line recloser is typically set up with fault detection settings coordinated to operate before the substation breaker trips and to correspondingly prevent the substation breaker from tripping. This has the effect of reducing the number of customers affected by an end of line fault. On very long feeders, the more sensitive settings can be used to protect the feeder from faults of a magnitude too low to be detected reliably by the substation circuit breaker. Multiple line reclosers can be placed on a distribution line in series, although it becomes increasingly difficult or impossible to coordinate their settings such that only the nearest recloser on the source side of the fault operates.

The "interrupter" is typically a pre-packaged breaker and fault relay without automatic reclosing capability. Interrupters are used primarily in underground power distribution systems.

The "automatic line sectionalizer" or "sectionalizer" is typically a prepackaged combination of a load-break switch used in conjunction with a device known as a "line sectionalizer control". The sectionalizer senses current (and optionally voltage) such that the operation of the circuit and the source-side protective device can be monitored. The sectionalizer is configured to open its switch under certain circumstances when the circuit is de-energized after some number of pre-configured voltage losses have occurred within a brief time interval. The circumstances vary from product to product, but are always based upon sensing of conditions caused by faults followed shortly by voltage losses. Sectionalizers are designed to coordinate with the operation of the circuit's protective devices. Typical sectionalizers are devices such as the Cooper Power Systems Sectionalizer type GV or GW manufactured by Cooper Industries, Inc, or the EnergyLine Systems Model 2801-SC Switch Control manufactured by S&C Electric Company.

Various types of distribution automation systems have been developed to isolate faults and reconfigure the distribution system to provide service to the maximum number of end users. These types of systems include various combinations of centralized controls, distributed controls and intelligent autonomous controls. In such centrally controlled systems, each node may communicate with a central control location which gathers information from each node and coordinates a system-wide response. The central controller typically maintains a detailed map of the system topology, and this map must be updated whenever the system is reconfigured or new nodes are added. This can make such centrally controlled systems less reliable and more difficult and costly to implement and maintain. Additionally, for small systems with few nodes, the need to include a central controller can significantly add to the cost of the system. Furthermore, once an abnormality is rectified, the nodes typically must be transitioned to a normal state or to a specified state. Once the abnormality is corrected, it is generally desired to place the nodes in the original configuration or a specified configuration, at present this is typically done manually.

Intelligent, distributed control methodology is illustrated in U.S. Pat. Nos. 6,018,449, 6,111,735, 6,243,244 and 6,347,027. While these systems may be generally suitable to perform their intended functions, it is advantageous to determine how to optimally reconfigure a complex distribution circuit while preventing overloading of any portion of the circuit; i.e. allocation of system resources. This becomes particularly difficult in circumstances where the circuit branches out (bifurcates) such that multiple load-side switches could attempt to simultaneously pick up additional load and overload the circuit.

SUMMARY OF THE INVENTION

A primary aspect of the present invention is to provide methodology and related system apparatus for using and coordinating the use of information conveyed over communications to most efficiently and flexibly respond to abnormalities to isolate faults and restore service to end customers (circuit reconfiguration); i.e. to enhance the reconfigurability of the distribution system.

In another aspect of the present invention, methodology is provided in a system that responds to faults in a distribution system having a plurality of nodes to optimally reconfigure the distribution system and appropriately allocate system resources of the distribution system via resources at each node and communications of source allocation data or messages to other nodes to request and establish an appropriate allocation of system resources.

In a further aspect of the invention, "teams" of nodes are defined in the distribution system having associated switching controls with the various teams communicating amongst each other to "negotiate" or work out the most efficient and expeditious reconfiguration of the system in response to a fault conditions and other circuit abnormalities.

These and other purposes and advantages of the present invention will become more apparent to those skilled in the art from the following detailed description in conjunction with the appended drawings.

BRIEF DESCRIPTION OF THE DRAWINGS

FIG. 22, comprising FIGS. 22a-22g, is an illustrative flow diagram that may be employed and representative of typical operations performed by the present invention of FIGS. 12-15 at a single team member;

FIGS. 23-55 are representations of system operation and response of the present invention of FIGS. 12-15 and 22 occasioned by the loss of a substation identified as S1;

DETAILED DESCRIPTION

The present invention comprises novel improvements to a method and system for controlling a distribution system, e.g. an electric power distribution system. The following description is presented to enable any person skilled in the art to make and use the invention, and is provided in the context of particular applications and their requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest possible scope consistent with the principles and features disclosed herein. For example, the present invention is applicable to various distributed commodities in addition to electricity such as fluid flow etc. Further, while illustrative electrical systems utilize switch locations at various nodes and locations, it should be realized that in particular embodiments, these illustrative switch locations are any one of a variety of devices including reclosers, breakers, sectionalizers or other protective devices.

Figure 1:
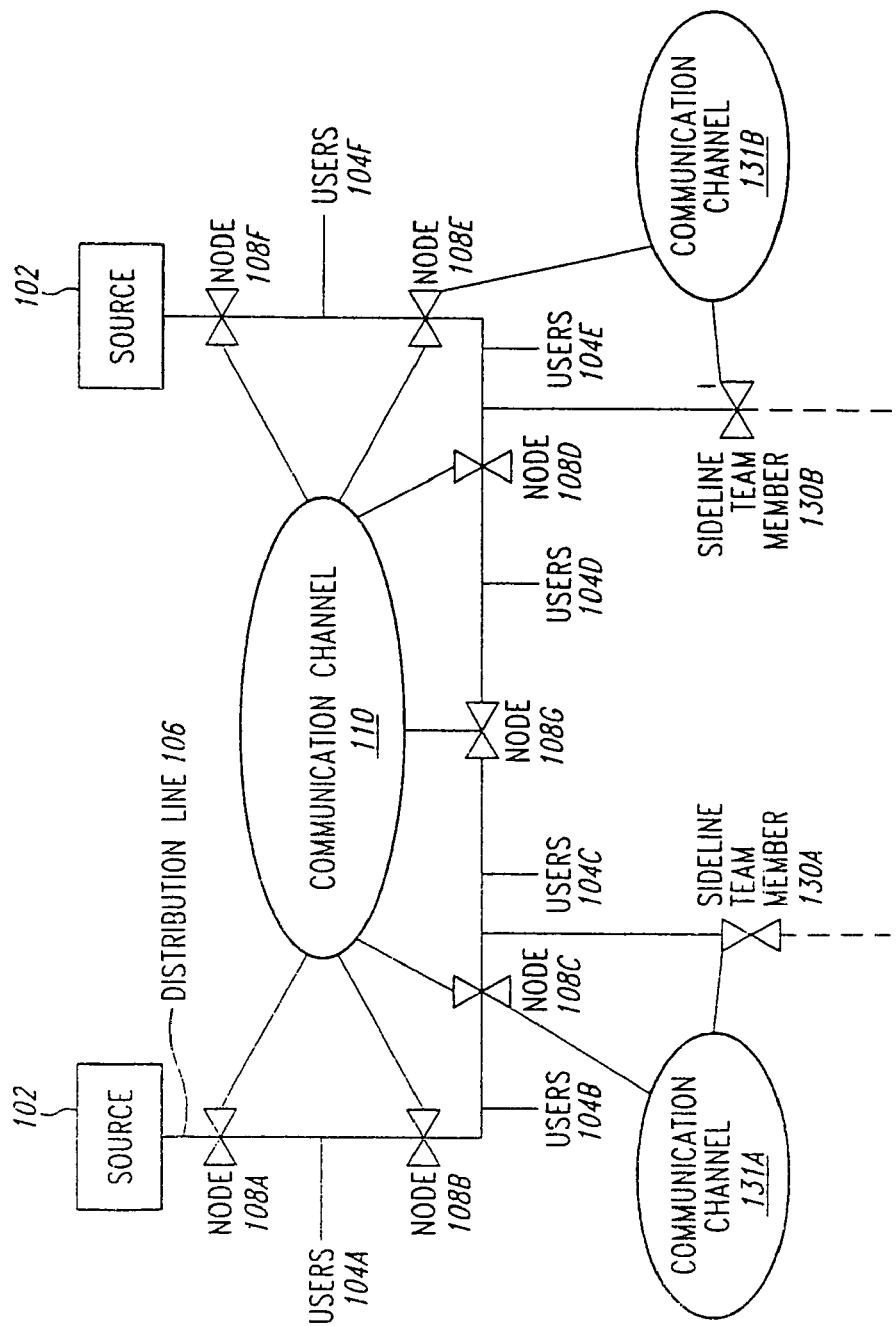
FIG. 1 shows a conventional distribution system in which nodes of an illustrative distribution system have been identified.

FIG. 1 shows a simplified view of a portion of an exemplary electrical power distribution system that can be controlled by the present invention. The distribution system comprises a plurality of sources of electrical power 102 connected to a plurality of users 104 (e.g., factories, homes, etc.) through an electrical distribution line 106 such as conventional electrical power lines. Distribution line 106 has a plurality of nodes 108 placed at predetermined points along the line 106. The depiction of the number of sources, users, lines and nodes in FIG. 1 is arbitrary and there may be a different configuration or number of each of these components in any given distribution system.

While the system disclosed in U.S. Pat. Nos. 6,018,449, 6,111,735, 6,243,244 and 6,347,027 are well suited to making decisions based upon the local configuration of, and sensed conditions on the main distribution line, the present invention enables more efficient and flexible response to abnormalities especially in larger distribution systems to reconfigure and restore service to end customers (circuit reconfiguration) and to allocate system resources such as to prevent the overloading of electrical sources; i.e. to enhance the appropriate reconfigurability of the distribution system. For example, methodology is provided via resources at each node and communications of source allocation data or messages to other nodes to request and establish an appropriate allocation of system resources. In a preferred arrangement and especially useful in larger distribution systems, "teams" of nodes are defined in the distribution system having associated switching controls with the various teams communicating amongst each other to "negotiate" or work out the most efficient and expeditious reconfiguration of the system in response to a fault conditions and other circuit abnormalities. In this manner, more intelligent local decision making and inter-team coordination can be performed.

Figure 2:
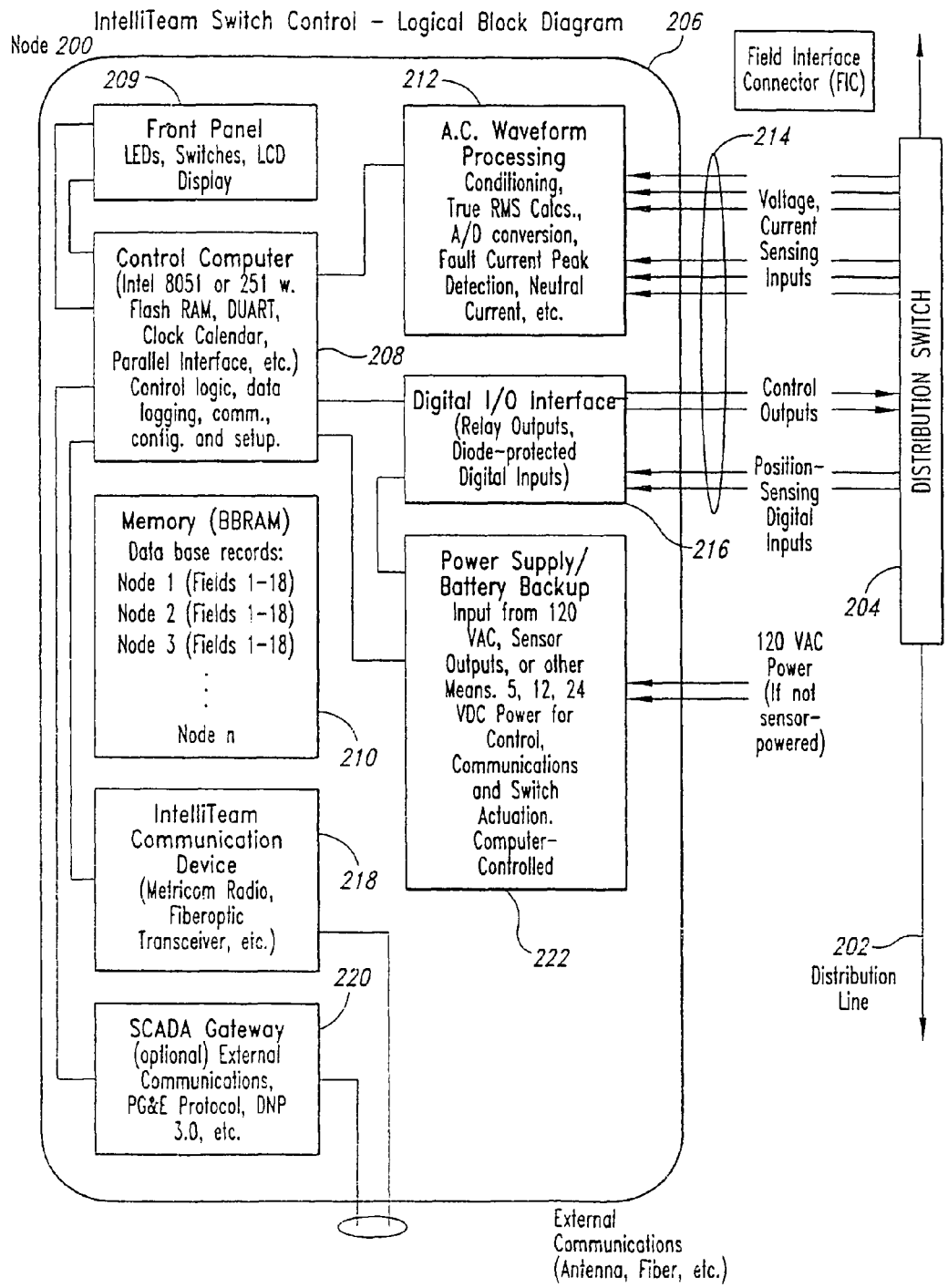
FIG. 2 is a block diagram of a node of an illustrative embodiment of the present invention.

FIG. 2 depicts an illustrative embodiment of a node 200. Distribution line 202 passes through switch 204 which can open and close the distribution line at this point. In other embodiments of the invention, the switch 204 can be replaced by other devices capable of performing power sensing, control or conditioning functions such as voltage regulation (voltage regulators) reactive power control, (switched capacitor banks), fault sensing, etc.

It will be appreciated that consistent with the present invention, the node 200 may also be of a type for controlling two (dual), three, or more switches, with customer loads or alternate sources between the switches. In this case, the distribution line 202 would pass through two or more switches 204 which can open and close independently under the control of the single node 200. In this context, node 200 is a single node from the standpoint of communications, but is multiple nodes from the standpoint of the power system and the control algorithms of the present invention. In this circumstance, the information flow is unchanged, but the communication step is simply bypassed.

Node controller 206 controls distribution switch 204. Node controller 206 includes a control computer 208, a display 209, and an associated memory 210. Memory 210 stores the programming to control the node in response to sensed conditions and communicated information from other nodes and stores information about the system.

The present invention also includes features for team operation when node 200 has protective (overcurrent protection/fault break) capabilities. Those skilled in the art will recognize that distribution switch 204 can have different operating capabilities which may enhance or detract from its ability to participate in circuit reconfiguration. For example, the lowest-cost switches may not be capable of interrupting high currents, or may not be outfitted with both voltage and current sensors. Those skilled in the art will also recognize that node 200 may be programmed not to open the switch under high interrupting currents (sectionalizing switch control), or alternatively may be programmed as a "circuit protective device" (recloser or breaker). When programmed as a protective device, the switch is opened under overcurrent conditions (fault current) to prevent fire or damage to the circuit or to customer equipment, and also for safety concerns.

It is a primary aspect of the present invention to provide methods and apparatus in various embodiments having generalized algorithms and processes (see generally FIGS. 3-10, 14, 22 and 56-59) for using and coordinating the use of information conveyed over communications to appropriately and optimally reconfigure the system in response to circuit abnormalities and to allocate system resources. In this way, overall protection and reconfigurability of the distribution system or "team" is greatly enhanced.

Control computer 208 is connected to AC waveform processor 212. AC waveform processor 212 is connected through field interface connector 214 to distribution line 202. This allows the processor to measure various critical parameters of the electricity on the distribution line such as, voltage and current, digitally convert them, and send them to the control computer for processing, communications, or storage in memory.

Digital I/O interface 216 is connected to control computer 208, switch 204 and distribution line 202. Digital I/O interface 216 allows computer controller 206 to receive switch position sensing information and other inputs, and to output control outputs to the switch.

Communications device 218 is connected to control computer 208 and allows it to communicate with other nodes on the system through communications channel 110 of FIG. 1. The communications devices can be connected to any communications network that is conveniently available and has the desired characteristics; e.g. a Metricom Radio Radio (now manufactured by Schlumberger Industries and marketed under the Utilinet™ product line) has been found suitable in one implementation. A second, optional, communications device 220 can be included in the node 200, if desired, for use by systems other than the present invention. An example of this would be a SCADA gateway.

Power is supplied to the node through power supply/battery backup 222. The battery can be charged from solar power, an AC potential transformer, or from power supplied through the voltage sensors.

Each of the nodes is connected to a communications channel 110. Any type of communications channel can be used. For example, the communications channel could be telephone, radio, the Internet, or fiber optic cable.

In accordance with a first illustrative embodiment of the present invention as described in connection with FIGS. 3-8, FIG. 3 is a flow diagram which illustrates the operation of a synchronization counter and state selection process run by each node. In this process the nodes update their timer and database sequence counter which are used to synchronize the nodes with each other. The nodes then check for error conditions and set error flags if errors are found and determine from their database which state they are in: synchronization, integrity check, or reconfiguration event. An enhancement to the synchronization process is the addition of step 315 to provide protective devices with "advance notice" of their protective characteristics prior to a reconfiguration even such that initial restoration of the circuit may begin prior to adjustment of protective device profiles if the prior settings are adequate.

Figure 4:
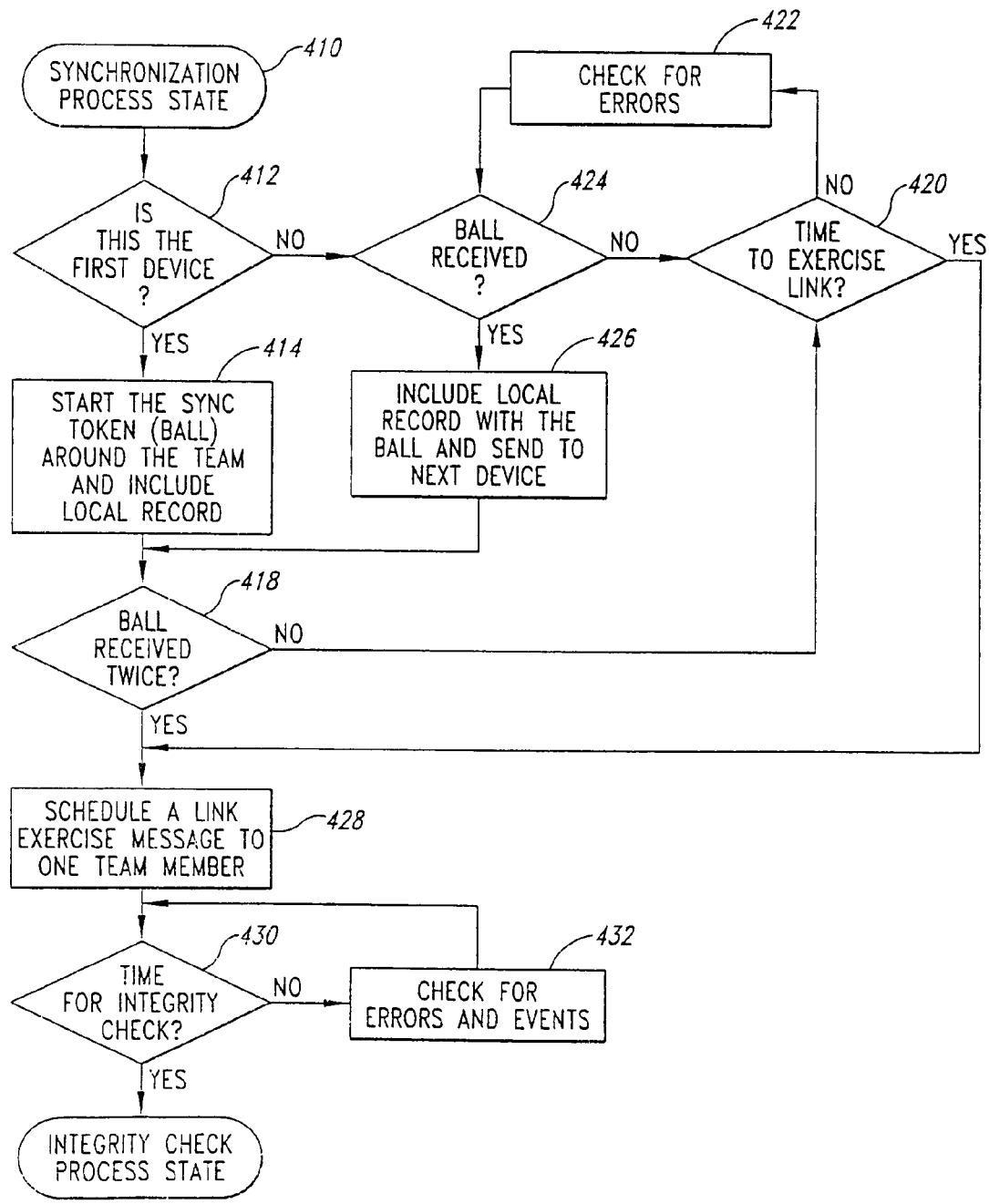

FIG. 4 is a flow diagram which illustrates the operation of the synchronization process state run by each node in accordance with the presently preferred embodiment. In this state the nodes construct a database of critical control information about the distribution system. All nodes contribute to the construction of a database. Each node stores in its memory a copy of the database. The steps in constructing the database in accordance with the presently preferred embodiment are as follows: each node receives the database from the previous node, adds its own record of information and passes the database on to the next node. This process continues until all nodes have received a record from every other node. Once this process is compete, each node then proceeds to the integrity check state shown in FIG. 5

Figure 5:
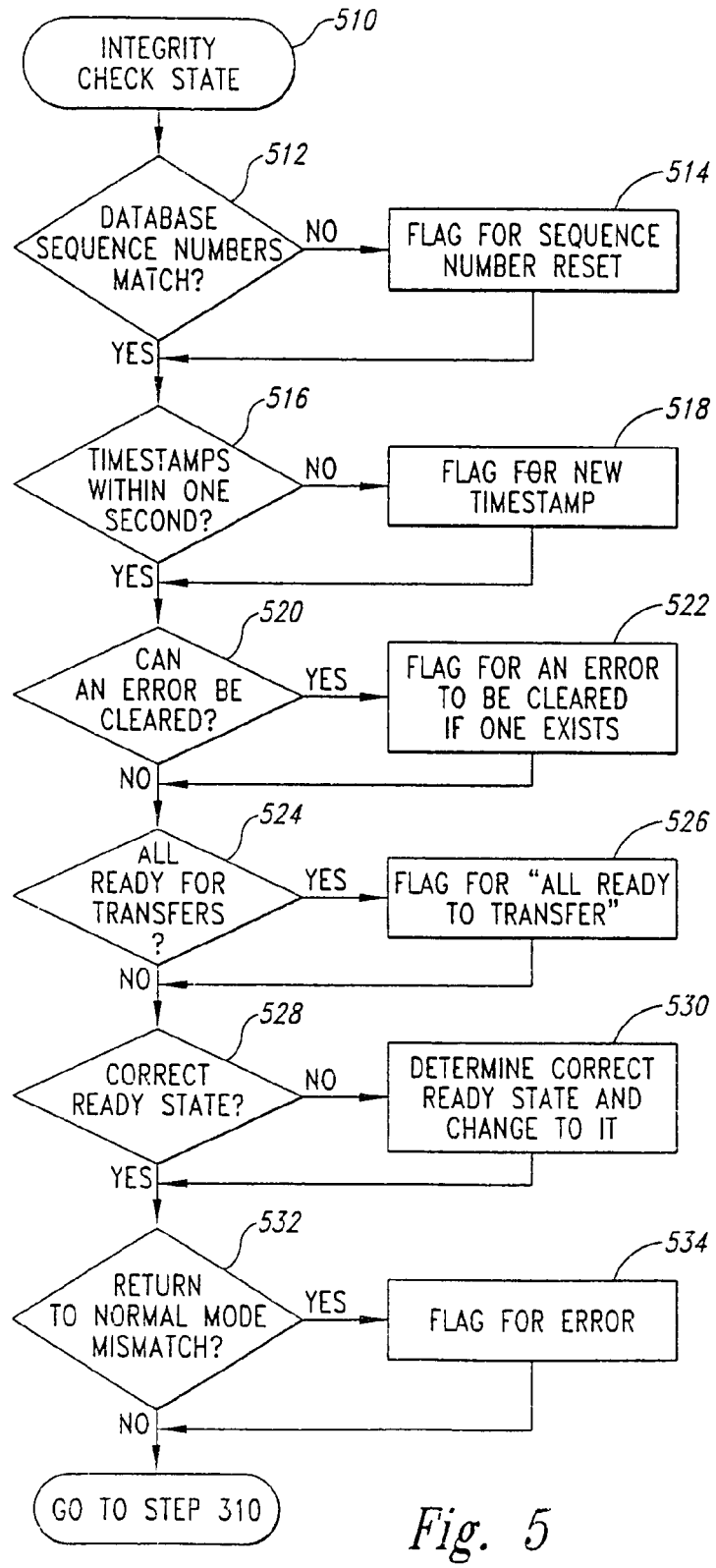

FIG. 5 is a flow diagram which illustrates the operation of the integrity check state process run by each node. When a node runs this process, it checks the records it has received from all the other nodes to ensure that the records reflect a timely version of the state of the system.

Figure 6A:
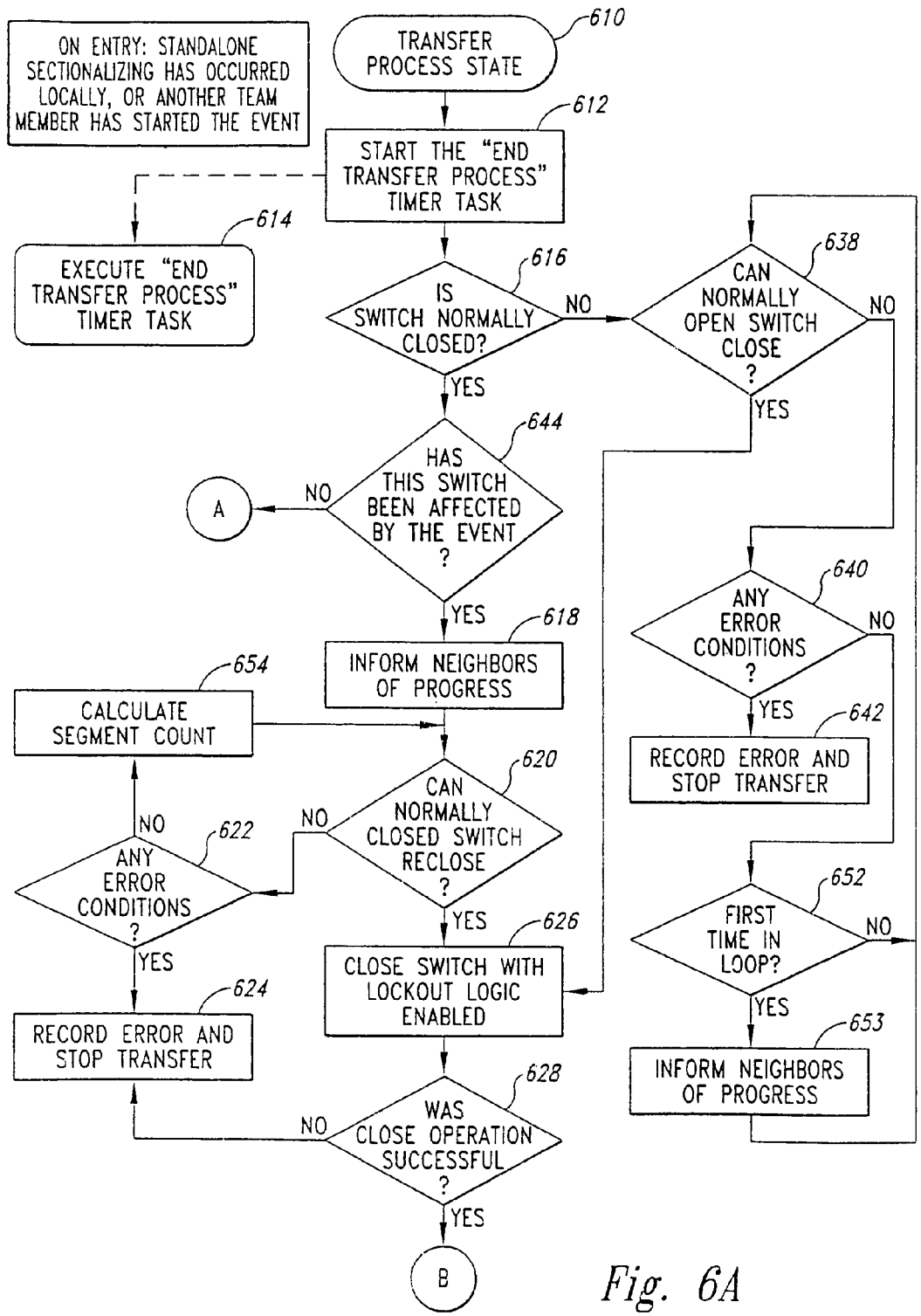
Figure 6B:
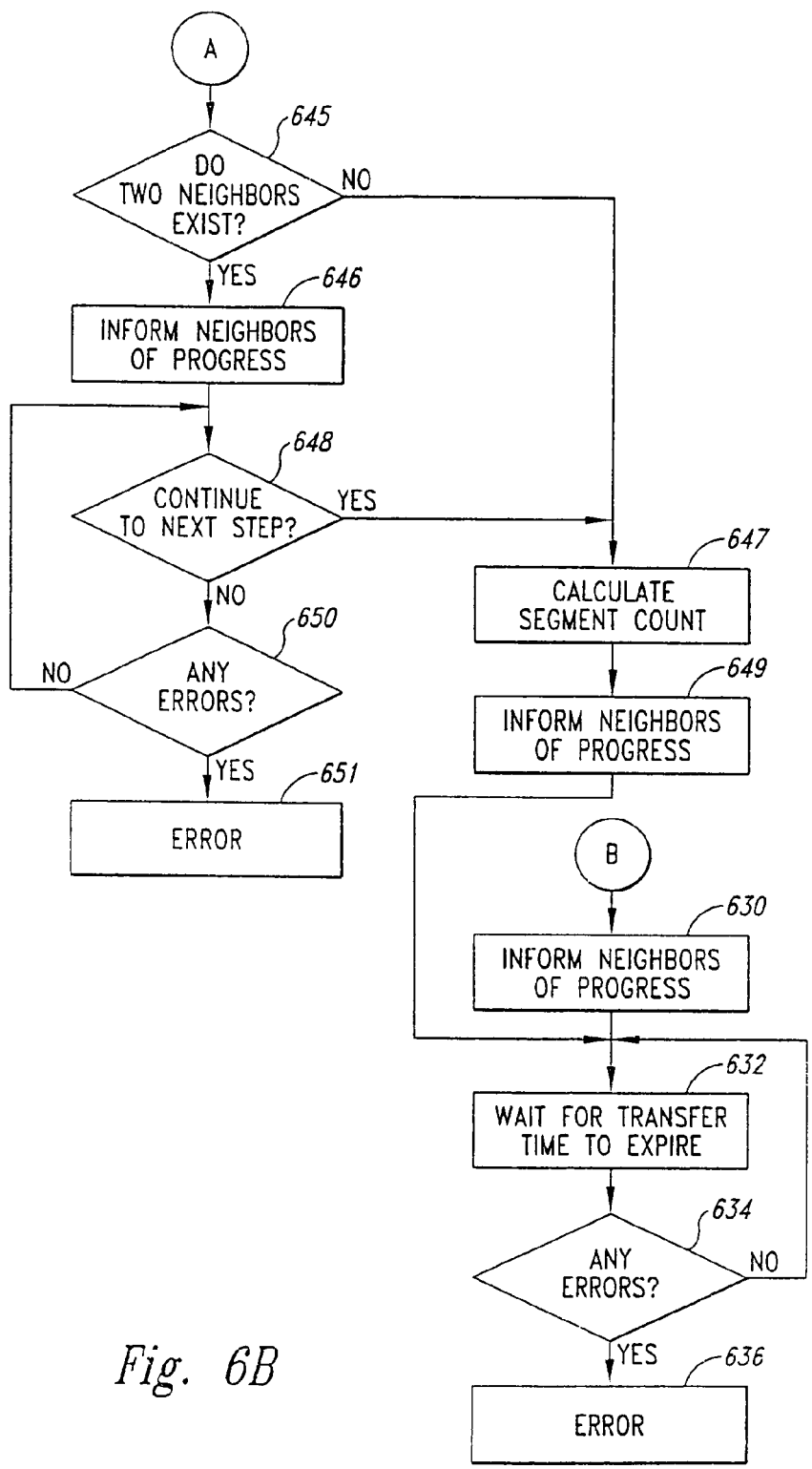

FIG. 6 is a flow diagram which illustrates the operation of the transfer process state. This flow diagram describes the process used by each node upon the occurrence of a fault in the system followed by standalone sectionalization. This process is also started in a node when the node receives a message that another node has entered this process. In order to restore electric power service to as many users as possible after a fault has occurred, each node will use this process to determine if it can close its associated switch(es). These features extend the functionality of the transfer logic to insure that the protection settings match the requirements of the transfer (steps 645-654).

Figure 7A:
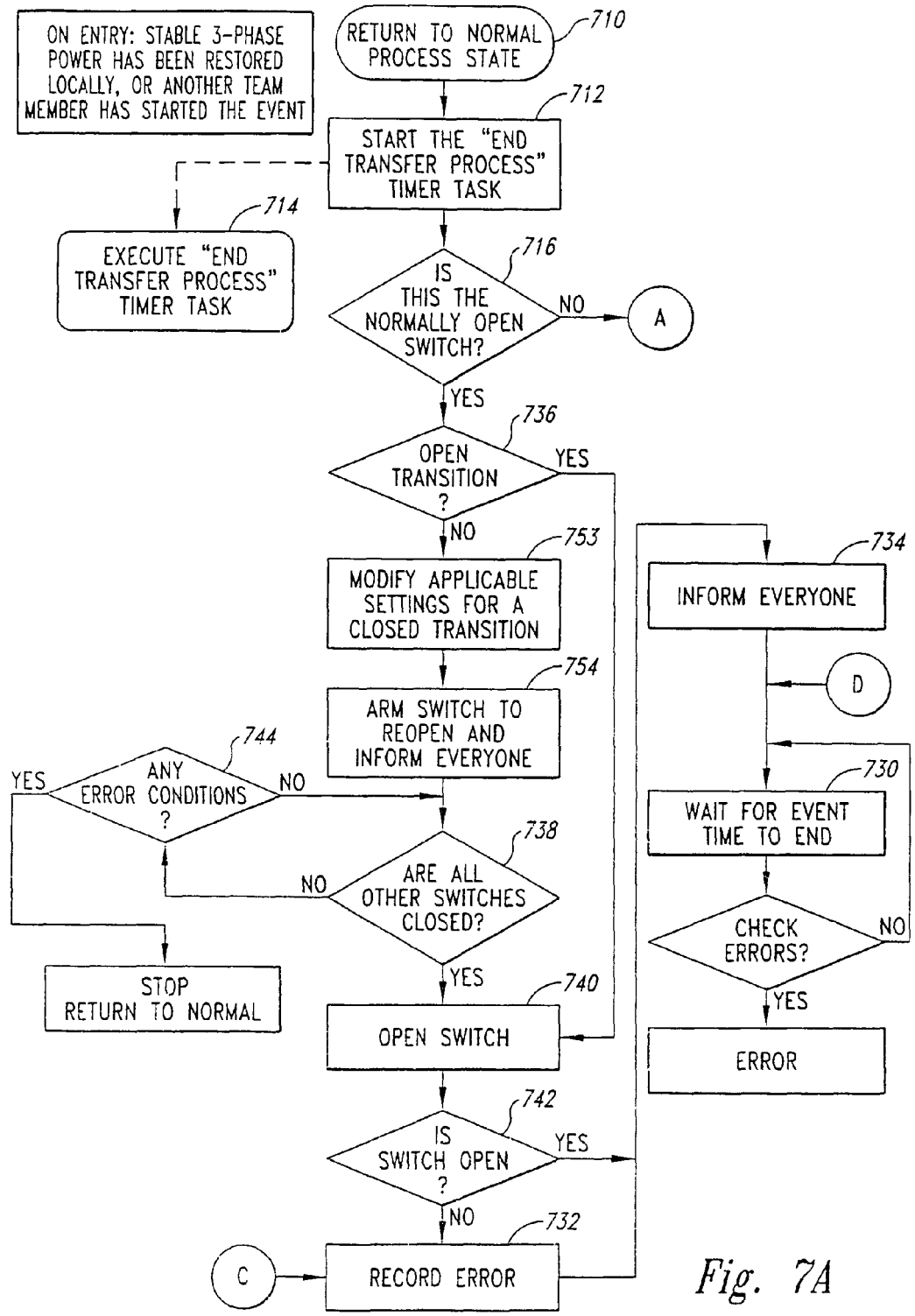
Figure 7B:
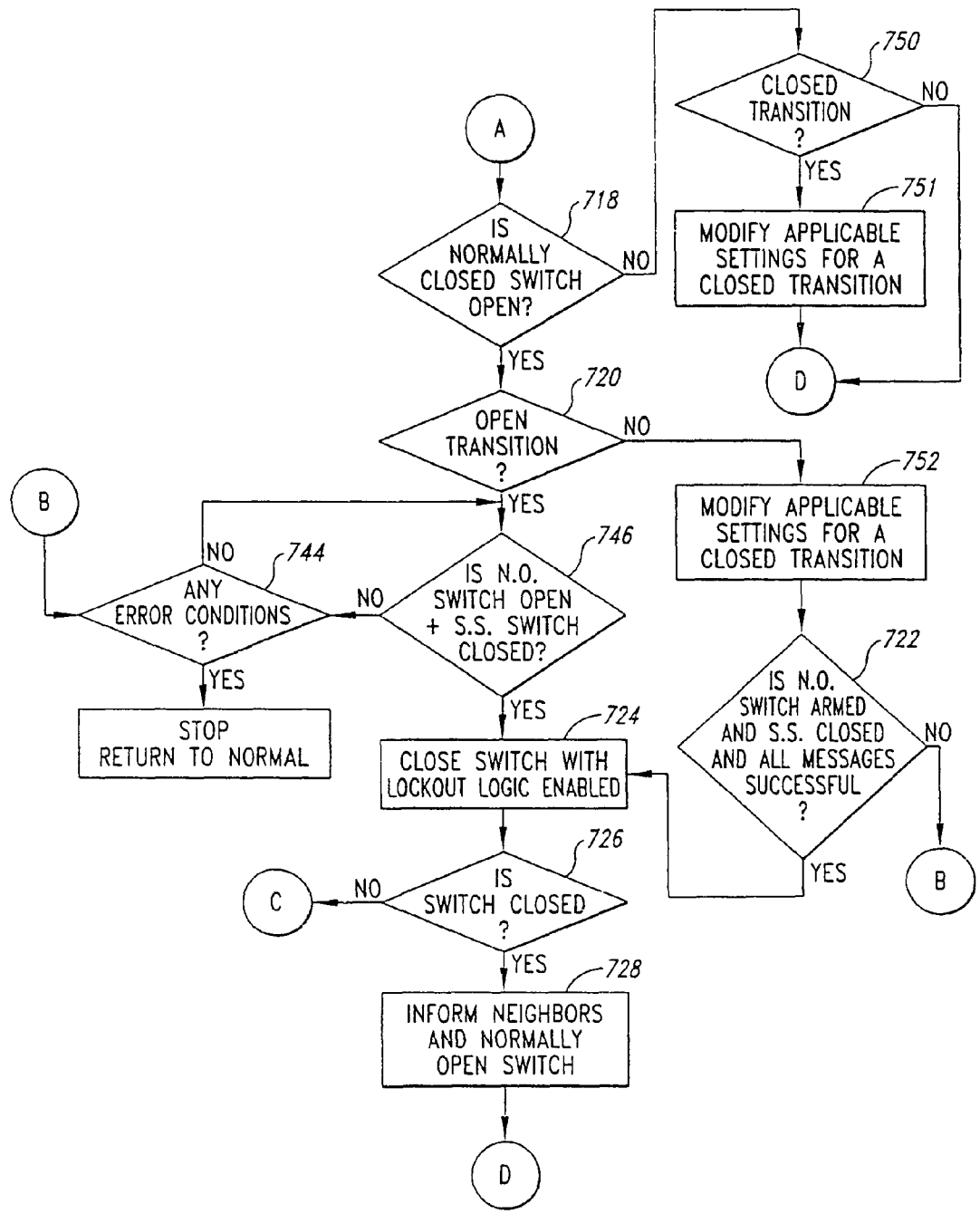

FIG. 7 describes the logic used by each node to return the distribution system to its normal state once the fault has been cleared. This extends the functionality of the return-to-normal logic to insure that the protection settings match the requirements of the return-to-normal transition, particularly when the "closed" transition is used (steps 722 and 750-752).

Figure 8:
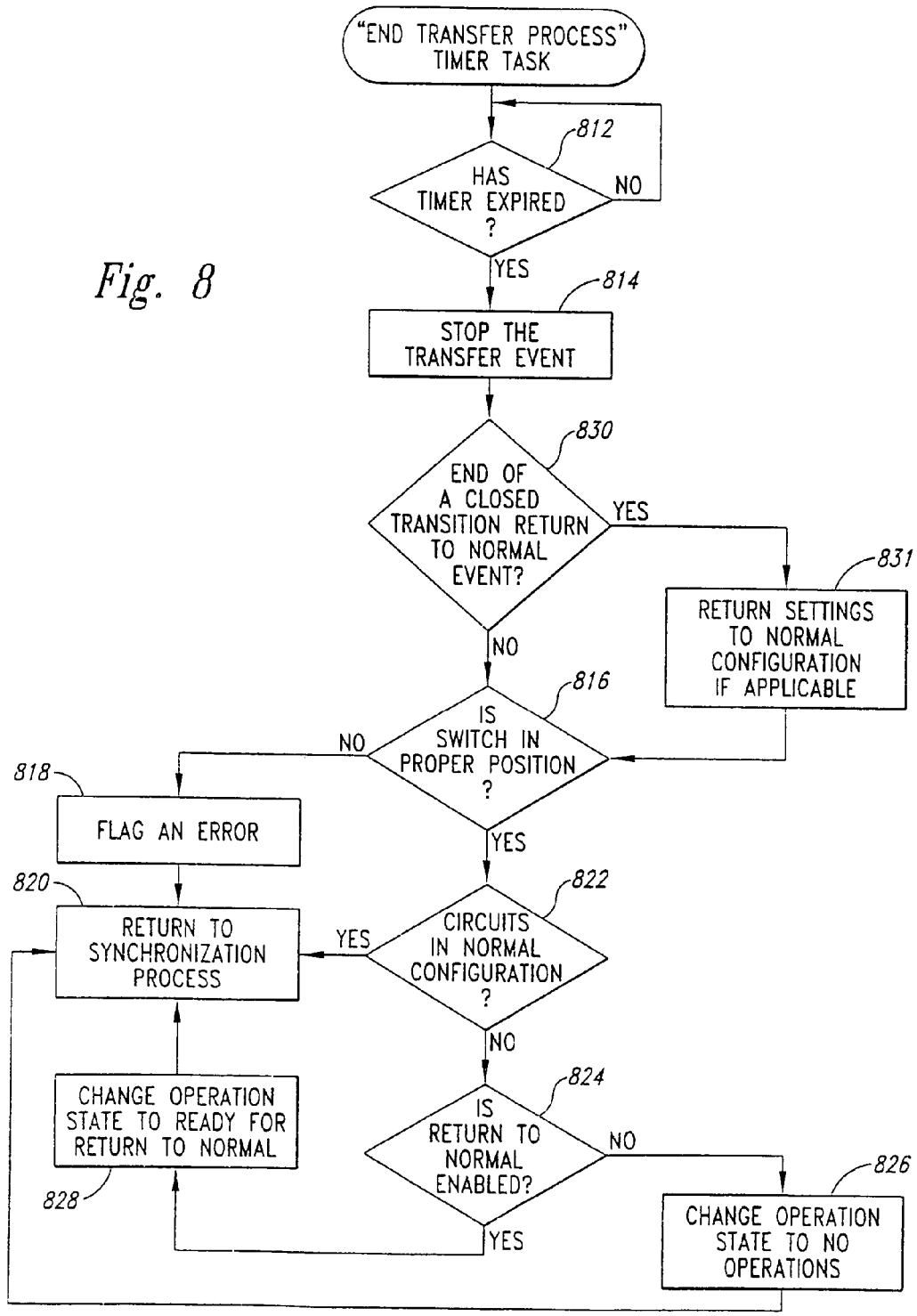

FIG. 8 is a flow diagram which illustrates the operation of a task timer that is used during the transfer process state of FIG. 6 and the return to normal process state of FIG. 7 in order ensure that the system does not take too much time to complete the steps required in either of these processes. This extends the functionality of the return-to-normal logic to reset the protection settings when the return-to-normal transition, and in particular when the "closed" transition return-to-normal is used (steps 830-831).

In accordance with this first illustrative embodiment, memory 210 stores the programming to control the node and stores a database of node records about each node in the system (team database). Each record includes a number of fields which include information that allows the node controller to control the node's switch(es) to alter the distribution line characteristics in response to distribution system demands. In particular implementations, the record includes protective characteristics, facilitating coordination of protection settings during load transfer/restoration.

In the illustrative embodiment, the ordering of the node records in the database corresponds to the physical ordering of the nodes in the distribution system. It would not deviate from the present invention to have the node records in the database ordered in some other fashion and to include information in each node record of the node's actual or relative physical position in the distribution system. If the node controller is of a dual or multiple switch type, the position of each switch is represented in the database and may be ordered independently.

In another embodiment of the present invention, a single, dual or multiple switch node from the standpoint of communications can be used as the only member of the team. A dual switch node may act as the only member of the team when it is the only member physically installed (other members may be installed later), when other members of the team have been temporarily removed from the team, or when errors at other nodes in the team prevent the entire team from acting upon an outage condition.

Also, the present invention is suitable for controlling a loop distribution system as in FIG. 1 in which there are two sources and a normally open switch (a "tie" switch) in the distribution line between the two sources, or a radial distribution system in which there is one source and no tie switch. It would not deviate from the present invention for the database to represent simpler or more complex distribution system topologies and for the invention to be able to work on such topologies.

In particular implementations, the tie switch can close to restore load (backfeed) from either side, depending on which side of the switch is energized and which side is deenergized. As a convention, the circuit is described as having a "right" side and a "left" side, with the tie switch between the right and left sides. The lowest numbered node is designated as being closest to the source on the left side of the circuit, and the highest numbered node as being closest to the source on the right side. The circuit traversed between each of two adjacent nodes is referred to as a "transfer segment", or "segment".

In the illustrative embodiment of the invention, each node's database record includes: (1) record currently in use flag, (2) indication of the type of device represented by each individual record, (3) the node's communication address, (4) its normal switch(es) state(s) (open or closed), (5 present switch(es) state(s), (6) the voltage state (is voltage present on the line or not)(by position if applicable), (7) the fault state (has a fault been detected)(by position if applicable), (8) the present time stamp (9) the database sequence number, (10) the logic process state (what state and step is the switch in), (11) error condition status flags, (12) automatic/manual operation mode status (by position if applicable), (13) average of the sensed loads on each phase (by position if applicable), (14) time stamp at start of event process, (15) indication of method of return to normal (open or closed transition), (16) indication of whether the node was within the affected portion of the circuit, (17) maximum number of segments that can be adequately protected with the current protective settings when feeding the circuit from the left side, and (18) number of segments that can be likewise protected when feeding the circuit from the right. For the purposes of this illustrative emboidment, a segment (see items 17 and 18 above) represents the distribution line between two adjacent team nodes of FIG. 1. In the case of a single communication node containing dual or multiple switches, the number of segments counts the load between any two switch positions along the main distribution line as an additional segment. The "maximum number of segments" is obtained using a methodology outlined below. It will be appreciated that in other implementations of the invention different node data may be stored in the database record for each node without departing from the scope of the invention.

The team local record database (above) allows each node to have enough information about the state of the distribution system to intelligently control its local switch. Additionally, since the database is locally stored in the node, the node need not ask other nodes for information or wait to receive operating instructions from other nodes.

It will be appreciated that consistent with the present invention the record currently in use flag can be used to remove a node from coordinated system activities or allow a node to resume coordinated system activities. The decision to remove or resume activity of a node may be made by, but is not limited to an external decision making entity, or by the node itself.

Protection Profiles and the Team Database

The present invention includes the representation of additional attributes in the protective device profiles. These attributes enhance the ability of the protection engineer to convey the intended operating range or purpose of the settings to the team nodes. In addition, these attributes support additional, team-related functionality not otherwise represented in the protection settings of the individual device as will become clear below. The attributes are: (1) "Profile Type" Indicates the intended use of this profile. For the preferred implementation, the possible values are: (a) "Team Mode/Normal" for use when the nodes are in their normal operating state, with the normally open switch open, and all others closed. In the preferred embodiment, there is only one Team Mode/Normal profile, although it would not deviate from the scope of this invention to have multiple profiles, selected dynamically based upon operating parameters such as the season of the year or load-based criteria. (b) "Team Mode/Transfer" for use in circumstances where additional segments or load must be picked up or carried at this device and the normal profile is inadequate. There may be multiple Team Mode/Transfer profiles, selected for use based upon various selection criteria discussed below. (c) "Standalone" when team operation is not enabled, or is temporarily disabled due to persistent errors or problems (these are referred to below as "Stop Transfer" conditions). (d) "Team Mode/Return to Normal" for use during a "return to normal" team operation (see below). (2) "Number of Segments, Left-Side Distribution" Indicates the maximum number of additional segments, beginning at the local switch position, that can be protected by the profile when power is being fed from the left hand side of the circuit. This number may assume a value greater than the direct reach of the device if the system includes other protective devices with profiles that protect the end of line. In this case, if the other devices are team members, one of the features of the present invention is to maintain consistency among the profiles. (3) "Number of Segments, Right-Side Distribution": As above, but for power fed from the right side. (4) "Maximum Load" Indicates the maximum amount of customer load that the profile is intended to protect. This value is typically predefined by the user and compared against real time load data to insure that the profile is not used in circumstances where false tripping of the protective device could occur. (5) "Protection Selection Key": This is an index or internal pointer to the actual configuration settings associated with the profile. This index allows the user-specified entries to be linked to a collection of device settings either preloaded in the device or maintained as a separate database. Those skilled in the art will be able to appreciate other attributes and attribute values that could be used to characterize the configuration of protective device settings.

It is an object of the present invention to decide whether or not the protective settings of other team members require adjustment before additional load can be picked up by closing open switches. Thus, the "number of segments" fields in the local record must be locally determined and shared between team members. This process takes place periodically during normal operation whenever the team database is exchanged ("sync" process, FIG. 3, Step 315). A more complex process is involved in determining the values for the fields during error processing and/or transfer events and is discussed below.

Calculating the "Number of Segments" Field—Normal Operation

The discussion below identifies the way that the "number of segments" fields are calculated for the presently active profile during normal team operation exclusive of transfer and return-to-normal events or error handling. Thus, protective devices operate without team-invoked changes to their operating profiles unless a transfer or certain error conditions are present. It would not deviate from the scope or intent of this invention if changes to the active profile were made and coordinated throughout the team based upon seasonal variations, load or other sensed or conveyed information.

There are many possible ways for deriving the "number of segments" fields in the local record of the team database based on the type and capabilities of the device. The following Illustrative methodology is based upon the switch and control's inherent capabilities:

Sectionalizing Switch: On initialization, the number of segments that can be protected is set to an indefinitely large number. When the team database or local record is transferred (during synchronization or during a transfer event), the count is reduced to the number of segments protected by the sectionalizer's source-side nearest adjacent node, decremented by one. For example, for the local record corresponding to the second node, if the first node can protect three segments on its load side when power is distributed from the left (left-side segment count), and the second node is a sectionalizing switch, it sets its left-side distribution segment count to two. If the third node's local record indicates that it can protect two segments beyond its position when power is distributed from the right, the sectionalizing switch at node two sets its right-side segment count to one. Special provisions must be made for the first node (left-hand distribution) and last node (right hand distribution), since they have no source side nodes. Three options are supported in the illustrative embodiment for conveying the source-side segment count to the terminal (preferred and alternate source) nodes: (a) the count can be predetermined (configured) based upon worst-case loading protection studies for the circuit as seen by the source side protective device, (b) it can be predetermined to an arbitrarily high value (to defeat the prevention of additional circuit loading based upon inadequate segment count), or (c) it may be acquired over communications from the source side protective device (see sideline team member functionality below). The provisions above also apply when the terminal nodes are protective devices rather than sectionalizers (see below).

Protective Device (Recloser or Breaker): Based on the protective settings of the device and the sophistication of the control, the number of segments may be configured or dynamically calculated based in part on the capabilities of the node as described below.

In the illustrative embodiment, the breaker or recloser's active profile attributes are used in the derivation of the "number of segments" fields in the node's local record. The number of segments is calculated as the lesser of the number of segments protected by the source-side adjacent node (minus one), or the number of segments that can be protected based on the local device's active profile (the profile currently in use). In the later case, the most-recent load data stored in the team's local copy of the team's database is used to determine whether or not the potential, calculated load (based on real-time load data) corresponding to the number of segments handled by the profile exceeds the maximum load configured for the profile. If it does, the "number of segments" for the profile is reduced until the load can be handled. The logic for making this calculation must be sensitive to the load measured locally, as well as to the direction of present current flow (left or right), and the present measured load of each individual segment on the opposite side of the normally open switch. For example, for calculation of the number of segments for left hand distribution, if the count extends the protection one segment beyond the position of the normally-open switch, the measured circuit load at the switch to the right of the normally open switch would be added to the locally measured load for comparison with the profile. It will be appreciated by those skilled in the art, that the reduction of segments based upon load can be defeated if the end user configures an arbitrarily high value of the load current that can be carried through the node with the specified profile.

Selecting Profiles During Load Transfer or Error Processing

This process is invoked whenever the number of segments handled by the presently active profile is recalculated during a load transfer, return-to-normal, or error processing or recovery event. Updates to the team database during these events trigger a profile search/selection process. The process identified below is a simplified approach for selecting the appropriate profile, although it would not deviate from the scope of this invention to use a more elaborate process based on calculations of line impedance, line loading or other factors, or to trigger the selection process based on different events.

In the preferred embodiment, the events that trigger the selection process are: (1) Completion of a synchronization interval (see below) with no errors and a transition of the circuit configuration into its "normal" state, with all switches in their correct normally closed or open positions. This event causes the "Team Mode/Normal" profile to be selected. (2) Transition to a team "stop transfer" condition which causes selection of the "Standalone" profile, assuming the last known configuration of the circuit was such that all switches were in their specified "normal" positions. (Note: Other errors do not alter the selection of the presently active profile.) (3) Transition to the "return to normal" state (see below) causes selection of the "Team Mode/Return to Normal" profile. (4) During a transfer event (see below), detection that a transfer is in progress, and the maximum number of segments that the local switch will have to handle is greater than the number handled by the presently active profile.

In this latter circumstance, in the illustrative embodiment, the node scans through the list of "Team Operation/Transfer" profiles searching for the first entry that can carry the maximum number of segments and pre-fault operating load. This allows the profile reselection process to occur at most, only once during typical transfers. It would not deviate from the scope of this invention to provide the nodes with additional information during the notification process regarding the location of the fault such that the profile selection could be more closely matched to the requirements. In addition, it would not deviate from the scope of this invention for the selection process (and associated communications) to be carried out each time a segment was picked up.

If the selection process above results in the need to change the actual protection settings or operating mode of the protective device, the change is initiated and verified. Only after positive verification is the local record in the team database updated. If the verification fails, an error condition is generated, and the logic reattempts the selection. If a transfer is in progress, this is repeated indefinitely until the transfer process times out.

Free Running Counter

Figure 3:
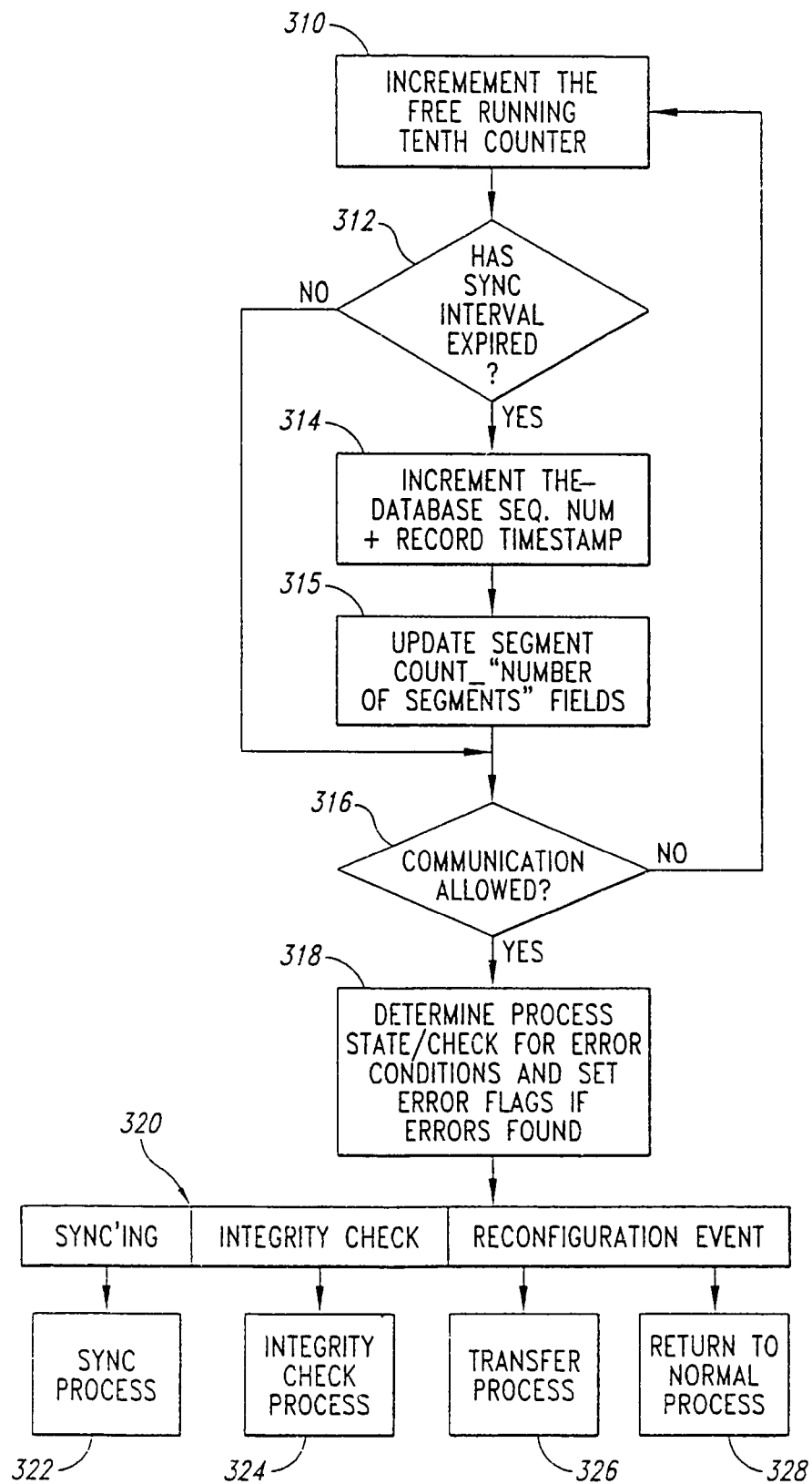
FIGS. 3-8 are flow charts showing various routines employed by the embodiment of FIG. 2.

Steps 310 to 318 of FIG. 3 comprise a synchronization routine that is often called by steps in other processes run by a node, especially when a node is waiting for a specified event to occur. In step 310 the node's free running tenth counter is incremented. A free running counter is used to establish a reference for time stamped logic. As will be seen shortly, these counters are used to ensure synchronization among the nodes. In step 312 the node checks the free running counter to determine if it has reached its maximum. When the maximum count is reached, the synchronization interval expires. If the synchronization interval has expired then step 314 is executed and the sequence number for the database recorded by the node is incremented and a time stamp is recorded in the node's database to help ensure synchronization. As an improvement provided by the present invention, at step 315 the illustrative embodiment also calculates/recalculates the "number of segments" fields for both right hand and left hand distribution using the methodology shown above. The database sequence number is increased by one count on each synchronization interval and each node includes the database sequence number in its local record.

The database sequence number at each node should be the same if all of the nodes are properly functioning and synchronized. Therefore, the inclusion of each node's database sequencing number in its record allows nodes in the present invention to be certain that the data being received from other nodes is timely and reliable. In this way each node can ascertain for itself whether the system as a whole is functioning properly.

After step 314, or if the synchronization interval has not expired then the node checks to determine if communications are allowed. Communications will be prevented in certain situations. An example of when communications are not allowed in a illustrative embodiment is when a team of nodes is initially being configured, all other nodes must be silent except for the node distributing the configuration information. If communication is not allowed for the node, then the node returns to step 310 and is in effect on its own for the moment.

If communication is allowed then step 320 is executed. The node will check for errors and events and set a flag if an error or event is detected. Then each node determines which of three states it is in: synchronizing, integrity check, or reconfiguration event. Each node determines on its own, independently of the other nodes, which of the three states it should be in based on its own internal sensors and the database records that it has received from the other nodes. Typically, all nodes will be in the same state unless the system is transitioning from one state to another. However, any particular node can only be in one state at a time.

Synchronization Process State

If the node is in the synchronization process state then it follows the process illustrated by the flow chart in FIG. 4. At step 412, the node must determine if it is the first active node. In a illustrative embodiment of the invention the node just after either source can be configured to be the first active node in the database and the other node would be the last active node in the database. The nodes in between would be ordered in the database to reflect their physical ordering in the distribution system. It would not deviate from the present invention to have the nodes ordered in the database in an order other than their physical order and to include data in each node's record that allows the node's absolute or relative physical ordering to be determined.

The first node will proceed to step 414 and will start the process of constructing the database of records for the nodes. The first node will put its local record in the database and then send the database to the next node listed in the database. This database is called the "ball" as it is sent around the system from node to node. The record added to the database by each node contains the 18 items of information listed above for the currently passing node.

Although there are many possible ways that this database could be constructed and communicated, the present incarnation of the invention constructs the database by sending it to each successive node to have that node's record added onto the database. The database could be constructed in other ways without deviating from the present invention. For example, each node could simply broadcast its record on the communications channel for reception by all other nodes.

The first node will then continue on to step 418, and since the node has not yet received the ball twice, it will continue on to step 420. In step 420, the node determines if it is time to exercise its link. A node exercises its link by signaling another node to signal it back. This allows a node to determine if its communications system is working. To determine if it is time to exercise its link, a node checks the synchronization interval timer to determine if the synchronization process has taken more than a predetermined used defined period of time. This prevents the node from getting stuck in this state if there is a communications failure.

If it is not time to exercise the link, the node next goes to step 422. In this step the node executes steps 310 to 318 of FIG. 3 and checks for errors and events. If an error or event is detected, a flag is set and, if necessary, the process that is active is ended. This is called a "synchronization and error checking loop." Once this is completed, the node returns to the synchronization process and proceeds to step 424 and checks to determine if it has received the ball. When the synchronization process is run by nodes other than the first node, they go from step 412 directly to step 424.

At step 424, if the node has not received the ball, it will return to step 420 and continue this cycle until it is either time to exercise the link or the ball has been received. If the ball is received then the node goes from step 424 to step 426. At step 426 the node includes its local record with the ball and sends the ball on to the next device. (The last listed node will send the ball to the first listed node.) The node proceeds to step 418 and checks whether it has received the ball twice. If not, then the node proceeds to step 420 again and continues in that loop.

When the ball is received the second time, the node goes from step 424 to 426 to 418 and then to step 428 and schedules a link exercise message to another node in order to test the communications link to ensure that it is working. This is the same step the node jumps to if the time to exercise the link counter in step 420 expires.

After the node has exercised its communications link in step 428, the node goes to step 430 and checks the integrity check counter to determine if it is time to enter the integrity check state as illustrated by the flow chart in FIG. 5. If it is not yet time for the node to enter the integrity check state, then the node will proceed to step 432 where it performs a synchronization and error checking loop. The node then cycles back to step 430 and will continue this loop until it is time for an integrity check.

In a illustrative embodiment of the invention, the synchronization process occurs once per predetermined interval. The length of the predetermined interval is based on the number of nodes in the system. This interval could be larger or smaller, or based on something other than the number of nodes in the system, without deviating from the present invention.

Thus, the synchronization process illustrated by the flow diagram in FIG. 4 periodically updates the information in each node's database. This process allows each node to contain up to date information on the status of all the other nodes.

Integrity Check State

FIG. 5 shows the flow chart which illustrates a process employed for the integrity check state. In this state, each node checks to ensure that the database records contained in its memory appear to be synchronized, that there are no error conditions, and that the nodes are in the correct states. In step 512 the node checks the database sequence numbers to ensure that they all match. In this way, the node can ensure that the records in the database from each node are all from the same synchronization process.

If the sequence numbers do not match, then the node goes to step 514 and a flag is set for the sequence numbers to be reset to re-synchronize them. This error flag will prevent any coordinated team activities from taking place until another synchronizing interval has taken place and the database sequence numbers match.

If the sequence numbers match, or after the flag has been set in step 514, the node then continues on to step 516. In this step, the node checks each of the database records to ensure that they were all time stamped within one second of each other. This requirement ensures that the records in the database accurately reflect a picture of the system at roughly one point in time. If the records are not time stamped within one second of each other, then the node goes to step 518 and sets a flag for a new time stamp. This flag will not allow synchronized team activities if the time stamps are out of synchronization with each other by more than a predetermined amount set by the user. In one embodiment, if the time stamps are 5 seconds out of synchronization then an error flag is set. It will be appreciated that the allowable discrepancy of the time stamps is an implementation dependent parameter.

In the illustrative embodiment of the invention, this strict implementation of the integrity check could be considered a "safe mode." It will be appreciated that consistent with the present invention other modes may exist that would allow the continued operation of team activities even with various levels of integrity check failures.

If the time stamps are not flagged as being out of synchronization, or after the flag has been set in step 518, the node then proceeds to step 520. In this step, the node checks for stop transfer errors, and if any exist, it tries to determine if the error can be cleared. Examples of errors are: (1) an out of synchronization error in which the database sequence numbers for the nodes do not match, and (2) a reconfiguration process occurred and was unable to be fully completed due to external conditions such as a malfunctioning switch.

If the error can be cleared then a flag is set in step 522 for the error to be cleared. The node then continues on to step 524. In this step, the node determines if it is all ready for transfers. After a reconfiguration event, the node must make sure that all of the nodes are synchronized and that other necessary conditions are met. For example, in one embodiment, the node checks its database to determine if all of the nodes have an average 3 phase load that is within a predetermined user defined limit. If the node determines that it is all ready for transfer, then it will go to step 526 and set a flag indicating that it is all ready for transfer.

Next, the node goes to step 528 to determine if it is in the correct ready state. Each node can be either ready for a transfer process or ready for a return to normal process, and all nodes should be in the same ready state. In this step, the node will compare which ready state it thinks it should be in based on its local information and the state that other nodes are in based upon information in the database. If the node is not in the correct ready state then it goes to step 530 and determines the correct ready state and changes to it.

The node then proceeds to step 532 where it checks to determine if there is a return to normal mode mismatch. In this step the node checks to make sure that all of the nodes are set to the same return to normal mode: open transition, closed transition, or function disabled. If all the nodes are not set to the same return to normal mode, then, there is a mismatch and at step 534 an error flag is set. Next, the node returns to step 310 in FIG. 3.

Transfer Process State

The transfer process state flow diagram of FIG. 6 will be described with the aid of a simple example. Referring to FIG. 1, assume a fault develops in distribution line 106 between nodes 108A and 108B. As described above, typical electrical distribution systems will have either a breaker or a recloser (reclosing breaker) at the source of supply for safety and for protection of the circuit. Utilizing the system disclosed in U.S. Pat. No. 6,018,449, sectionalizers may be placed at switch locations 108A-F as shown in the FIG. 1. The "sectionalizer" described here is based on the EnergyLine Model 2801, with additional features added to support operation under a illustrative embodiment of the invention. The standard sectionalizer logic will open (trip) the switch if: 1) its sectionalizing logic is enabled and the device is operational, 2) a pre-configured number of voltage losses (typically 1-3) on all sensed phases have been counted within a brief time period (typically 45 seconds), 3) an overcurrent condition was sensed just prior to the first voltage loss, and 4) the switch is presently closed. An additional option in the conventional software allows the switch to trip if voltage, sensed on all three phases, becomes grossly unbalanced, and remains unbalanced continuously for a configured time period (typically 30 seconds).

It will be appreciated that consistent with the present invention the "sectionalizer" described here may be one of many types, including but not limited to multi-switch operators, fault interrupting switches, and air-break switches, without deviating from the intent of the present invention. For the purpose of this example, the single switch sectionalizer described here will be used.

An optional feature that can be provided in a illustrative embodiment of the invention causes the switch to open on a configured count of voltage losses even if a fault was not sensed just prior to the loss of voltage. This allows the first step of isolating both sides of the faulted section of line to be executed immediately without communication to other devices. Another optional feature causes the configured count on voltage losses (subsequent to sensed faults) to be dynamically calculated locally based upon the position of the switch relative to the presently designated open tie switch. Configuration parameters allow this dynamically calculated range of counts to be further constrained by the user to always fall between a minimum and maximum number. Another option allows the switch to open after a single extended voltage loss. Finally, the counting of faults followed by voltage losses can be configured to count each event as a fault either: 1) if the first voltage loss was preceded by a fault, or 2) if all voltage losses were preceded by faults.

Another unique feature of a illustrative embodiment of the invention is its modified one-shot-to-lockout capability. If a switch is closed as part of any automatic operation (or manually closed by a human operator), some sectionalizers, including the EnergyLine Model 2801-SC, can be configured to automatically re-open the switch if a voltage loss is detected during a brief interval following the operation (typically 5 seconds). A illustrative embodiment of the invention has the additional capability to avoid opening the switch until two counts of voltage loss have been detected. This becomes a benefit when the circuit's breaker reclose pattern includes an initial instantaneous close operation following a trip operation due to a fault.

Those skilled in the art will recognize that consistent with the use of automatic line sectionalizers at each switch location, reclosers could also be substituted such that the switch was opened/operated one or more times under load to clear the fault. Although this would require modifications to the prepackaged, commercially available recloser products to support the team coordination functions, comparable functionality to that provided by the sectionalizer could be achieved. It should also be noted that a variation of the one-shot-to-lockout capability implemented in the sectionalizer implementation is available in many reclosers as the "block reclose" option. The challenge with the approach of substituting reclosers for sectionalizers, as mentioned in the introduction, would be to coordinate the protective settings of these reclosers to prevent excessive switching or tripping/lockout of the wrong device. It is an object of this invention to provide the means to minimize or eliminate this possibility. If the power distribution system of FIG. 1 contains an automatic sectionalizing device, then after the fault occurred between nodes 108A and 108B on distribution line 106, the device, depending on how it is configured, would cause switches in any one or all of nodes 108A, 108B and 108C to open causing all users 104A, 104B, and 104C that are down stream from an open switch to lose service.

In one implementation of the invention, the sectionalizing logic will be set up to open all switches between the fault and the normally open tie switch 108G. This allows the present embodiment of the invention to reclose switches one at a time to gradually increase the load seen by the distribution system to aid the system in resuming service to users. Once any node has finished sectionalization the node enters the transfer process state illustrated in flow diagram of FIG. 6 in which a node will attempt to close its switch. Also a node will enter the transfer process when it receives a communication that another node or team of nodes has entered the transfer process.

Without departing from the present invention, the transfer process state could be initiated by an event other than finishing sectionalization. Depending on the type of distribution system and its needs and characteristics, it may be desirable to have other events trigger the system into action. For example, it may be desirable to have the system triggered into action by detection of a serious under or over voltage condition.

Each node is continually updating the record in its database concerning its own status information. Thus, while the records in the database concerning all other nodes, the ball, is sent to each node only in the synchronization process state, each node maintains an updated record on its own status.

For the purposes of this example, assume that sectionalization has caused the switches in nodes 108A, 108B, and 108C to open resulting in users 104A, 104B, and 104C all losing service. Once sectionalization has ended, each of the three nodes 108A, 108B, and 108C will independently begin the transfer process state, because they each have undergone standalone sectionalization.

When a node enters the transfer process state depicted in the flow chart of FIG. 6, the node executes step 612 and starts the end process timer task. This timer ensures that the nodes do not spend too long trying to complete the task. Should something prevent the node from completing the task in the allotted time, the timer will end the transfer process state. Each node will use the same start time for its timer as the node that first initiated the transfer process. In this way, all nodes in the transfer process will "time out" at the same time. The operation of this timer and the task it calls are shown in FIG. 8 and will be discussed below.

The length of the timer can be set by the system operator to meet the needs of the particular system being controlled. For example, to ensure the safety of repairmen working on the power lines after a fault has occurred, the timer could be set to remove the nodes from the transfer process a known period of time after the fault occurred. In this way, even if the conditions in the transfer process state are met which would have allowed a switch to close and energize a power line, repairmen who have begun to service the system are not put in danger because the transfer process has timed out and the switch will not close.

In a illustrative embodiment of the present invention, each of these three nodes enters the transfer process on its own, triggered by its own logic, stored data and sensor readings. The presently illustrative embodiment of the invention does not require central control, communication, or approval for any of the nodes to enter this state.

Once the timer has been started, the node proceeds to step 616 and determines if the switch it is controlling is closed during the normal operation of the distribution network. Referring to FIG. 1, switches 108A, 108B, 108C, 108D, 108E, and 108F are closed during normal operation of distribution system, and switch 108G, a tie switch, is open during the normal operation of the system. Since switches 108A, 108B, and 108C are each normally closed during the operation of the system, these nodes will continue on to step 618. At step 618 each of the nodes that has entered the transfer process state will transmit its updated record to the next active node listed in the database and the previous active node listed in the database. These two nodes are called the "nearest neighbor" nodes. Node 108A will transmit to node 108B, node 108B will transmit to nodes 108A and 108C, and node 108C will transmit to nodes 108B and 108G. In this way each switch that has entered the transfer process state will inform its nearest neighbors of its progress. It will be appreciated that, although the illustrative embodiment employs communication between "nearest" neighbors, alternative embodiments may employ different node-to-node communication patterns consistent with the invention. Thus, in accordance with the illustrative embodiment of the invention, each node can inform other nodes of its state regardless of the physical layout of the distribution system or the physical deployment of the nodes.

It will be appreciated that if the node is a multi-switch node, for the purpose of the transfer process only, a "nearest neighbor" may be one of the switch positions within the node itself. In the illustrative embodiment of the invention a nearest neighbor database is assembled from the information contained in the internal team database. The transfer logic is then executed using the information in the nearest neighbor database. If the node is a multi-switch node, separate nearest neighbor databases will be constructed for each switch position. In the present example, the nearest neighbor database consists of information from the local node and the two nodes that are physically adjacent to it.

When node 108G receives the communication from node 108C, node 108G will start the transfer process state. In general, when one node receives a communication from another node that the other node has entered the transfer process state, the node receiving the communication will itself enter the transfer process state. This procedure allows the system to self organize, eventually putting each node of the system into the transfer process state without requiring any communication from a central office or any interaction with a human.

Thus, in the illustrative embodiment, there need not be any centralized control or logic center to decide what actions are appropriate for each node to undertake at a given point in the process. Each node of the present invention can operate based only on its sensors and the communicated information. Due to this simple operating structure, the present invention can be easily expanded or reconfigured by simply reordering the nodes in the database without the need to change the programming or logic of the present invention. For example, to add a new node between nodes 108B and 108C of FIG. 1, the system operator would physically insert the new node into the system at the appropriate place and program it into the database between nodes 108B and 108C. This is accomplished by moving the records for all of the nodes in the database after node 108B down one space and inserting the record for the new node in this newly created space in the database.

Node 108G executes step 612, starts the end transfer process timer, sets it to end at the same time as the node(s) that initiated the transfer process, and then goes to step 616. Since node 108G controls a switch that is normally open it will go to step 638. At step 638 node 108G will observe its sensors, the information in its database, and the information sent to it by node 108C to determine whether it can close. In the illustrative embodiment of the invention, the conditions listed in Table 1 are checked by the node in order to determine if it can close. The conditions used at step 4 in Table 1 are shown in Table 2. Other sets of conditions could be used without departing from the invention.

TABLE 1

In order to close the normally open switch associated with a node, one valid closed switch and one valid open switch must be detected as the adjacent switches associated with adjacent nodes on either side of the normally open switch. The following rules define the conditions that must be met for the normally open switch to validate the state of adjacent switches.

A normally open switch on the load side of a faulted line section may close for the purpose of restoring load if:

1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)

TABLE 1-continued 5. the adjacent non-faulted side switch indicates it observed a voltage loss and/or fault but it is now closed, or the adjacent non-faulted side switch is the normally open switch, or the adjacent non-faulted side switch is a breaker and voltage has been restored (this step is bypassed if the local switch is the normally open switch, no team reclosers exist on the alternate feeder, and voltage checking is disabled)
6. the "number of segments" that can be picked up is greater than zero. For this test, the number from the local record of the team database corresponding to the non-faulted direction of supply (left or right) is used.
7. good voltage is detected on its voltage sensors (this test is a user-configurable option).
8. the adjacent switches are in the proper logical operation step

TABLE 2

(This Table elaborates on step 4 in tables 1 and 3)
In order to determine whether load may be restored during a transfer process, the process uses the total load to be transferred compared to the capacity of the alternate circuit. Three basic set points are used by an engineer to limit transferred load. They are:
    Capacity for Transfer (total feeder load N/A)
    Maximum Capacity for Transfer
    Maximum Rated Feeder Capacity
All three set points have settings for the left feeder and the right. All three also have summer and non-summer season settings.
    The transfer process utilizes, if available, the real time total load on the associated feeders. This real time total load value may come over communications from any source such as a substation RTU.
    The two set points that work with this process are the "Maximum Capacity for Transfer" and the "Maximum Rated Feeder Capacity". The "Maximum Capacity for Transfer" is the configured amount of load that may be transferred to an alternate feeder when that feeder is lightly loaded. The "Maximum Rated Feeder Capacity" is used in combination with the actual real time load. The difference between these two is the present real time capacity the alternate feeder can handle. In order for a transfer to occur, the load that was reported to exist before the reconfiguration event began by the next open switch must be less than both the present real time capacity and the "Maximum Capacity for Transfer".
    The real time load must be sent to the switch controls at least once every 20 minutes. After 20 minutes past the last reception of real time load the value goes to undefined. An undefined value causes the fall back process to take affect. This prevents old load data from allowing transfers to occur when the source of this data fails to report it.
    The fall back process uses the "Capacity for Transfer (total feeder load N/A)." This value is intended to be a conservative value. When configuring this value the engineer should take into account average loading, peak loading, and the emergency load capacity on the alternate feeder. The engineer should feel comfortable that a transfer of this amount of load can occur at any time and still be accommodated by the alternate feeder.
    Note that the process for the two feeders is independent. Real time loading data may be provided for one feeder while the other feeder uses the conservative transfer process.

Assume that all of the conditions are met to allow the switch at node 108G to be able to close. Through the use of the conditions listed in Tables 1 and 2, the node can determine on its own whether or not it can close its associated switch. Additionally, only one message had to be sent to enable node 108G to act to restore service—the message from 108C. In the illustrative embodiment of the present invention, and in the case where the team includes protective devices such as breakers or reclosers, the normally-open switch is thus closed with the additional assurance that the protective settings of all of the source-side team members have been preselected to handle the additional load. If the conditions were not met to allow the switch to be able to close, then node 108G would go to step 640 and execute the synchronization and error check routine. If an error is detected during this time then at step 642 it is recorded and the transfer is stopped. Otherwise, at step 652 a check is made to see if this is the first iteration of the loop. If it is the first iteration the local record is transmitted to the nearest neighbors at step 653. If it is not the first iteration then the process continues at step 638 to determine whether the normally open switch can be closed.

If the normally open switch is unable to close at step 640 (as above) and transmits its local record to its nearest neighbors, node 108D will receive the notification and enter the transfer process state at step 610. Node 108D will continue through the transfer process (steps 612, 616, 618 as stated elsewhere) and since it is on the unaffected portion of the circuit it will pass through step 644 and into step 645.

In the illustrative embodiment, steps 645-651 provide notification and enable nodes that were otherwise unaffected by the transfer event to adjust their protection settings to pick up additional load during the transfer process. It would not deviate from the scope of this invention for the adjustments to include other settings or operations related to switched capacitor banks, voltage regulators or other devices.

If node 108D is the last member of the team (only one neighbor exists), it will calculate the segment count allowed in step 647 and transmit its local record, including new segment count, to its neighbor in step 649. Then, node 108D will enter step 632 where it will wait for the transfer process to end, along with checking for errors in step 634.

If node 108D is not the last member of the team (it has two neighbors), it will enter step 646 to transmit its local record to its nearest neighbors. Before it can continue through the transfer process, it must receive a notification back from node 108E with 108E indicating it has progressed into step 632 (node 108E has entered the transfer process and followed the same process as node 108D). Until that indication is received, node 108D will cycle through the error detection step 650. Once the data is received, node 108D can continue to step 647 to calculate a new segment number, step 649 to transmit its local record to its neighbors, and to the step 632 and step 634, looping until the transfer process is complete.

Node 108G will receive the updated local record from node 108D when node 108D has passed through step 649 and into step 632. Node 108G can now use this updated record to determine if it can close in step 638. If node 108G is still not allowed to close it will continue with the error detection loop which includes step 640. If node 108G is allowed to close, it will continue to step 626 to close its switch.

Otherwise, the node will continue to cycle between steps 638, 640 and 650 until the switch can be closed, an error is detected, or the end transfer process timer expires. It should be noted that in the case of teams containing only sectionalizing switches without protective capabilities, the number of segments criteria will always be satisfied without additional communication, and the only typical condition that would delay closing of the switch would be a wait for the other affected nodes to reach the correct transfer process state. This distinction allows the support for profile modification in protective devices to be added to prior reconfiguration products in a compatible manner.

Once node 108G determines that it can close, its associated switch it will proceed to step 626 and attempt to close it. Typically, such switches will have safety devices called lockout logic, as detailed above during the discussion of sectionalization, that will force the switch back open and keep it open if an anomaly such as a voltage loss is detected when the switch is closed. At step 628, the switch determines if the closing operation was successful. If it was not then at step 624 an error flag is set and the transfer process is stopped. If the close operation was successful, then power is restored to users 104C and node 108G continues to step 630. At step 630, node 108G sends its updated record to its nearest neighbors, nodes 108C and 108D. Node 108D now enters the transfer process state, and as nodes 108A, 108B, and 108C did, node 108D will proceed down the flow chart to step 618 and send its updated record to nodes 108G and 108E. This will cause node 108E to enter the transfer process state and signal nodes 108D and 108F causing 108F to enter the transfer process state and signal node 108E with its updated recorded.

As can be seen from the present example, one feature of the invention is that from only the ordering of the nodes in the database and the rules of the flow charts, each node can determine the appropriate actions to take independently of actions taken by other nodes. Nodes do not command other nodes to take any given action, nor is central control or human intervention necessary to coordinate the response of the entire system. The decisions made by each node are based solely on information it has stored in its database and sensors attached to it.

Nodes 108A, 108B, 108C, 108D, 108E, and 108F all will proceed to step 644. Since the switches at nodes 108D, 108E, 108F are normally closed switches and they were not affected by the fault, they will be sent to step 632 at step 644 and will wait for the process to time out while they perform the synchronization and error checking loop with steps 634 and 636.

Since the switches at nodes 108A, 108B, and 108C were affected by the event, they each proceed to step 620. In the illustrative embodiment of the invention, the conditions listed in Table 3 are checked by the node in order to determine if it can reclose. The conditions used at step 4 in Table 3 are shown in Table 2. Other sets of conditions could be used without departing from the invention.

If these switches cannot be reclosed, then, the nodes will go to step 622 and perform synchronization and error checking. In the illustrative embodiment if an error is detected, then in step 624 a flag will be set, and the transfer process state will be stopped. It will be appreciated that in other implementations of the invention error flags may cause different results. In one example, error flags may be prioritized so that lower priority errors may not stop the transfer process.

If no error was detected at step 622, at step 654 the number of segments that can be picked up is recalculated using the rules for calculating the number of segments field during transfer events. If the result of this recalculation may allow the normally closed switch to reclose, at step 620 the logic will exit from the loop and reclose the switch at step 626. Otherwise, each node will cycle through steps 620, 622 and 654 until the switch can be reclosed or the process timer expires.

TABLE 3

In order to reclose the normally closed switch associated with a node, one valid closed switch and one valid open switch must be detected as the adjacent switches associated with adjacent nodes on either side of the normally closed switch. The following rules define the conditions that must be met for the normally closed switch to validate the state of adjacent switches.

A presently open switch on the load side of a faulted line section may close for the purpose of restoring load if:
1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)
5. the adjacent non-faulted side switch indicates it observed a voltage loss and/or fault but it is now closed, or the adjacent non-faulted side switch is the normally open switch, or the adjacent non-faulted side switch is a breaker and voltage has been restored
6. the "number of segments" that can be picked up is greater than zero. For this test, the number from the local record of the team database corresponding to the non-faulted direction of supply (left or right) is used.
7. the adjacent switches are in the proper logical operation step A normally closed switch on the source side of a faulted line section may reclose if:
a. no error conditions exist
b. the adjacent fault side switch is open
c. the adjacent fault side switch detected a fault
d. the adjacent non-faulted side switch indicates it saw a voltage loss and/or fault but it is now closed, or the non-faulted side is the breaker and voltage has been restored
e. the adjacent switches are in the proper logical operation step Through the use of algorithm of Tables 2 and 3, a node can determine on its own whether or not it can close its associated switch. Assume that all of the conditions are met to allow the switch at node 108C to be able to reclose its switch. The switch will then be reclosed at step 626.

At step 628, node 108C will determine if the switch was successfully reclosed. If it was not, then an error flag is set and the transfer process is stopped in step 624. If the switch was successfully reclosed, then the node proceeds to step 630 and informs its nearest neighbors, nodes 108B and 108G, of its progress by sending them an updated version of its record. Node 108C then enters the loop between steps 632 and 634 where it performs the synchronization and error checking routine while it waits for the end transfer process timer to time out. If an error is detected, step 636 is executed and a flag is set and the transfer process is stopped. An example of an error is if the lockout logic causes a switch to reopen.

As the above discussion and rules indicate, one benefit of the present invention is its ability to operate by systematically closing only one switch at a time so that the load to the system is brought on line gradually, one segment at a time. This helps ensure that the power source will not be overloaded due to too rapid an increase in demand.

When node 108B receives the communication from node 108C, assume that node 108B will have enough information to know that according to the conditions listed in Table 3, it should not close since node 108A detected a fault and node 108B did not. This must mean that the fault was between nodes 108A and 108B. Therefore, node 108B will cycle between states 620 and 622 until an error is detected or the end transfer process timer expires. Node 108A, since it has detected a fault, will also not be allowed to close and will cycle though steps 620 and 622 until an error is detected or the process timer times out.

When the end transfer process task timer times out, the nodes will all return to step 310 of FIG. 3 and resume synchronization, error and integrity checks until the original fault is repaired. If the fault is repaired, the system will enter the return to normal process state of FIG. 7 discussed below. If another fault occurs before the previous one has been corrected, it would not deviate from the present invention for the system to re-enter the transfer process state and again reclose switches to return service to as many users as possible.

Return to Normal Process State

After a fault has occurred or if for any other reason the distribution network switches have been put in states other than their normal operating states, for example after the transfer process has completed, the return to normal process state can return the system to its normal operating configuration. This process can also be used to reconfigure the distribution system to any desired system set up of open and closed switches without deviating from the present invention. In the example used above, once the fault in distribution line 106 has been repaired or cleared and switch 108A has been manually reclosed, power will be restored to users 104A. At this point, node 108B will sense that normal voltage has been restored to the distribution line between nodes 108A and 108B and it will be triggered to enter the return to normal process state after node 108B has detected stable 3 phase voltage on the channel for a predetermined time and no errors exist and the normally open switch has not detected a fault. Once any switch in the system has entered the return to normal state, it will signal all other switches to enter the return to normal state.

In the illustrative embodiment of the invention, a node without voltage sensors on the normal source side of the switch may use information from the nearest source side neighbor to determine if voltage has been restored. To do this, the node assumes that voltage has been restored if the nearest source side neighbor node has a closed switch and is detecting good voltage. The local node must see this condition continue for a predetermined time to validate that voltage has returned.

In another embodiment of the invention, the return to normal process can be triggered on demand by an external device or human. It will be appreciated that this on demand activation of return to normal can be used for, but not limited to, starting the return to normal process before the predetermined time has elapsed, or as a one step method of return to normal without manually closing any team switches.

The return to normal process can occur in one of two methods, an open transition or a closed transition. As is well known by those skilled in the art, an open transition is one in which the source of supply of power to users is interrupted in the process of switching between alternate sources of supply. For instance, in this example, if tie switch 108G was opened up before switch 108B was closed then users 104B and 104C would momentarily lose power. This would be an open transition. In a closed transition, switch 108B is closed before switch 108G is opened and users 104B and 104C do not lose power. The system operator can configure the system to operate in either an open or closed transition mode.

During a closed transition, the normally open device must reopen following the allowed transfer time whether it has heard from the normally closed but presently open device or not. This is done to prevent the parallel of lines for an extended period of time. Also, if the node with the normally open switch detects that a parallel condition exists before the return to normal process has begun, the node will begin the return to normal process and open its switch to break the parallel.

It is well known by those skilled in the art that the reliability of the closed transition return-to-normal sequence is greatly facilitated if the automated logic can adjust the settings of the protective devices on the circuit just before and just after executing the closed transition. These adjustments include but are not limited to blocking and unblocking the ground fault detection on nodes that act as protective devices. Thus, it is an object of the present invention to provide the means to coordinate these adjustments with the closed, return-to-normal transition, as outlined below.

At step 712, the node starts the end transfer process task timer. Each node will use the same start time for its end transfer process timer. This timer ensures that the system does not spend too much time attempting to execute the return to normal process. The timer is set to run for a predetermined time set by the system operator. In one embodiment, this timer is set to run for one minute. The node next executes step 716. Since nodes 108A-F are normally closed switches, each of these nodes continues on to step 718.

Switches 108D-F are normally closed switches that were not open so they will each go to step 750, where if the transition method is closed the nodes will continue to step 751 to perform actions that will prepare them for the closed transition. The nodes then continue to step 730 and perform a synchronization and error checking loop while they wait for the process to end. If the transition method is open, the node will simply progress from step 750 to step 730 to perform the synchronization and error-checking loop.

Switches 108A and 108C are normally closed switches that were reclosed by the transfer process so each of these nodes will also go to step 750, where if the transition method is closed the nodes will continue to step 751 to perform actions that will prepare them for the closed transition (as stated previously). The nodes then continues to step 730 and performs a synchronization and error checking loop while they wait for the process to end. If the transition method is open the nodes will simply progress from step 750 to step 730 to perform the synchronization and error checking loop.

Node 108B is a normally closed switch that is open so it moves on to step 720 to determine if it is an open transition.

Assume the system operator set the system to undergo a closed transition. Then, node 108B goes from step 720 to step 752 to perform actions that will prepare it for the closed transition (as stated previously), then to step 722. If the normally open switch, 108G, is armed to reopen (see below), the switch on the supply side of switch 108B, switch 108A, is closed, and communication of the initial start return to normal process message was successful to all members of the team, then node 108B will continue on to step 724 and close its switch. The requirement of the reply to the initial start return to normal process message insures that all nodes within the team have prepared themselves for the closed transition state. The normally open switch is armed to reopen when it has entered the return to normal process, the method used will be a closed transition, and it has informed all other nodes in the team of its state, as will be seen in greater detail below.

If the normally open switch is not armed, or the supply side switch is not closed, or the initial start return to normal process message has not yet been successfully sent to all team members, then node 108B will perform a synchronization and error-checking loop and return to step 722. This loop will continue until either all conditions are met or the end transfer process timer expires.

If the switch is closed at step 724, then at step 726 the node checks to see if the switch is closed. The switch could have been reopened by lockout logic or any other safety feature on the switch that might force it back open. If the switch is closed then at step 728, the node will inform its nearest neighbors and the normally open switch, 108G, by sending them an updated version of its record. The node then goes to step 730 where it performs the synchronization and error checking loop while waiting for the end transfer process timer to time out. If the switch is not closed at step 726, then at step 732 an error flag is set and at step 734 the node informs all other nodes that an error has occurred and the node then goes on to step 730.

If the system is set to undergo an open transition, then at step 720, the node will go to step 746. If the normally open switch is open and the supply side switch, switch 108A, is closed then the node will continue on to step 724. If either of these conditions is not met, then the node will perform a synchronization and error-checking loop between steps 744 and 746.

Switch 108G is a normally open switch so at step 716 it will proceed to step 736. If the system is undergoing a closed transition, the node goes to step 753 to perform actions that will prepare it for the closed transition (as stated previously), then to step 754 where it will arm itself to open and send its local database record to all other team members, and then to step 738 where if all the other switches are closed, node 108G will open the normally open switch at step 740. The node will then check if the switch is actually open at step 742. If the switch is open it will send its updated record to all the nodes at step 734 and then enter the loop at step 730 and wait for the process timer to end. If the switch is not open at step 742 then an error flag will be recorded at step 732 and the node will proceed to step 734.

At step 738, if all the other switches were not closed, then the node will loop to step 744 and perform synchronization and error checking and look back to step 738. This loop continues until all the switches are closed, an error is recorded or the timer expires.

If the system were programmed to undergo an open transition, then at step 736 node 108G would not look to see if other switches were closed and it would skip to step 740, open the switch and continue the flow chart from that step.

End Process Timer Task

Whenever a node enters either the transfer process or the return to normal process, the node starts the end process timer task. The flow diagram for this task is show in FIG. 8. At step 812 the node loops until the timer expires. The timer is initiated when the node enters the task and from the information sent to the node by other nodes, each node will know the time at which the first node to enter the task in question began the task. In this way, all of the nodes can set their end process timers to expire at the same time. It would not deviate from the invention to have the end process task timer be of different durations for the transfer process and the return to normal process.

Once the timer expires, the node will stop the process it is in at step 814. At step 830, if the process that was stopped was a closed transition return to normal event, the node will continue to step 831 to return settings that were changed to prepare for the closed transition (for example unblocking the ground relay if applicable). It should be appreciated by those skilled in the art that the reset of the closed transition settings could also be accomplished after step 734 or at any time when the normally open switch has been verified to be successfully reopened. From both step 830 and 831, the node will continue to step 816 and look to see if the switch is in the proper position for the end of the process that was stopped. For example, is the switch in its normal position at the end of the return to normal state. If the switch is not in the correct position, then step 818 is executed and an error flag is set and the node returns to the synchronization process at step 820.

If the node's switch is in the correct position then at step 816, the node goes to step 822 and checks to see if the circuit is in the normal configuration. If it is, then the node goes to step 820. If it is not in the normal configuration, then the node goes to step 824 and checks if the return to normal is enabled. If the system does not have the return to normal enabled it will go to step 826 and change its operation state to no operation and wait for further instructions before it can re-enter the ready to transfer state. From step 826, the system will go to 820.

If the return to normal is enabled then at step 828, the node changes its operation state to ready for return to normal and then proceeds on to step 820.

Sideline Team Nodes

As will become apparent to those skilled in the art, the use of the sideline team node in accordance with the present invention expands the capability of the method and apparatus to operation of more complex circuit topologies and more diverse sources of data.

The sideline team node may be distinguished from active team nodes mentioned previously in two ways; 1) the sideline team node is not active within the synchronization and integrity check process, 2) the sideline team node does not itself directly execute a process associated with the reconfiguration process described previously. Instead, the sideline team node is used by an active team node to acquire additional data about the environment around the team. This data can then be used to alter the process within the team. This will become clear with the use of two examples below.

It will be recognized by those skilled in the art that the method for acquiring the additional data will usually involve data communications. This may be achieved using various communications technologies for point-to-point communications or may be achieved by sharing the same communication infrastructure used by the team communication channel, 110. In addition, in the case of dual or multiple switch nodes, the communication step may be bypassed entirely.

In the illustrative embodiment of the present invention, each active team node may be responsible for one sideline team node. The addressing of sideline team nodes is contained within a table similar to the database of node records. The address data for the sideline team node is contained in the record with the same device number as the record in the database of node records for the active team node that is responsible for the sideline node. Other means for storing sideline team node addressing is also possible without deviating from the intent of the present invention. For example, it would also be consistent with the present invention for the table storing sideline node information to include identifiers that would specifically associate a sideline team node with an active team node, thereby allowing the number of sideline team members per active team node to be greater than one.

Figure 9:
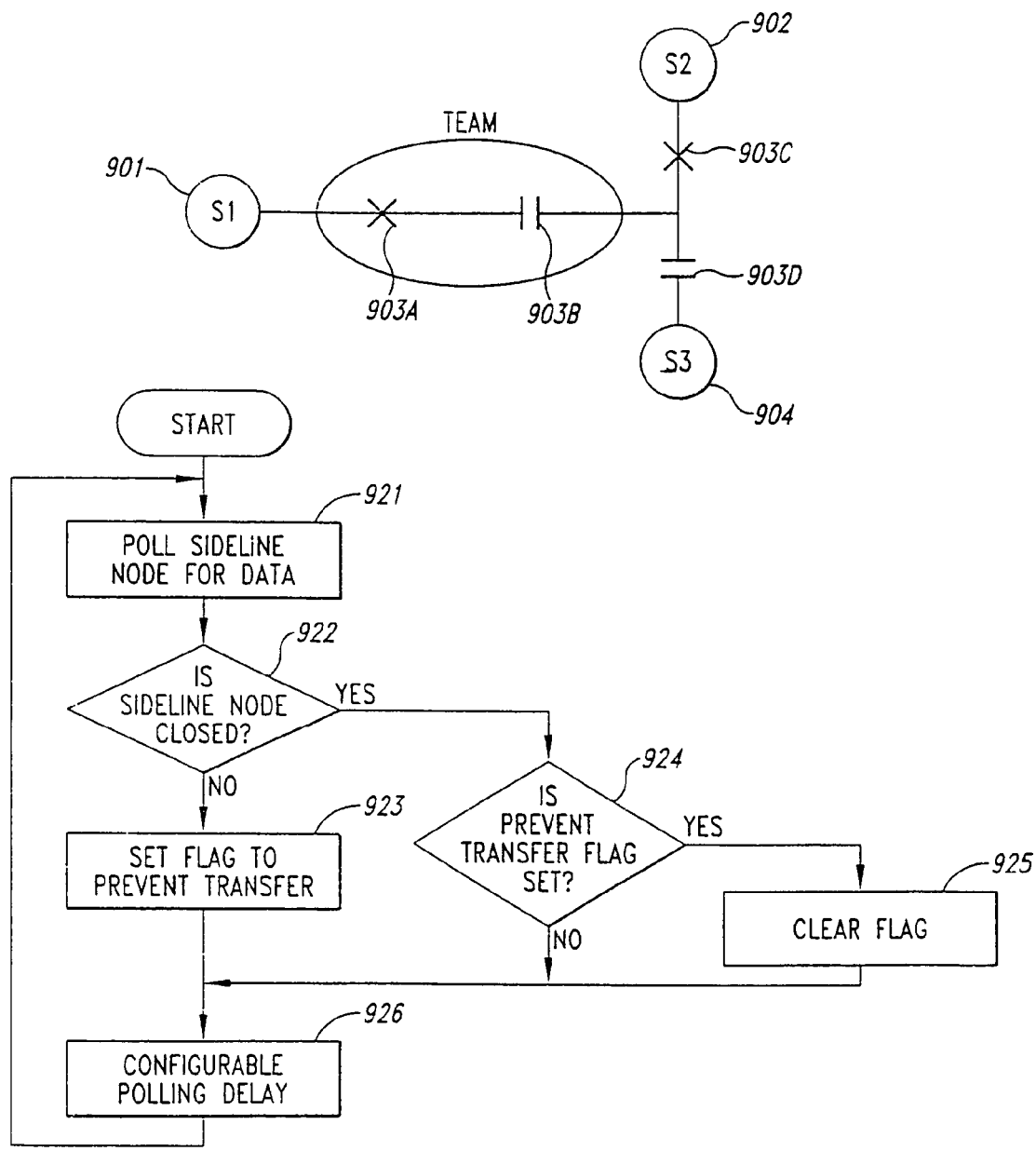
FIGS. 9 and 10 show alternate configurations of a distribution system illustrating enhanced control features and improved fault isolation capabilities, along with flow charts for supporting the configurations.
Figure 10:
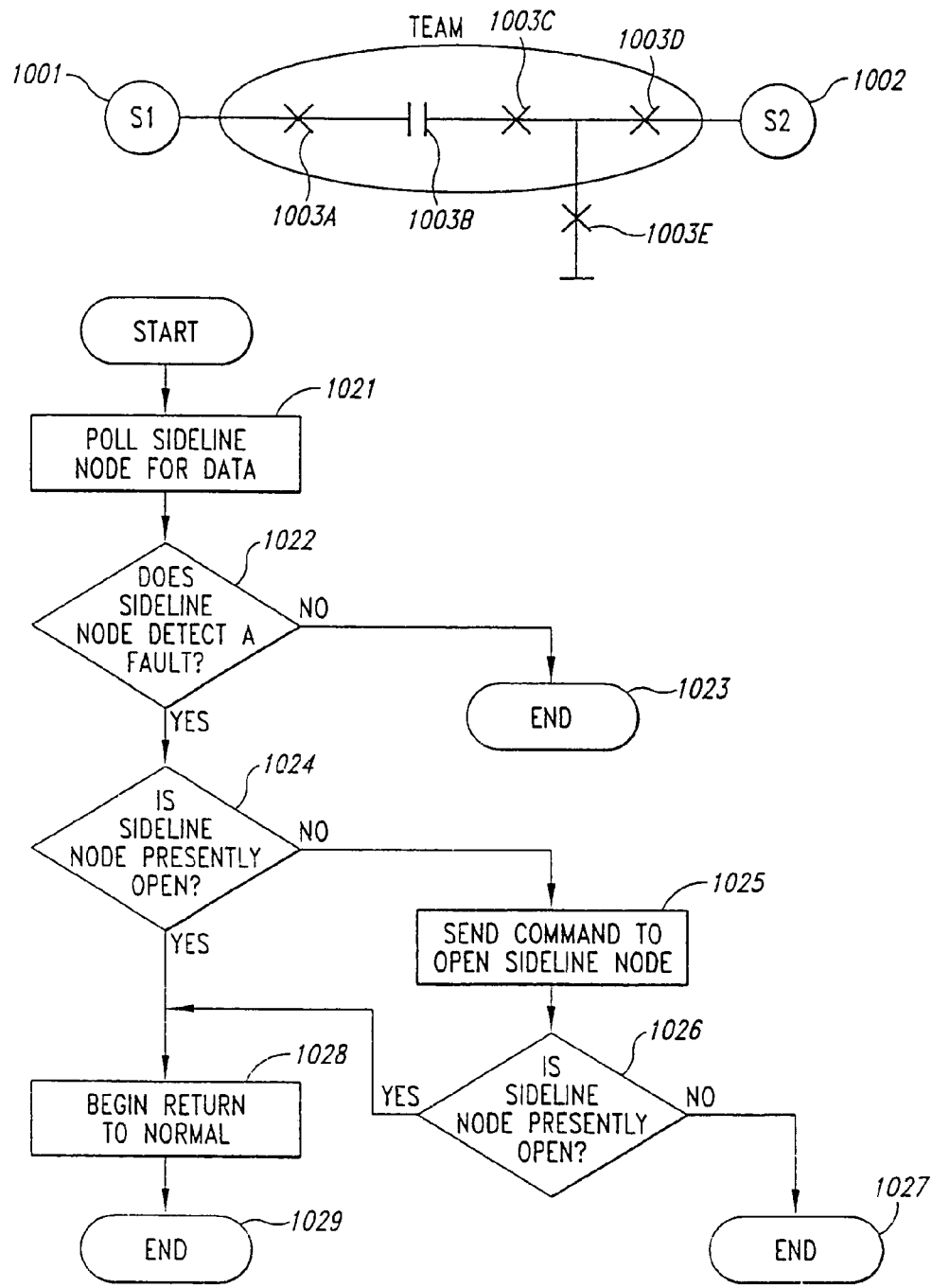

With reference now to FIGS. 9 and 10, the following are two examples of uses of the sideline team node. Those skilled in the art will recognize that S1-3, (901, 902, 904, 1001, 1002) are all sources of supply for the circuits. Nodes 903A, 903C, 1003A, 1003C, 1003D and 1003E are all normally closed switches. Nodes 903B, 903D and 1008B are all normally open switches. It will be obvious to those skilled in the art that these simple examples were chosen for the purpose of illustrating the possible uses of sideline team nodes, and that much more complex applications are possible. For example, it would be consistent with the present invention to utilize sideline team node communications to allow multiple teams to interact in order to reconfigure circuits with more than two possible sources.

The data available from the sideline team members could also be more complex. This data could include protection data such as present load readings, maximum available load current, etc. to prevent an impermissible amount of load to be picked up, power quality data such as voltage or harmonic content that could also be used to block transfer if it would negatively impact customers on the alternate source, or other device-specific data such as abnormal conditions in the sideline node controller.

The first example refers to sideline node 903C and team nodes 903A and 903B in FIG. 9. Team node 903B is responsible for collecting data from sideline node 903C, and using that data to make decisions about the operation of the team. In this example, the circuit containing team nodes 903A and 903B is normally fed from source 901, and uses the mid-point of circuit fed from source 902 as its alternate source such that if 903A were to be opened by a reconfiguration event, and 903B closed, the load served between nodes 903A and 903B would be fed from the alternate source 902.

It is important to note for the purpose of this example that source 904 is not capable of handling the additional load between 903A and 903B if node 903D were closed and 903C were open, and a reconfiguration event were to occur. For this reason the data that 903B retrieves from 903C is used to determine the alternate source that is presently available. If 903B finds that 903C is closed, source 902 must be the present alternate source, therefore, the load between 903A and 903B could be transferred to the alternate source if necessary. If 903B finds that 903C is open, source 904 would be the present alternate source, therefore a reconfiguration event can not be allowed.

This logic is illustrated in the flow diagram in FIG. 9. The steps in this flow diagram are executed in parallel to, but not connected with, the synchronization and integrity check process running in node 903B. It is assumed that upon start of the node's logic execution that a sideline node has been configured into the sideline table in node 903B. Node 903B begins polling the sideline node at step 921. With the data retrieved node 903B checks whether the sideline node is closed at step 922. If the sideline node is not closed, or the closed status of 903C cannot be positively verified for any reason, the logic proceeds to step 923 to set a flag to prevent automatic circuit reconfiguration from occurring. It will be appreciated by those skilled in the art that the polling loop, 921-926 could be replaced by a spontaneous report by exception scheme or other means to acquire the state of 903C, subject to the restriction that the data must be acquired and validated within a period of time comparable to the configurable polling delay referred to at 926.

If in step 922 it is found that the sideline node is closed, node 903B continues to step 924 where if the flag to prevent reconfigurations is set, it can be cleared in step 925, otherwise no further action is required. In all cases, node 903B will go to step 926 to wait a preconfigured amount of time before going back to step 921 to begin the polling cycle again.

It will be appreciated by those skilled in the art that if nodes 903C and 903D were themselves a switch team, node 903B could be used as a sideline node off of either node 903C or node 903D. In this way each of the two teams could prevent the other team from automatically reconfiguring its circuit if either team was already in a reconfigured state. It can also be appreciated that as teams grow in nodes, many more interconnection possibilities arise, each being consistent with the present invention.

The second example refers to FIG. 10 with nodes 1003A, 1003B, 1003C and 1003D comprising a switch team being fed from sources 1001 and 1002. Additionally, node 1003E is a sideline node (a simple, SCADA operable switch with fault detectors) installed on a tap line that feeds to a dead-end. Sideline node 1003E is contained in the sideline table of node 1003D such that node 1003D is responsible for retrieving data from node 1003E and using the data to enhance team operation.

In the present example, the settings of the breaker at source 1002 are configured such that the breaker will go to lockout on the third operation. It is also desirable to prevent any switches from opening on the first operation of the breaker to allow temporary faults to clear. This implies that nodes 1003C and 1003D must open their switches after the second operation in order for the fault to be cleared, a reconfiguration to begin, and as much of the load to be picked up as possible.

If a permanent fault were to occur on the line between 1003E and the end of the line, source breaker 1002 would operate twice, after which nodes 1003C and 1003D would open to begin the reconfiguration process. As described earlier, node 1003B would close into open node 1003C, the breaker would close into open node 1003D, leaving the fault apparently isolated between nodes 1003C and 1003D.

In this example, the execution of the logic associated with the sideline node is performed after the transfer event has completed. After the transfer event, node 1003D will poll sideline node 1003E for data. This data will include the indication of a fault past sideline node 1003E. Knowing the normal configuration of the circuit, and the more specific location of the fault, node 1003D can further isolate the fault by sending a command to sideline node 1003E to open its switch. Upon verification that the sideline node's switch is open, node 1003D can automatically begin the return to normal process, restoring load to the customers bordered by the three nodes 1003C, 1003D and the now open node 1003E.

This logic is illustrated in the flow diagram in FIG. 10. As stated previously, the logic is only executed following the end of a reconfiguration event, and before a return to normal event. After the reconfiguration event the node enters the logic and polls the sideline node at step 1021. If the data retrieved indicates that no fault was detected by the sideline node at step 1022, or any other abnormal condition is detected such that the location of the fault cannot be verified to be on the load side of 1003E, the node proceeds to 1023 to end the logic. If a fault was detected at step 1022, the node then determines if the sideline node is presently open in step 1024. If the sideline node is not presently open, the node continues to step 1025 to where it sends an open command to the sideline node. The node then again checks if the sideline node is open in step 1026 and if not can stop the logic at step 1027, or optionally retry the open command. If the sideline node is now open at step 1026, it will continue to step 1028 where it will signal the return to normal logic to begin. If the node were to find the sideline node 1003E initially open at step 1024, it would immediately continue to step 1028 to signal the return to normal logic. In both cases, this logic ends at step 1029 after the return to normal logic has been signaled.

It can be seen by those skilled in the art that numerous other possible circuit configurations are possible using this form of sideline node logic while remaining consistent with the present invention. Neither the number of nodes in a team nor the complexity of the circuit affect the use of this logic. For example, it will be appreciated that node 1003E can be associated with an automatic sectionalizer, contained in another team, or backed up by an alternate source without deviating from the present invention.

Protective Device Add-On Board

In the illustrative embodiment of the present invention, the method disclosed above is incorporated into the operating instructions or stored program of the team node controller 200. Alternate embodiments in the form of microprocessor-based add-on boards support retrofit of products configured according to existing, prepackaged line recloser controls and substation breakers.

Figure 11:
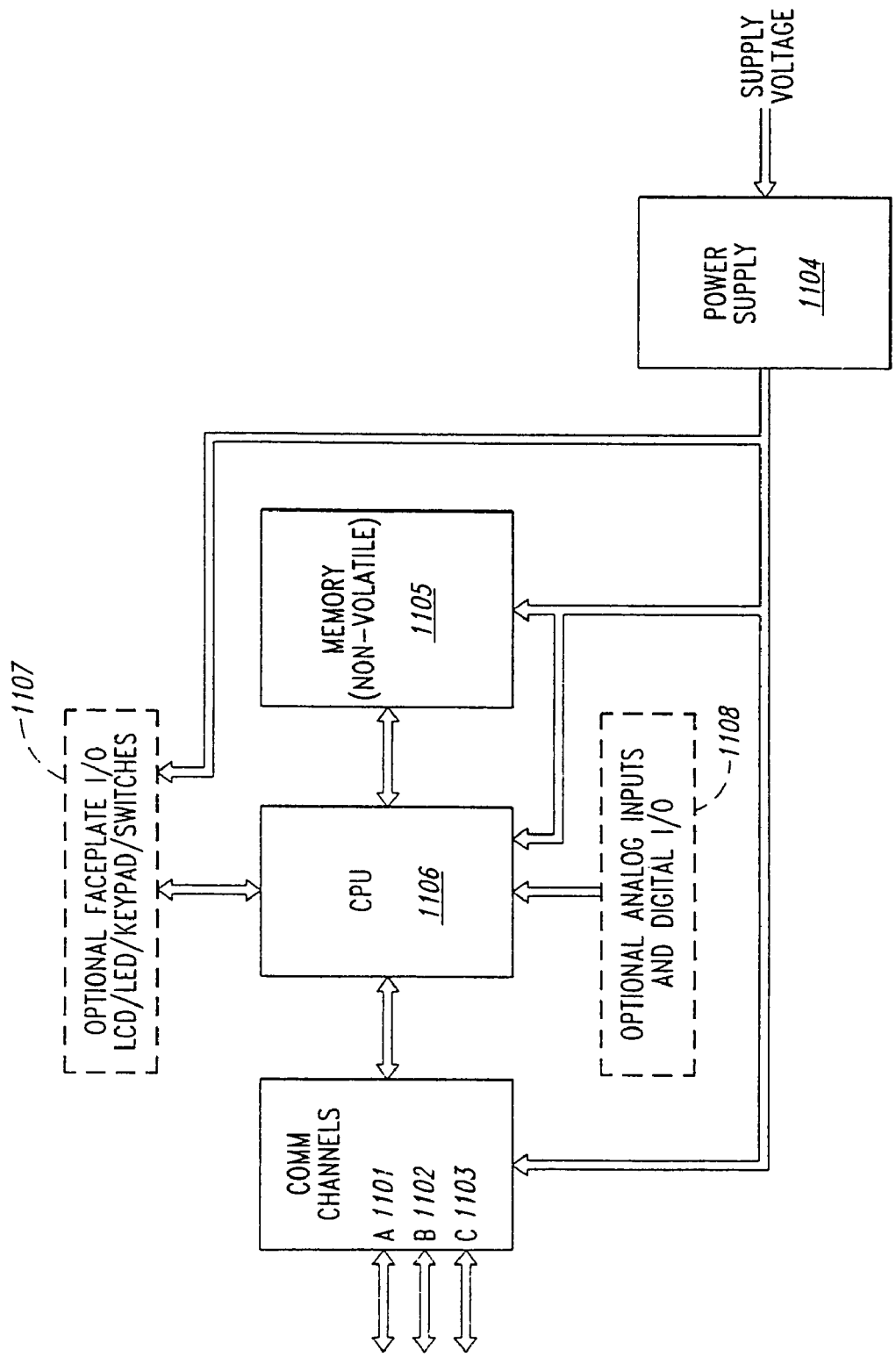
FIG. 11 shows a logical block diagram of an alternative embodiment of node controller 200, in which the circuit reconfiguration intelligence is contained in an add-on microprocessor board.

A block diagram of the recloser version of the add-on board is shown in FIG. 11. The board consists of a small electronic microprocessor-based circuit board, which can be provided for mounting inside an existing recloser control cabinet, or in a nearby auxiliary cabinet. The power for the board is supplied by the recloser's power supply/battery backup system 1104. The team reconfiguration logic is entirely contained in the memory 1105 and CPU 1106 of the add-on board, while the circuit protection logic and active switching functions remain in the recloser control. Thus, the addition of the team reconfiguration logic disclosed herein can be performed without modification to the logic or functionality of the recloser. The interface between the add-on board and the recloser is based entirely on digital communications. It is well-known to those skilled in the art that many of the modern, microprocessor-based recloser controls (including those mentioned in the background section) support well-defined digital communications protocols such at DNP 3.0 and Pacific Gas and Electric Protocol in such a way as to allow the recloser functions to be selected, controlled and monitored over a communication port. This port is provided as part of the recloser control. The specific data values, status points, and control outputs that can be exchanged over communications are typically provided as predefined "points lists" by the designer or provider of the recloser.

In light of the functionality provided by the recloser and its communication interface, the functions of node controller of FIG. 2 can be partitioned between the add-on board and the retrofit recloser control as follows: The team communication functions 110, 218, 220 are provided by one or two of the communication channels 1101 and 1102 on the add-on board. The third channel, 1103 is used to communicate with the recloser. The team coordination logic performed by 208 and 210 including maintenance of the team database 210 is performed by the processor 1106 and memory 1105 of the add-on board. The node's user interface for team functions 209 remains with the add-on board 1107, while the recloser's user interface can still be used for accessing its standard functions. All of the recloser protection features including overcurrent fault detection 212, switch monitoring and control 216 are utilized, with the add-on board receiving status from all of these features over communications. Supervisory control over the recloser's associated switch (breaker) is provided to the add-on board via the communication protocol. Power management and battery backup 1104 must be provided separately for the additional add-on board/communication equipment, although this may in some circumstances be shared with the recloser's power supply 222.

In circumstances where the team logic requires interaction with data stored or processed in the recloser, the recloser point list is utilized. The presence of overcurrent faults, line voltage and other sensed or derived parameters are all readily obtainable in this manner. For example, load data required to support load pickup at steps 620 and 638 can be periodically sampled by the recloser, transferred to the add-on board using the point list and averaged inside the add-on board.

An additional benefit of the add-on board is its ability to extend the capabilities of the recloser's basic functions. For example, the Cooper Form 4C recloser supports only two protection profiles. Because of the additional storage and processing capabilities of the add-on board, additional profiles can be stored in the add-on board and loaded into the recloser when needed. In addition, the extensions to the representations of protection profiles presented in this invention can be applied uniformly to all retrofit reclosers without regard to the capabilities of the individual device.

Yet another embodiment of the add-on board is provided by including the optional analog and digital I/O block 1108. This embodiment could be utilized for interfacing to a substation breaker lacking an adequate digital communication capability to support the team functions. The digital I/O would then be connected to the breaker's status and override control points. The analog I/O would be connected to current and voltage sensing devices to allow the node to provide the load and voltage monitoring functions of a team member. The breaker's protection profile would be dictated by the breaker's independent settings and configured into the memory 1105 of the add-on board. Those skilled in the art will recognize that many possibilities exist for supporting team functionality in legacy or retrofit devices.

Multiple-Team System

Figure 12:
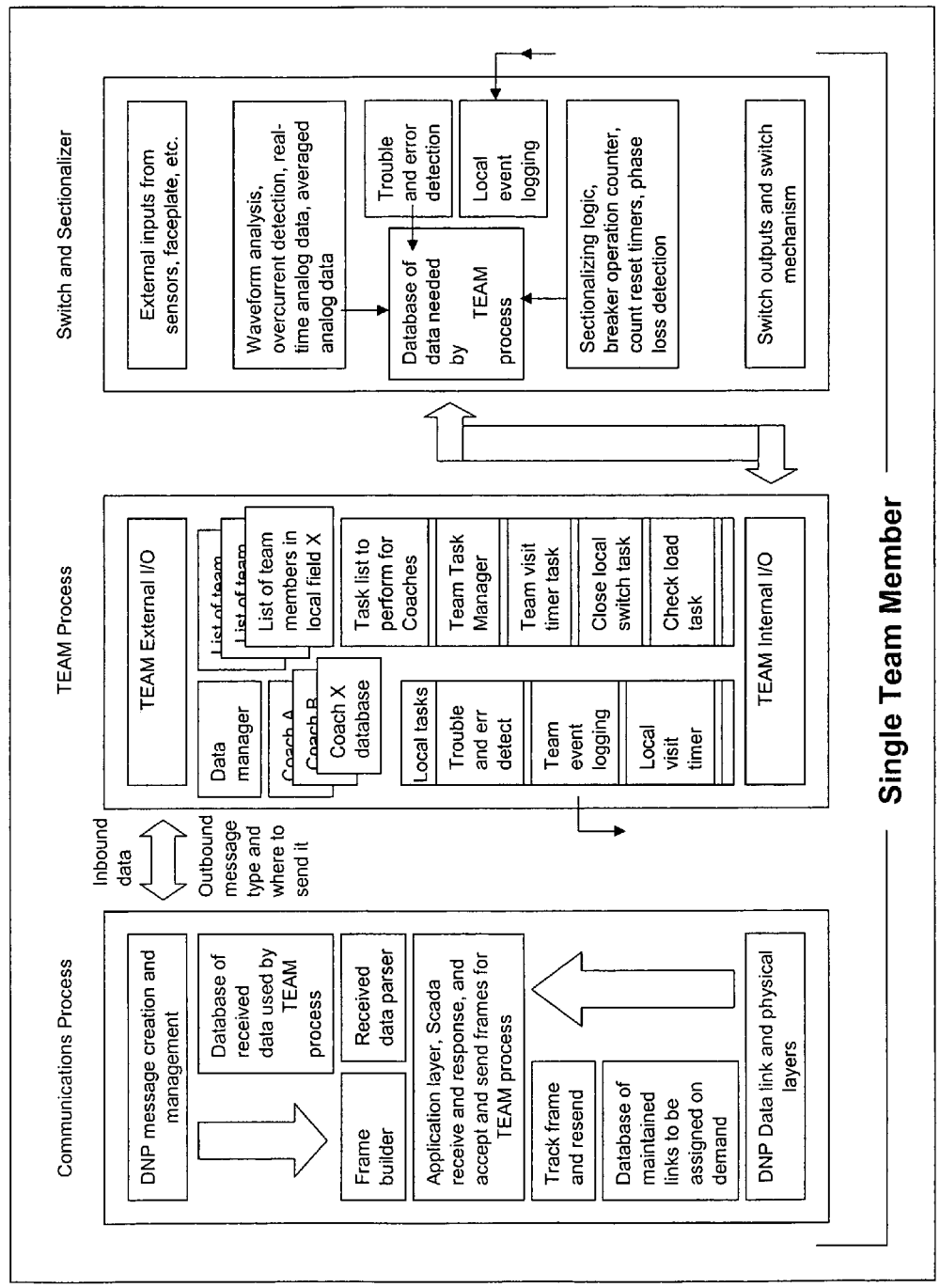
FIGS. 12-14 show overall logical organization and the data structure of another alternate embodiment of the present invention.
Figure 13:
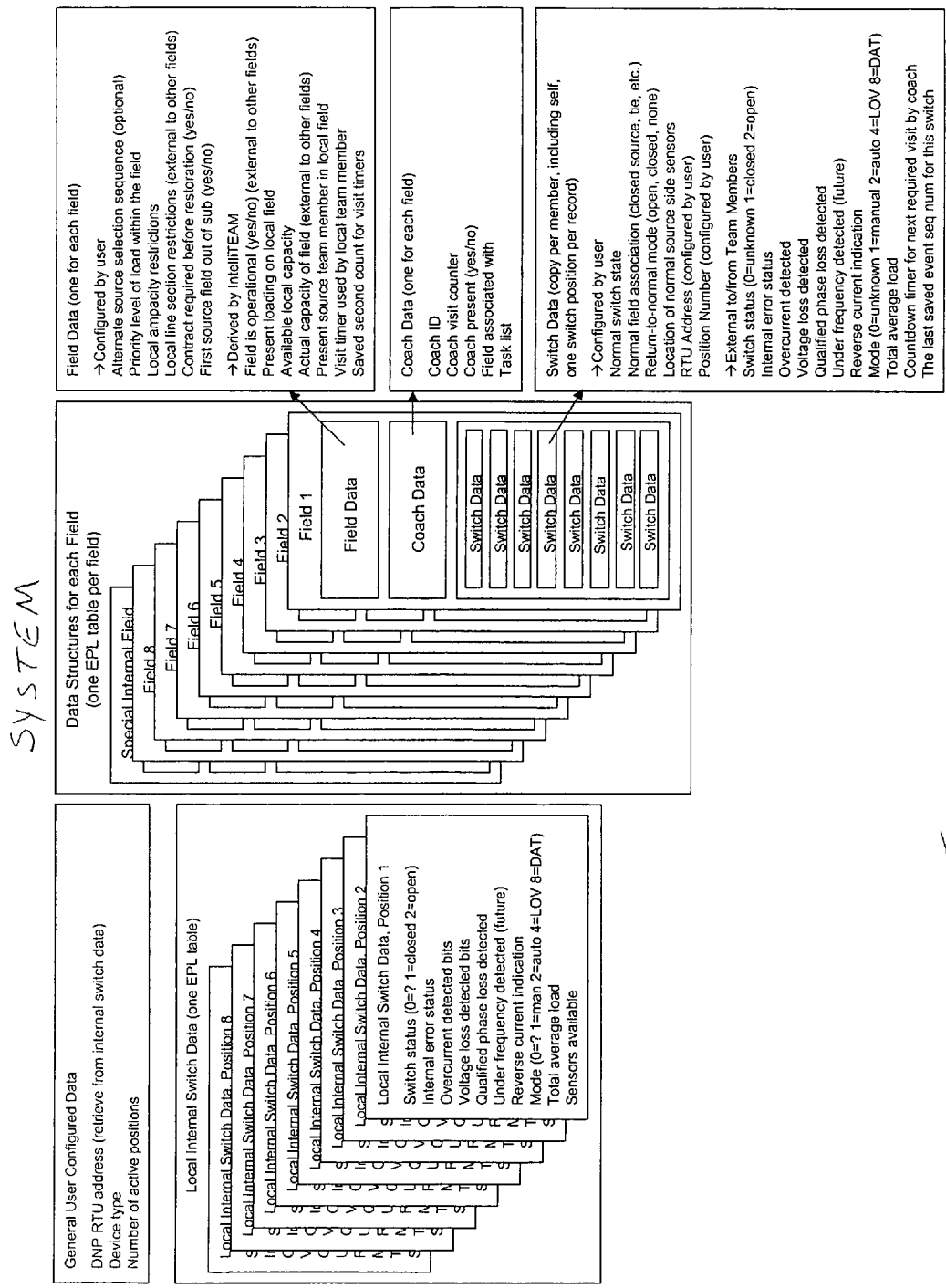
Figure 14:
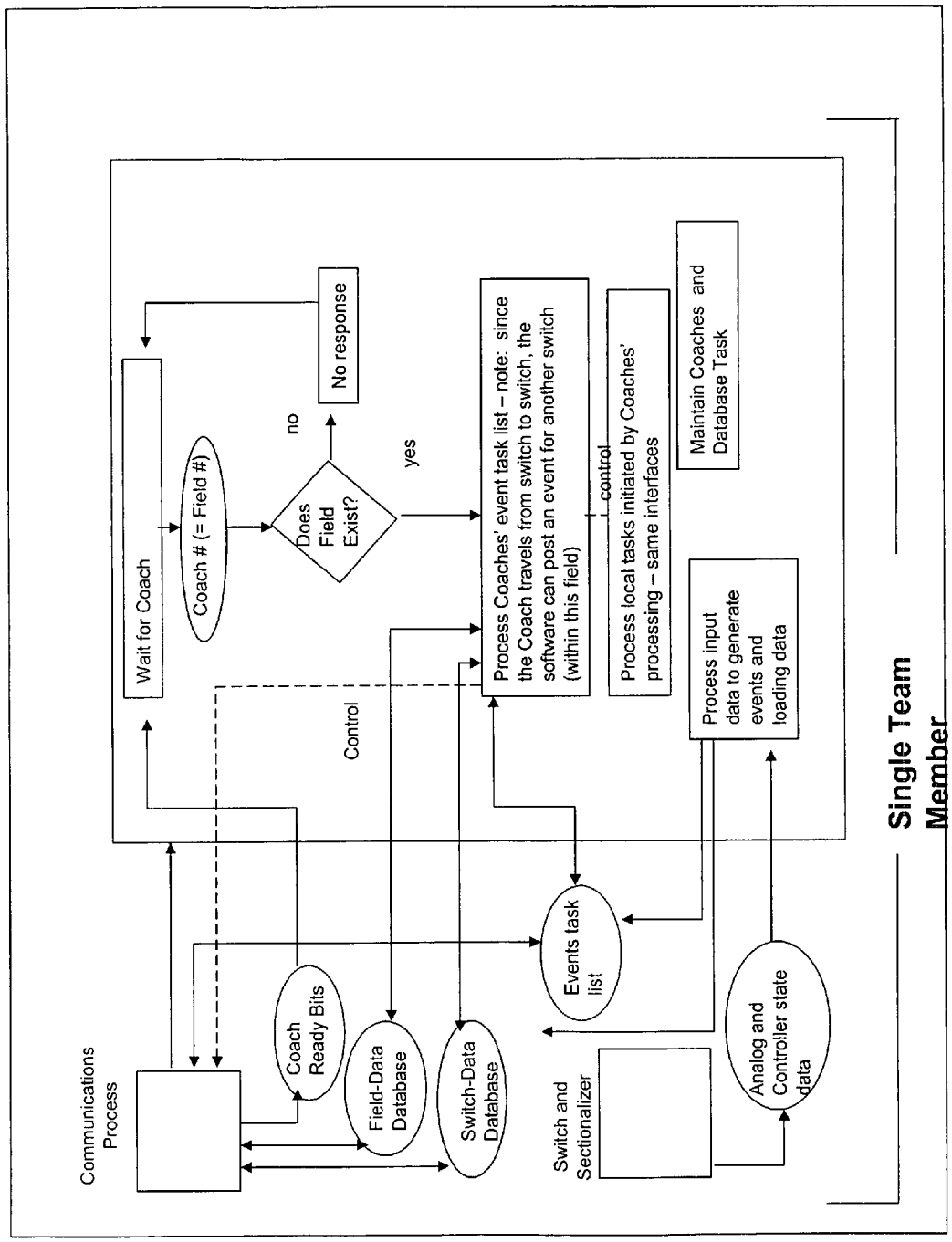

Considering now additional aspects and features of the present invention, FIGS. 12-14 illustrate the overall logical organization and the data structure wherein more efficient and flexible response to abnormalities is provided to reconfigure and restore service to end customers (circuit reconfiguration); i.e. to enhance the reconfigurability of the distribution system especially in larger distribution systems. For example, in one arrangement of the invention, "teams" of nodes or team members are defined in the distribution system having associated switching controls with the various teams communicating amongst each other to "negotiate" or work out the most efficient and expeditious reconfiguration of the system in response to a fault conditions and other circuit abnormalities.

Figure 15:
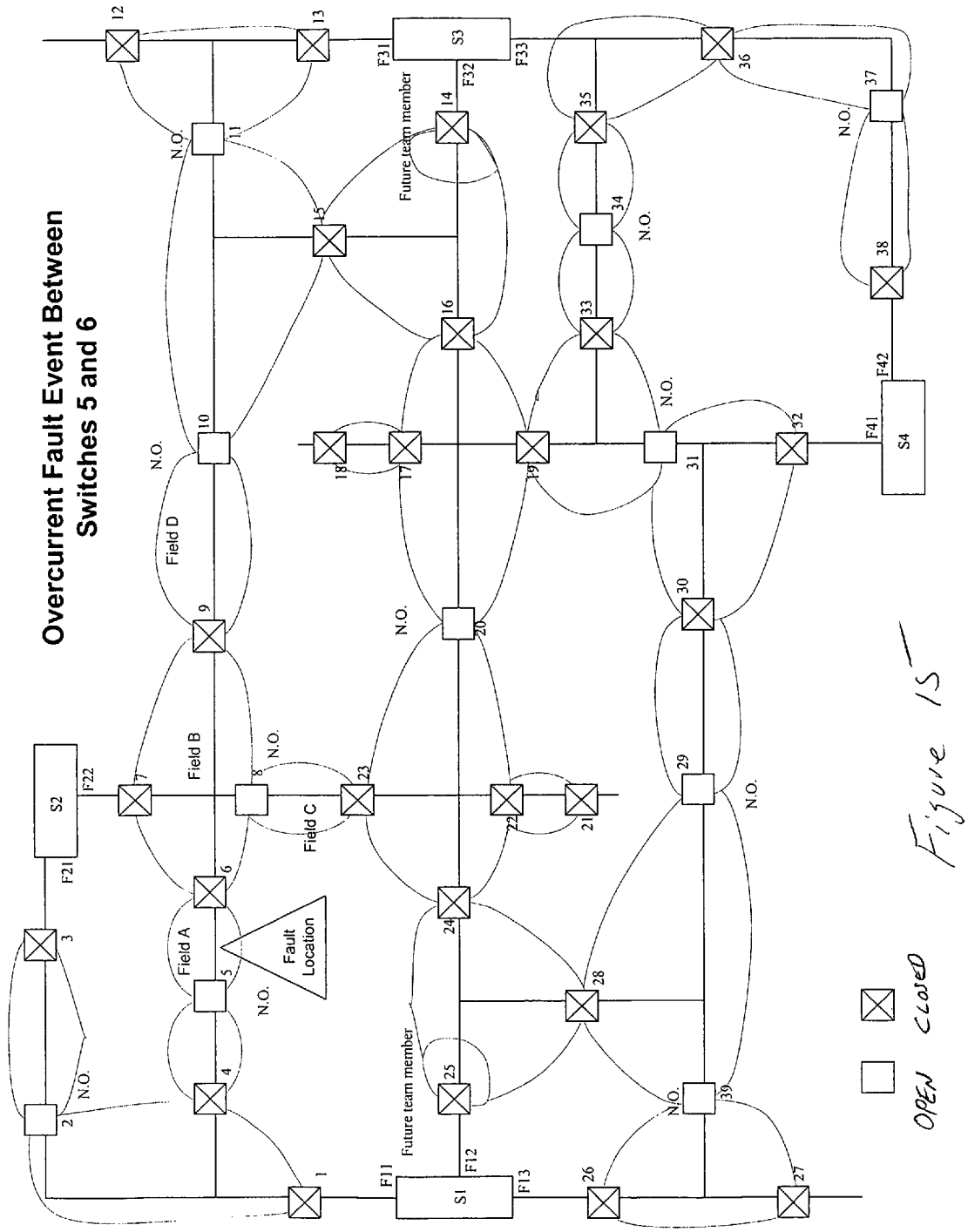
FIGS. 15-21 are representations of system operation and response of the embodiment of the present invention of FIGS. 12-14 to an Overcurrent Fault Event in an illustrative distribution system describing the response of the present invention to reconfigure and restore service.

FIG. 12 illustrates a representation of the overall logic of a single team member. In an illustrative example, the Sectionalizing logic block in the Switch and Sectionalizer box is the same as described earlier in connection with the embodiment of FIGS. 1-8 and in U.S. Pat. No. 6,018,449 and based on EnergyLine Model 2801 or 2801-SC. FIG. 13 illustrates the data structure for the overall system. FIG. 14 represents an illustrative representation of the overall logic flow to accomplish the basic functions of the invention at a single team member location as shown in FIG. 12 based on the system data that is obtained as will be explained in more detail hereinafter. With additional reference to FIG. 15, the distribution system is organized or defined by fields, e.g. Field B including Team members Switches 6, 7 8 and 9 and Field C including Switches 8 and 23 such that team member Switch 8 is a member of both Fields B and C.

In the illustrative embodiment, resources are provided for each field that move between or visit each team member and cooperate and coordinate operation and system response of the team members. For example, the resources may be referred to as a "Coach" or "Agent" for each field, the term Coach being utilized hereafter for simplicity but not to be interpreted in any limiting sense. Further, the team members may also be referred to as "players" on the team.

In a particular arrangement, decisions on how to respond to particular system conditions is achieved via a negotiated plan between teams and team members, i.e. an agreement between the coaches of the teams. In a preferred embodiment, the communicated information includes not only data on adjacent team members and data from other external teams representing system information, but also includes task identifiers and functional representations on how to respond to particular system conditions as sensed and in accordance with a plan of response per "negotiations" amongst teams. The task identifiers and functional representations may also be characterized as instructions, responses and implementation rules. Thus, the present invention provides coordination, flexibility and efficiency to restore service to the largest percentage of the system.

Defintions useful to explain the illustrative examples are as follows:

Field—A portion of a distribution system bounded by automated switch locations.
Team—The automated switch locations associated with a Field.
Coach—resources having similarities to a software agent responsible for maintaining service to a Field by using the Team members at its disposal.
Loop Teams—Any team with two sources, each directly from a substation.
Radial Teams—Any team with no more than one source.
Floating Teams—A team where no sources are directly from a substation. Instead the sources are from mid-circuit tie points.
Hanging Loop Team—A team which has one substation source, and one mid-circuit source.
Hanging Radial Team—A radial team where its one source is a mid-circuit source.

The "primary mission" (function) of a Coach is to keep service to its respective (his being used hereafter for simplicity) Field, and will do so using information from his Field and from Coaches on adjacent Fields. A secondary mission of the Coach is to restore a Field back to its normal state, and will do so immediately if that option exists. If the normal source is not available, the Coach will look to alternate sources as a temporary means to restore service to his Field. In addition, a Coach cannot act by himself. To insure coordination and structure a Coach must consult with the Coach from the adjacent Field, and they must agree on the course of action. The Coach can be characterized in various ways for understanding and illustrative purposes, e.g. 1) a resource which is communicated or moves around and visits team members to control and coordinate tasks; 2) a token that gives a Switch Control the power to make decisions, provided the Switch Control has all the necessary tokens.

Considering now additional aspects and features of the present invention, in order to best describe and understand illustrative examples and not to be interpreted in any limiting sense, a listing of general rules, attributes and data that could be established to suitably control a system and practice the present invention are as follows:

Fields link to other Fields at Team member locations. Any single Team member will be part of one or more Fields, and so will be visited by one or more Coaches. A Field must contain at least two Team members. A substation breaker can be one of those Team members, provided that an interface module exists at the breaker. Information will be passed between Fields using the Team members as semaphores. In this way the status of any single Field can be propagated throughout the associated part of the distribution system.

The rules for restoring service are very similar to the rules that exist in the prior IntelliTEAM product as discussed hereinbefore. The presence or absence of voltage and fault current on adjacent line sections will remain as the key to service restoration. Previous rules for coordination of logic (process step counter) will be replaced by similar rules related to the Coach process. A Coach will carry the necessary state machine information, and along with the state machine information from an adjacent Coach, coordination will be guaranteed.

Time synchronization over a wide area will be replaced by individual activity timers. A Coach needing additional information from an adjacent Field will allow the adjacent Coach a limited time to retrieve that information. If the timer expires, the first Coach has the option to find another solution at another Team member. By keeping statistics on the restoration performance at each Team member a Coach can dynamically prioritize the strategy for restoration of the Field.

The Coach will be required to visit each team member on a predetermined time interval. During quiescent periods this means the Coach will travel between Team members on some regular interval (maybe 3 minutes). If a Team member does not hear from the Coach in this period of time, the Team member will flag an error condition. Each Team member will have a separate timer associated with it that will be updated with any visit. Due to the lack of a common clock, the coach will try to visit every team member in half the configured time. This should handle the potential communications propagation delay (which will be assumed to be zero).

Each Team member will also be able to call out to the Coach, and all other Team members on the Field, when a local event occurs that will affect the Field. For example, manually placing a Switch Control in Disable Automatic mode will initiate a message to the other Team members. This will cause the Coach to also learn of this change in status, and use this new information when other events occur. All events categorized as critical will be immediately propagated in this way.

Attributes of the Field
    Number of switches
    Priority of load
    Present source switch
    List of alternate sources switch to try (optional configuration)
    Maximum number of additional fields that can be added to circuit
    Enable/disable of Contract method that arbitrates the addition of fields
    Enable/disable automatic operation
    Return to Normal time setpoint in minutes
    Indicator—field is operational
    Present average 3-phase load for this field
    Available local capacity=max team cap—extended load
    Capacity for line section and its downstream loads
    Lesser of Max rated team capacity and team avail capacity
    Visit Timer used by local team member
    Field Configuration error code
    Flags to indicate OCNL status of field
    Extended Loading of field (this and downstream fields)
    Switch record with the valid active RTN timer
    Switch record for return trip for traveling coach
    Transfer or RTN state
    Coach ID
    Coach visit counter
    Coach present (yes/no)
    Flags set by other processes to indicate the coach was here
    Setup data for this field
    Team Members
    Attributes of Team Members
    1. Normal switch state
    2. Normal field association (closed source, tie, etc)
    3. Return to normal mode (open, closed, none)
    4. Location of normal source side sensors
    5. DNP RTU address
    6. Switch position number (0.7)
    7. Maximum current this switch can handle in season 1
    8. Maximum current this switch can handle in season 2
    9. Current switch state (e.g. 0=unknown, 1=closed, 2=open)
    10. Event status bitmask
    11. Reverse current indication
    12. Mode bitmask (e.g. 0-unknown, 1=man, 2=auto, 4=lov)
    13. Total Average load
    14. Countdown timer for next required visit by coach
    15. Last saved event sequence number for this switch
    16. Number of line segments sourced from this switch
        Coaches—contains necessary and desirable data to perform the tasks. The Coach carries a set of task identifiers along with the data. These task identifiers will cause specific logic paths to run in the switch control when the Coach arrives as discussed further in connection with FIG. 22. Both the task identifiers and the data will change as the Coach travels from team member to team member.

A Coach has a coach ID number and an incrementing visit counter. Normally the coach roams the field at will. He must visit every team member in a prescribed period of time though. If he arrives at a team member that has already received that ID and visit counter (the counter must be greater than the last if the ID is the same), the coach assumes he is a duplicate and dies. If the coach arrives to find another coach with a higher ID has visited, again, this coach dies. If a team member doesn't hear from the coach within a prescribed period (2× the visit time), that team member can spawn a new coach with an ID number one higher than the last coach he heard from, and a new visit counter. The new coach must determine the state of the field and begin to take action if necessary.

The Coach will carry task identifiers (numbers) that a task manager will perform. The tasks that need to be performed at each team member will change as the conditions change in the field. There is a linked list of coach buffers in each team member. Each coach includes a list of active tasks that he is working on. At each team member he will evaluate the list of tasks, perform any action possible, and add or remove tasks as necessary. In the preferred embodiment, the software facilities for the coach function, e.g. coach logic executable code, will reside at each team member.

The task list will contain records that consist of a task number, the coach that owns it, and a priority of the task.

Tasks have attributes which include the Coach ID, Task Owner (the team member where the task was originated), a Task Sequence (unique ID #), and a Time-to-Run attribute. As a comparison with the embodiment of FIGS. 1-9 where it might be stated that the switch control performs specific logic until it is given adequate data to move on, in the illustrative embodiment, the data sent to a team member will cause specific logic to run while the coach is present to supervise.

Rules for Team Availability

The evaluation of team readiness can be broken down into the following four categories.

The user may enable or disable functionality on a per-team basis. The setup parameter will be available as a SETUP function of Team Configuration, once for each team on each team setup. The parameter must be a global parameter so that it is set the same in all members of the team. The term global is used herein to mean overall controlled system. The coach will be responsible for verifying that all team members on the field contain the same status, and will issue an error if they do not.

In order for any one switch to be used in a transfer process, both teams in the adjacent fields must be enabled. However, if one team is enabled and one is disabled, only the one common switch will be affected in the enabled team. Other team members in the enabled team will be allowed to operate if their conditions allow it.

Field Enable/Disable

When changing the team configuration due to permanant circuit modifications, it is beneficial to stop the team communications. This consists of stopping the coach from visiting team members, and stopping event messages from being generated. To do this a Field Enable/Disable parameter will be available on the SETUP: Team Configuration screens, once for each field/team on each of the eight team screens. To disable the entire field/team, the user will need to manually set this parameter to disabled at each team member.

Team Member Operational

A team member (switch) will be operational if the following are true:

1. the switch has automatic sectionalizing enabled
    2. human intervention has not changed the state of the switch
    3. TEAM process enabled by the user
    4. the field is operational
    5. there are no significant errors present Team Ready to Transfer Indication The Ready to Transfer indication is primarily a user interface issue. A team will be Ready when all team members are Operational. The Ready to Transfer indication displayed at any one team member will not exactly follow the true ready state of the team. It will be delayed in transition between on and off for the amount of time it takes the coach to return to the team member.

The operational status of the team members will be indicated by the state of the TEAM mode bit in the automatic operation byte the coach carries for each switch.

Note that the Ready to Transfer indication is on a team basis. For example, a Scada-Mate team member associated with two fields will show one Ready to Transfer indication for each field/team.

Rules for Source Selection

When a field has been deenergized due to a circuit event, the coach has the responsibility to find the best team member to use to restore service to the field. This source can be any open switch around the field, including the source switch that originally tripped open. The coach must visit as many team members as necessary to collect the information needed to make this determination. The rules for the selection of an alternate source follow.

Overcurrent Detected

If an overcurrent was detected by the existing source switch (now tripped open), the coach must first assume his field is faulted and set the fault indication flag. He must then look for a load switch on his field that also detected an overcurrent. If he finds another team member indicating overcurrent, the coach can assume the fault is downstream in an adjacent field, and clear the fault indication flag for his field.

This can be summarized as "A field is considered to contain a fault condition if one and only one team switch on that field indicates an overcurrent fault."

Note: Obviously the load-side team member that has detected an overcurrent must have the associated switch open to isolate the fault before the coach can restore service to the field.

If no load switch is found with an overcurrent indication, the fault must be on the local field, and the coach must not restore service to this field. At this point service can only be restored by human intervention.

If an overcurrent indication was found on a load switch, the first choice for restoring service to the field should be the normal source switch. The coach must first verify that all necessary load switches on the field are open, then he should return to the normal source switch to request a close operation from the player. If the player can close the switch, the coach's primary responsibility is complete.

No Overcurrent Detected

If an overcurrent was not detected by the existing source switch, the coach will immediately look to the first alternate source team member to restore service to the field. Using the Switch Availability Rules (below) the coach will determine whether the first alternate switch is available, and if not, continue searching through the alternate source sequence list. If none of the switches on the alternate source sequence list are available, or the list is empty, the coach will use the Switch Availability Rules to search through all switches in the team.

When an acceptable switch is found, the coach will travel to that switch and ask the player to close the switch. If successful, the coach's primary responsibility is complete. If not, the coach will again search for another switch in the team to close.

If no acceptable switch is found, the coach will continue with other tasks as necessary, but also continue to look for a way to restore service to his field.

Basic Switch Availability Rules

The switch can be used as a good alternate source if:
the switch is presently open
the switch's normal job is a source, a tie, or a load/tie switch
the switch is in process enabled mode
the switch is active (indicated by a non-zero RTU address)

Note: If the normal source switch detected an overcurrent, and the field is NOT faulted, the highest priority switch to close will be the normal source switch. The priority will then go to the alternate sequence list, followed by normal tie switches, and finally to load/tie switches.

Rules for Initiation of Return to Normal

The decision whether to initiate a return-to-normal (RTN) process depends on the conditions within the team. Conditions that will cause the initiation of RTN include:

Correction of Fault Condition

The correction of the fault condition is signaled by the return of stable 3-phase voltage to the normal source side of the switch(es) directly downstream of the faulted line section.

External Request

An external request to start RTN may be received over various communication channels or any other means where a human can force the initiation regardless of the state of the circuit.

Correction of Fault Condition

If a field is determined to be faulted, such that the field is also dead and a transfer event has taken place to restore adjacent fields, a process can be started to detect the restoration of this field by external forces (humans, scada, etc.). When this process has detected a stable restoration, an event can be generated for the coach to receive.

The process will include the monitoring for return of voltage, and a timer to determine the stability of the voltage.

Rules for the Transfer and Return to Normal Processes

The rules for the operation of an individual switch are similar to that as discussed in connection with the prior embodiment of FIGS. 1-9. The following is a list of the existing rules, modified only slightly. There are rules for single switch operation, dual switch operation, and recloser operation.

Single Switch Transfer Rules:

A "tie" switch is any open switch that when closed will reenergize a line section up to other open switches. A tie switch may close even though it does not sense any voltage (as would be the case if the voltage sensors were on the deenergized side of the switch).

In order to close a local presently open switch, at least one valid closed switch and one valid open switch must be detected in the adjacent line sections. The following rules define the conditions that must be met for the local switch to validate the state of adjacent switches and line sections.

A presently open switch on the load side of a faulted line section may close for the purpose of restoring load if:
a. no error conditions exist
b. the adjacent fault side switch is open
c. the adjacent fault side switch did not detect a fault, but did see a loss of voltage
d. the current level seen by the adjacent fault side switch before the outage is within configured and/or calculated limits (or the maximum number of permitted line segments for the circuit is within threshold)
e. an adjacent non-faulted side switch indicates it saw a voltage loss and/or fault but it is now closed, or the adjacent non-faulted side switch is a normally open switch, or the adjacent non-faulted side switch is a breaker and voltage has been restored
(this step is bypassed if the local switch is a normally open switch, and voltage checking is disabled)
f. the local switch is a normally open switch, it may be configured only close if good voltage is detected on its voltage sensors on the alternate feeder side
g. the local switch has control of the tokens (Coaches) from both adjacent line sections (Fields), if an adjacent line section exists
h. the adjacent line section on the alternate source side is directly associated with the alternate source, or the adjacent alternate source side line sections have given permission based on available capacity and present status.

A normally closed switch on the source side of a faulted line section may reclose if:
a. no error conditions exist
b. at least one adjacent fault side switch detected a fault
c. the adjacent fault side switch that detected the fault is open
d. the adjacent non-faulted side source switch indicates it saw a voltage loss and/or fault but it is now closed, or the non-faulted side is the breaker and voltage has been restored
e. the local switch has control of the tokens (Coaches) from both adjacent line sections (Fields), if an adjacent line section exists Single Switch Return to Normal Rules:

To be eligible for return to normal a device must be configured as either "closed return" or "open return" in addition to no error conditions and correct operating mode.

All devices must indicate that they are in a return-to-normal-ready state before any action may occur. This is confirmed through the sharing of data between line sections.

All voltage sensors on normally closed positions must be installed on the source side of the switch, or the source side device must inform the local device that return-to-normal may start, or if this is the first device in a team a feeder monitor device must be installed on the source side in order to inform the local device that return-to-normal may begin.

Normal 3-phase voltage must be restored to the source side of a normally closed device that is presently open for a minimum threshold time before any activity begins. The presence of 3-phase voltage may be indicated through communications (see 3. above).

An open device on the source side of an isolated fault must be closed while remaining in automatic mode.

Any device placed in manual mode before returning to normal will stop the return to normal process. All positions will need to be manually set back to their normal state.

An open device must have control of the tokens from both adjacent line sections, and the data associated with those tokens must allow the close operation to occur.

A normally open device does not need control of both tokens in order to reopen. This is the only exception to the "token control" rule.

Any device not in its normal state may return to its normal state by coordinating with other devices in the team by following the rules stated below.
no error conditions exist
the normally open switch does not indicate a fault
during a closed transition, a normally closed device may not reclose until it has received a verification from the normally open device that it is ready to reopen
during a closed transition, a circuit parallel may not be made until any reclosers in the team have indicated that the settings in each recloser have been adjusted to handle the parallel (i.e. disable ground relay)
during an open transition, a normally closed device may not reclose until it has received a verification from the normally open device that it is presently open
during a closed transition, a normally open device may not reopen until all normally closed positions have reported that they are presently closed
a normally closed device may reclose only if voltage is present on all sensed phases, or if the source side device is presently closed, or if a feeder monitoring device reports 3-phase voltage has been restored
the local switch has control of the tokens (Coaches) from both adjacent line sections (Fields), if an adjacent line section exists Note: During a closed transition, the normally open device must reopen following the allowed transfer time whether it has heard from the normally-closed but presently-open device or not. This is done to prevent the parallel of lines for an extended period of time.

Transfer/Reconfiguration Operating Rules for Dual Switches

1. All normally closed positions are configured to open on voltage loss, with or without overcurrent detected. The operation will take place after the specified count of breaker operations.
2. All normally closed positions may be configured to open on phase imbalance. The operation will occur if one or two phases remain deenergized continuously for a time equal to the configured threshold time. (standard phase loss protection logic)
3. A "tie" position is any open position that when closed will reenergize a line section up to other open switches/positions.
4. A dual switch device can operate one or both of its active positions (TEAM enabled) simultaneously.
5. A dual switch device with a tie position on the load side of a faulted line section will use the following external conditions to determine whether it may close its tie position, and its second open position if applicable, for the purpose of restoring load.
    a. no error conditions exist
    b. the adjacent fault side switch is open
    c. the adjacent fault side switch did not detect a fault, but did see a loss of voltage
    d. the current level seen by the adjacent fault side switch before the outage is within configured and/or calculated limits
    e. an adjacent non-faulted side switch indicates it saw a voltage loss and/or fault but it is now closed, or the adjacent non-faulted side switch is a normally open switch, or the adjacent non-faulted side switch is a breaker and voltage has been restored
    (this step is bypassed if the local switch is a normally open switch, and voltage checking is disabled)
    f. the local switch is a normally open switch, it may be configured only close if good voltage is detected on its voltage sensors on the alternate feeder side
    g. the local switch has control of the tokens (Coaches) from both adjacent line sections (Fields), if an adjacent line section exists h. the adjacent line section on the alternate source side is directly associated with the alternate source, or the adjacent alternate source side line sections have given permission based on available capacity and present status
6. A dual switch device with a tie position on the load side of a faulted line section will use the following internal conditions to determine whether it may close its tie position, and its second open position if applicable, for the purpose of restoring load.
   a. no error conditions exist
   b. any active positions are open
   c. no fault was detected locally
   d. the current level seen by the adjacent fault side switch before the outage is within configured and/or calculated limits
8. A tie position may close even though it does not sense any voltage, as would be the case if the voltage sensors were on the deenergized side of the position. This rule does not include the first switch out from the breaker.
9. If after closing the active positions the dual switch device detects a loss of voltage (or voltage never returned) within a time equal to the configured threshold time, the position furthest from the alternate source will reopen (shots-to-lockout logic). Also, if the position closest to the alternate source detects a fault, that position will also open.
10. The active positions of dual switch device that were most recently closed must remain closed for the shots-to-lockout time threshold before the local device can inform other devices that it has successfully completed its operations.
11. Normally closed active positions on the source side of a faulted line section may reclose if the following external conditions exist.
   a. no error conditions exist
   b. at least one adjacent fault side device detected a fault
   c. the adjacent fault side device that detected the fault is open
   d. the adjacent non-faulted side source device indicates it saw a voltage loss and/or fault but it is now closed, or the non-faulted side is the breaker and voltage has been restored, or the non-faulted side device is a feeder status monitor and has informed the local device that the feeder is energized
   e. the local switch has control of the tokens (Coaches) from both adjacent line sections (Fields), if an adjacent line section exists
12. Normally closed active positions on the source side of a faulted line section may reclose if the following internal conditions exist.
   a. no error conditions exist
   b. a fault was detected internally by all active positions
13. If after closing the active positions the dual switch device detects a loss of voltage within a time equal to the configured threshold time, the position furthest from the source will reopen (shots-to-lockout logic). Also, if the position closest to the source detected a fault, that position will also open.
14. The active positions of dual switch device that were most recently closed must remain closed for the shots-to-lockout time threshold before the local device can inform other devices that it has successfully completed its operations.
15. After an isolation/transfer event has occurred all closed positions will operate using standard sectionalizing with phase loss protection logic. (this of course follows any shots-to-lockout logic that is necessary)

Additional Notes:

If a pad-mounted gear unit contains the normally open switch, and also contains an active normally closed switch, it may be allowed to transfer load regardless of the state of the team. This follows the assumption that the most critical load is closest to the alternate circuit. The critical load is fed from the load position(s) of the padmount. This padmount would be operating as simple source transfer to reenergize the critical load.

SMM—mode enabled when there is actually only one member in the team, or when a stop transfer has occurred and the N.O. switch is in a padmount that also has an active N.C. switch. There must be a local record in SMM, but no other team records in the database must be present. If other records are present they will be disregarded for the period that SMM is active.

In such an SMM mode, RTN on voltage restoration will only work if voltage sensor sets are on the source sides of the padmount.

Return to Normal Rules for Dual Switches

1. To be eligible for return to normal a device must be configured as either "closed return" or "open return" in addition to no error conditions and correct operating mode.
2. All devices must indicate that they are in a return-to-normal-ready state before any action may occur. This is confirmed through the sharing of data between line sections.
3. All voltage sensors on normally closed positions must be installed on the source side of the switch, or the source side device must inform the local device that return-to-normal may start, or if this is the first device in a team a feeder monitor device must be installed on the source side in order to inform the local device that return-to-normal may begin.
4. Normal 3-phase voltage must be restored to the source side of a normally closed device that is presently open for a minimum threshold time before any activity begins. The presence of 3-phase voltage may be indicated through communications (see 3. above).
5. An open device on the source side of an isolated fault must be closed using shots-to-lockout while in automatic mode.
6. Any device placed in manual mode before returning to normal will stop the return to normal process. All positions will need to be manually set back to their normal state.
7. An open device must have control of the tokens (coaches) from both adjacent line sections, and the data associated with those tokens must allow the close operation to occur.
8. A normally open device does not need control of both tokens (coaches) in order to reopen. This is the only exception to the "token control" rule.
9. Any device not in its normal state may return to its normal state by coordinating with other devices in the team by following the rules stated below.
   a. no error conditions exist
   b. no fault indications remain in any device
   c. during a closed transition, a normally closed device may not reclose until it has received a verification from the normally open device that it is ready to reopen d. during an open transition, a normally closed device may not reclose until it has received a verification from the normally open device that is presently open
e. during a closed transition, a normally open device may not reopen until all normally closed positions have reported that they are presently closed
f. a normally closed device may reclose only if voltage is present on all sensed phases, or if the source side device is presently closed, or if a feeder monitoring device reports 3-phase voltage has been restored
g. the local switch has control of the tokens (Coaches) from both adjacent line sections (Fields), if an adjacent line section exists Note: During a closed transition, the normally open device must reopen following the allowed transfer time whether it has heard from the normally-closed but presently-open device or not. This is done to prevent the parallel of lines for an extended period of time.

On a padmount control the process of determining whether RTN can start must be a bit different. This is due to the possible arrangement of voltage sensors. If there are voltage sensors on both feeds, the sensors will be on the source side. While this will make it possible to wait for stable voltage, which set of voltage sensors to monitor is still an issue. If there is only one set of voltage sensors they will be on the bus. This will make it impossible to watch for stable voltage to return, so an external indication is necessary. This external indication may be the switch control on the source side, or it may be a separate device altogether, feeding information into the team. A separate device could also take the form of a human, through SCADA or other means, telling the team to start RTN.

Recloser Specific Operating Rules
Normal Circuit Configuration

A team with one or more reclosers will be Ready to Transfer if:
All members of the team are in their normal states
All members have automatic operation enabled
No errors exist (internal, comm, sync, etc.)
All recloser members are using the preconfigured settings group Each Add-on board will monitor the settings group associated with its local recloser. The settings group consists of:
Ground Trip Block
Reclosing Block
Cold Load Pickup Block
Voltage Trip Block
Fast Trip Block
Normal Profile
Alternate Profile 1
Alternate Profile 2
Alternate Profile 3 (switch mode)

Reconfigured Circuit

When the circuit is in a reconfigured state (post-transfer, pre-RTN) a change to the settings group monitored by the Add-on board will only postpone the Return-to-Normal operation. Unlike disabling and then reenabling automatic operation when in a Ready-to-RTN state (which forces manual return of the team), temporarily modifying the settings group only causes a temporary stop transfer condition. Once the settings group is returned to the expected values the team will return to Ready-to-RTN mode.

In this way changes to the settings group is similar to a Block Supervisory or Hot Line Tag command, i.e. similar to a visual disconnect on switch controls such as ScadaMate Switches. In all these cases Return-to-Normal is allowed to continue when the setting/state is returned to its normal position.

One example of this might be when a closed recloser being backfed from an alternate circuit is put in non-reclosing mode while some work is being done on the line. Non-reclosing is not the normal state for the reconfigured settings group. While this recloser is in non-reclosing mode Return-to-Normal will not be allowed to begin at any point within the team, regardless of whether voltage has returned from the preferred circuit. Once reclosing is again allowed on that recloser Return-to-Normal can continue. If voltage had already returned at that point the Return-to-Normal Delay Timer would begin to time down, or the team would just continue to wait for voltage to return.

Another example would be at the recloser that is presently open isolating the fault. When the fault is repaired the user will want to close the recloser using non-reclosing. He first sets non-reclosing, then closes the recloser. Assuming the recloser stayed closed, the user would be expected to reenable reclosing before the Return-to-Normal Delay Timer would begin timing down at the next isolating switch down stream. If he left non-reclosing active the team would never return to normal. If the crew decided to return the team to normal manually, but they left non-reclosing active at this recloser, the team would never become ready to transfer, even though the team is in its normal state. The team would only become ready to transfer after the reclosing was again enabled at that recloser.

Changing Recloser Profile

It is important that the circuit is stable when changing the recloser's protection profile. The profile should only be changed when there is no automatic team activity scheduled, and the load is not above the minimum trip setting. A DNP Binary Input "Above minimum trip" may be used as one verification that the profile may be changed. While this point is not a reliable indication of faults, it can be used for this purpose.

The recloser's protection profile is changed from its normal value only when the recloser is being energized from the alternate circuit. The profile is changed just prior to closing the recloser to backfeed a line section. The profile is not changed on reclosers on the alternate circuit, or reclosers on the normal source-side of the fault. Because the recloser is open when the profile is changed, and because the transfer process is state driven, the time to change the profile is easily determined, and easily controlled.

The operation can be less predictable when returning the circuit back to its normal configuration. A recloser that is presently closed, backfeeding a line section, and in an alternate protection profile, does not have a specific state defined to return to its normal profile. Additionally, the process changes based on open or closed transitions. So, the point that provides the most stable and consistent time to change profiles during the return to normal process is at the end of the process.

Since the end of the return to normal process may be from seconds to minutes after all switches are actually stable in their normal positions (depending on the Transfer Process Time Limit), it is important to base the time of returning the profile on the state of all team members. Because the normally open switch is the only switch in the team to be informed of all team activity during the return process, the normally open switch will also be required to inform all team members when the team is back to normal and stable. To do this an additional step will be added to the return to normal process. At this time this step will only be associated with the normally open switch and any reclosers in the team.

The normally open switch will enter this step after it successfully reopens, and remain in that step until it knows all team members are back to normal. At that point the normally open switch will broadcast a message to all other team members informing them that the team is stable.

Any reclosers will enter this step either immediately if the recloser is already in its normal state, or after it has successfully returned to its normal state. When the message is received that the team is now back to normal and stable, the Add-on board will signal the recloser to change its protection profile. The transition back to the normal profile will be verified in the "end transfer" task following the timeout of the transfer process timer.

Figure 16:
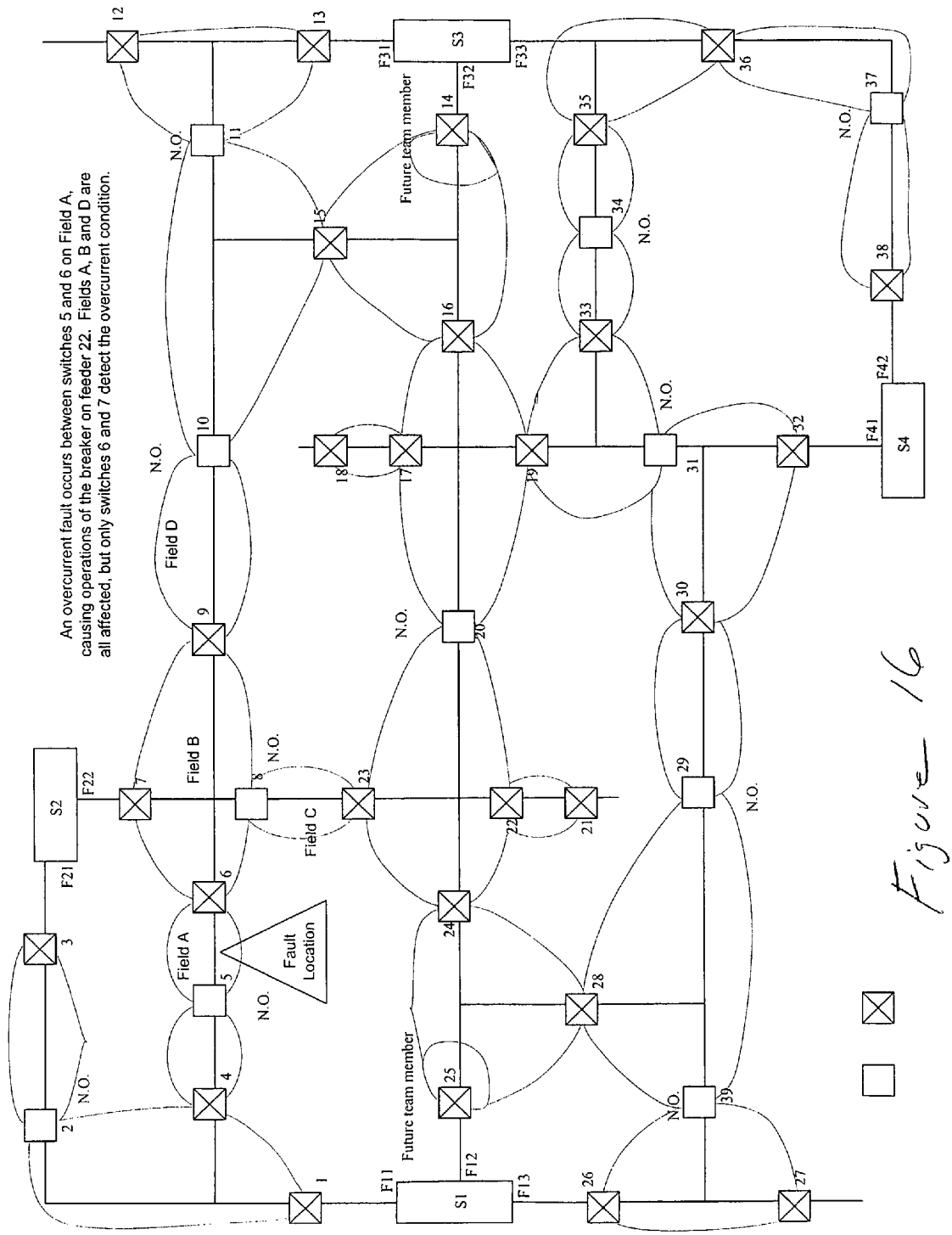

In accordance with important aspects of the present invention and referring now additionally to FIGS. 15-21, depicted therein are representations of system operation and response to an Overcurrent Fault Event occurring between two Switches 5 and 6 in the illustrative distribution system depicted in FIGS. 15-21. The following describes the response of the present invention to reconfigure and restore service:

FIG. 16: An overcurrent fault occurs between switches 5 and 6 on Field A, causing operations of the breaker on feeder 22. Fields A, B and D are all affected, but only switches 6 and 7 detect the overcurrent condition.

Figure 17:
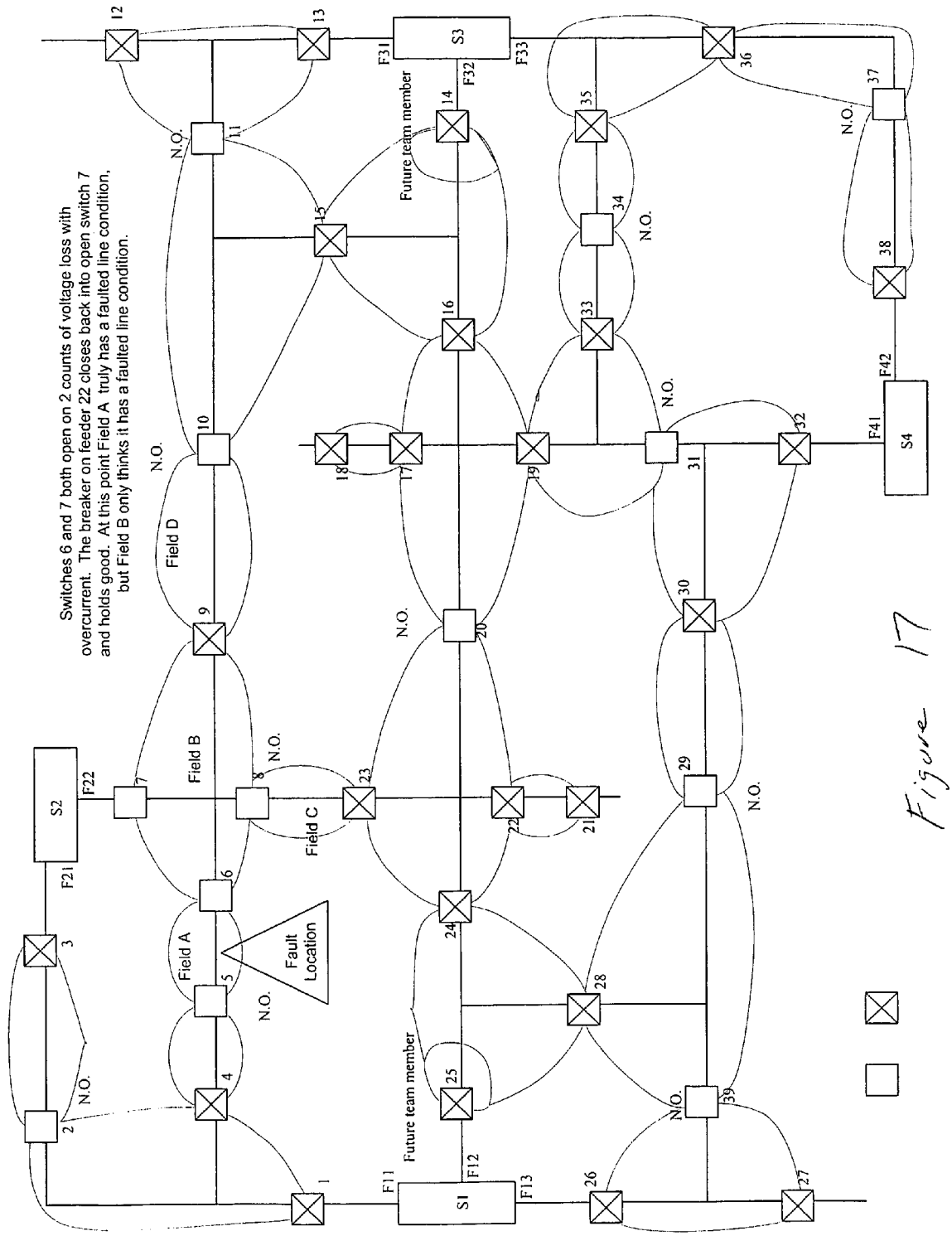

FIG. 17: Switches 6 and 7 both open on 2 counts of voltage loss with overcurrent. The breaker on feeder 22 closes back into open switch 7 and holds good. At this point Field A truly has a faulted line condition, but Field B only thinks it has a faulted line condition.

Figure 18:
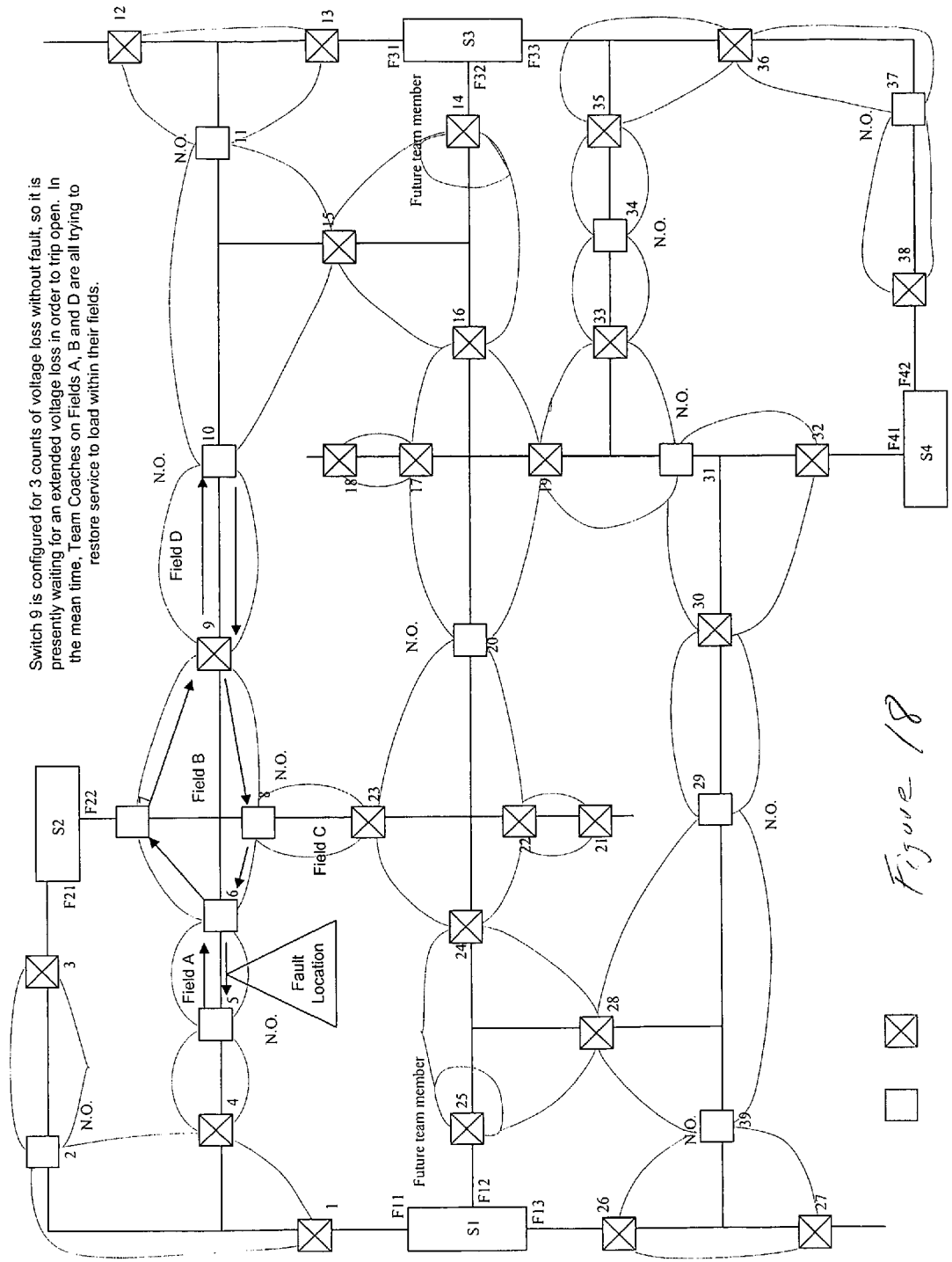

FIG. 18: Switch 9 is configured for 3 counts of voltage loss without fault, so it is presently waiting for an extended voltage loss in order to trip open. In the mean time, Team Coaches on Fields A, B and D are all trying to restore service to load within their fields.

Figure 19:
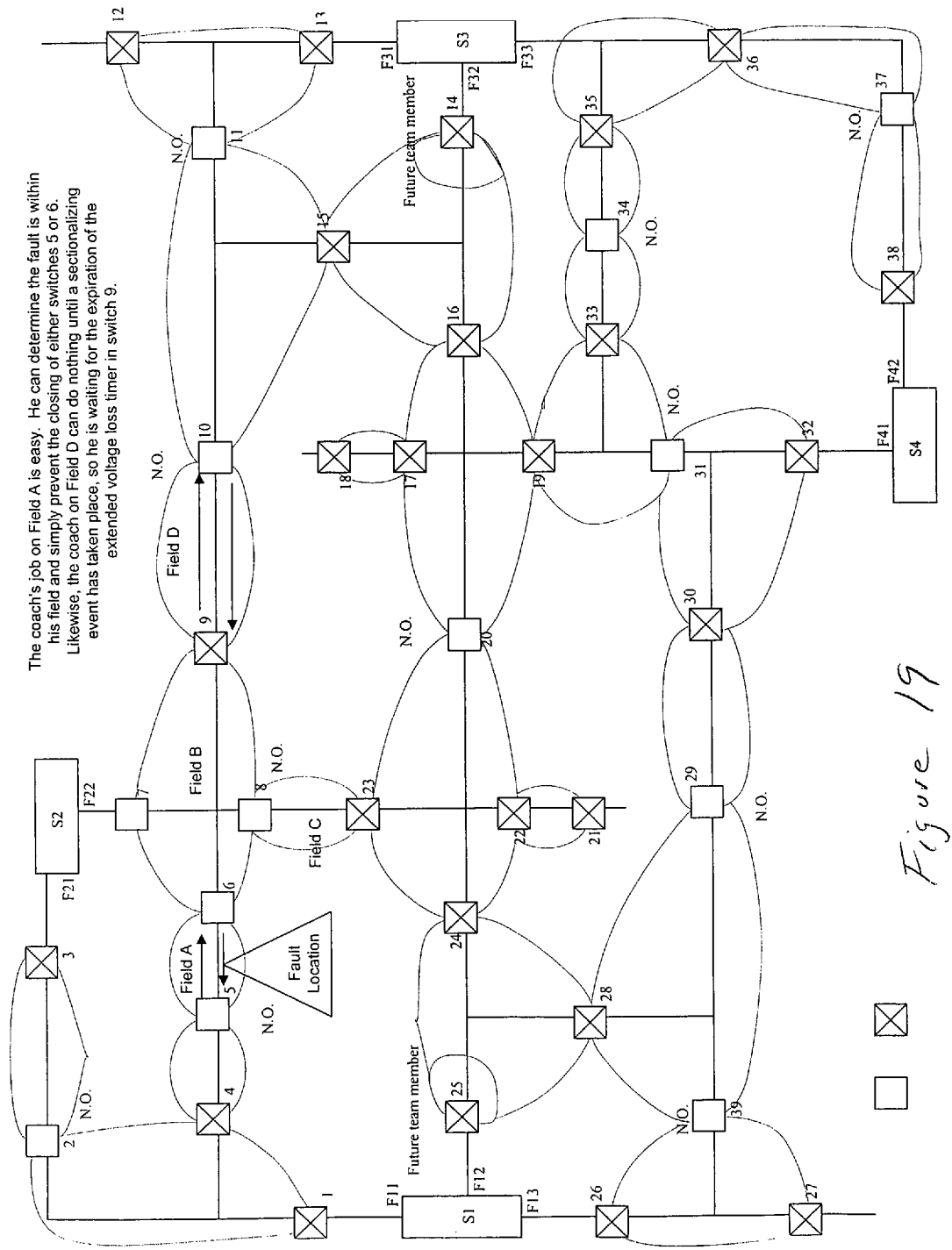

FIG. 19: The coach's job on Field A is easy. He can determine the fault is within his field and simply prevent the closing of either switches 5 or 6. Likewise, the coach on Field D can do nothing until a sectionalizing event has taken place, so he is waiting for the expiration of the extended voltage loss timer in switch 9.

Figure 20:
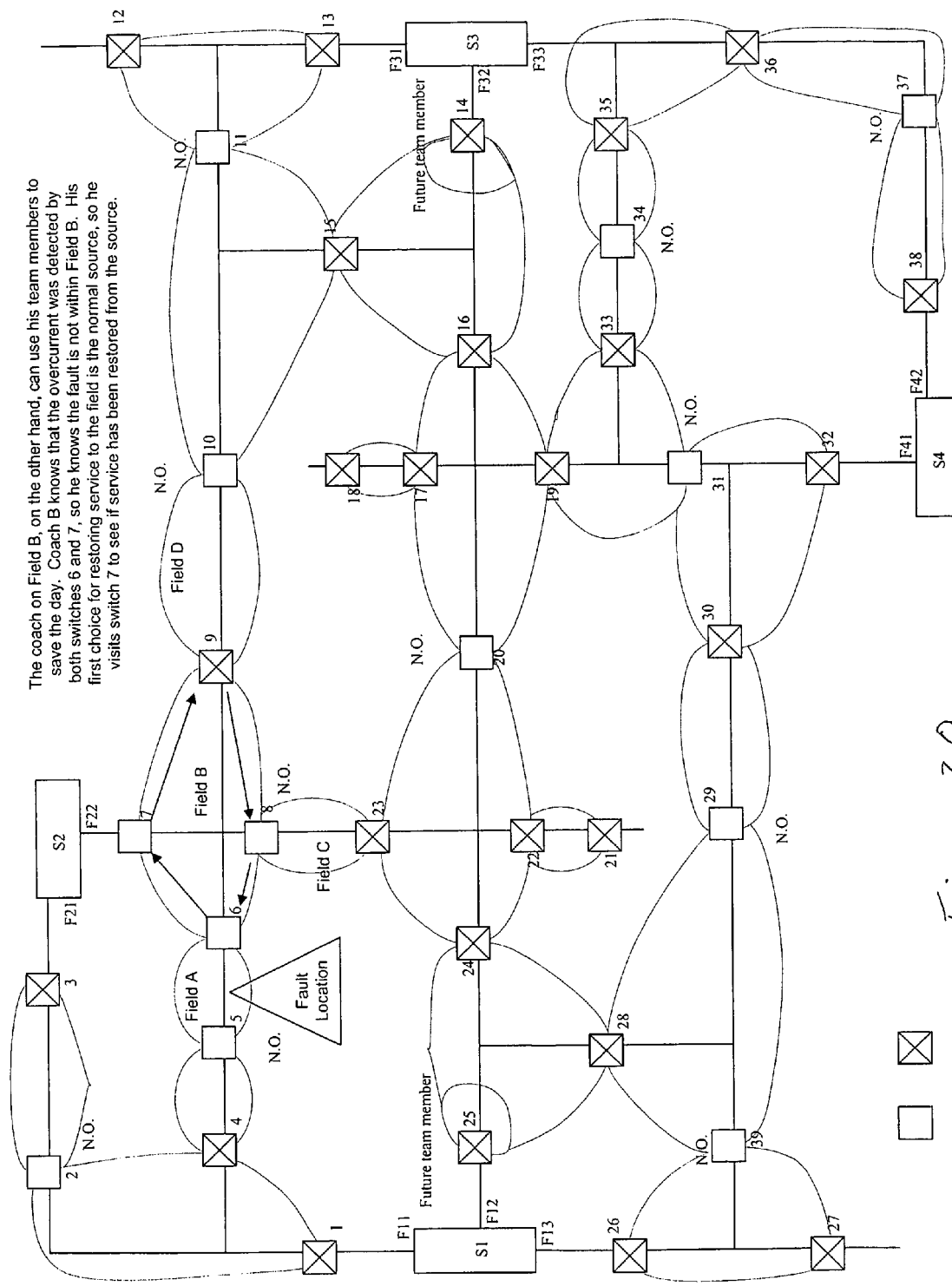

FIG. 20: The coach on Field B, on the other hand, can use his team members to save the day. Coach B knows that the overcurrent was detected by both switches 6 and 7, so he knows the fault is not within Field B. His first choice for restoring service to the field is the normal source, so he visits switch 7 to see if service has been restored from the source.

Figure 21:
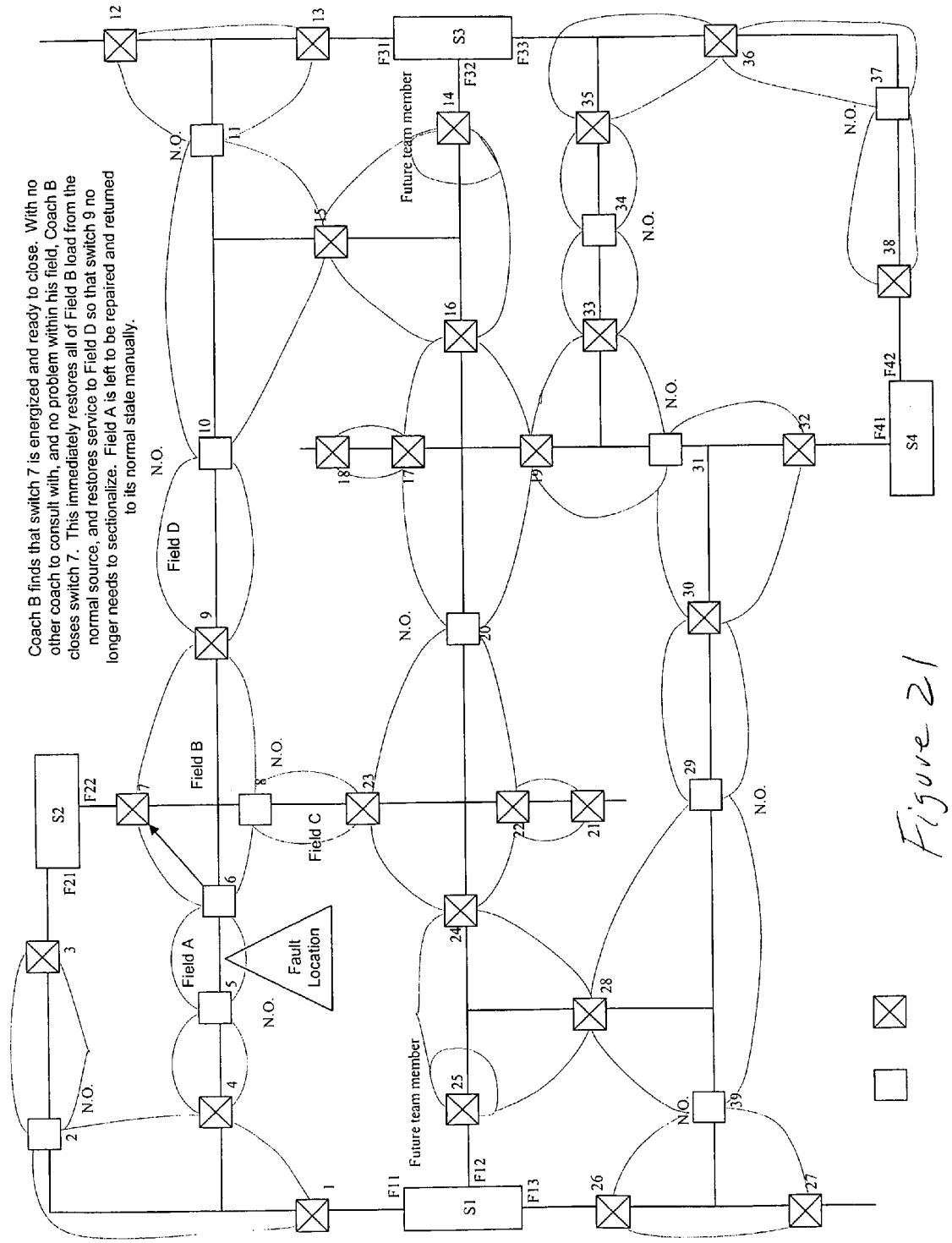

FIG. 21: Coach B finds that switch 7 is energized and ready to close. With no other coach to consult with, and no problem within his field, Coach B closes switch 7. This immediately restores all of Field B load from the normal source, and restores service to Field D so that switch 9 no longer needs to sectionalize. Field A is left to be repaired and returned to its normal state manually.

In accordance with important aspects of the present invention and referring now additionally to FIG. 22, described therein is an illustrative flow diagram that may be employed and representative of typical operations performed by the present invention of FIGS. 12-15 at a single team member or player. The various tasks called out therein are performed only while a coach is present. In this way, the coach can supervise the process and also leave after a suitable visit time with updated global data including an updated events list. Some of the basic functional requirements applicable to and achieved by the transfer tasks of this flow diagram include:

1—The switch shall only close, if all automatic-mode switches are opened. Each field is only responsible for seeking its source. All switches in a field must be opened, to conform with the "transfer" method of allocating one fields' load at a time, to a source. However, non-automatic-mode switches in the field may be closed, because of user action. In this case, the field shall add this switches' "other" field" load to the field's load requirements. If any Source switch trips open due to sectionalizing or to loss of source(extended volt loss) then all switches in that field will trip open, since the sectionalizing logic will trip open all switches downstream of the faulted switch. Therefore, if an overcurrent fault occurs within the field or upstream of the field, the source switch will trip open on this fault. Since all other field nodes are downstream of this fault, they will trip open through sectionalizing logic. An extended Loss of Energy timer condition (LOE) also causes switches to be opened through a process called accelerated tripping.

*Therefore, if the field loses source, then all switches are positioned open for a transfer of source, excepting the manually closed (non DAT-auto-mode) switches.

2—A switch shall close only its negotiated-source switch. Reason: the load switches are closed by their field's Coach after a negotiation process.

3—The switch shall only close if the following conditions are true:

a. no error conditions exist and the requesting field isn't faulted. The Coach should check the latter condition; this is a double check. Obviously, the logic should seek a source if it is faulted.

b. all switches in the field are open (non-automatic nodes are ignored)

c. the field granting the source isn't open due to a overcurrent sectionalizing condition, within the field; this is checked by determining if the switch has energy (voltage).

d. the Coach of the field granting this source is present and the Coach of the requesting field is also present. This ensures synchronized access to this field's ampacity allocation. Because this task has control of the processor, that Coach can't move on to another, until this task is complete e. the field granting the source has sufficient capacity within that field's local and global restrictions and the granting field can allocate a line segment from the circuit's spare pool.

Considering the Return to Normal Process tasks as shown in the flow chart of FIG. 22, some of the basic functional requirements (i.e. rule set) applicable to and achieved by the transfer tasks of this flow diagram include:

Two events causing a Return To Normal process:

1) A Coach attempts to restore an open switch state to its previous close state, after detecting voltage present, following the expiration of a Loss of Energy timer.

2) A Lineman or SCADA operator closes one of two open switches that bracket a faulted line segment—this cause the other open switch to seek an Return To Normal, since it should be closed, yet it is energized, with no fault present.

In both cases, the software must close the switch AND open the normally open switch that must exist between the switch and its present source. This requires travel to the normally open switch to either open it (open transition) or set a timer to open it (close transition), and then travel back to the switch requiring a close to close it. And then travel back to the normally open switch to open it and cancel the timer. The travel direction will always be towards the present source, when traveling to the normally open switch and towards the RTN source when traveling to the switch that desires a close. So, first travel in the present source direction to the normally open switch, by selecting this switch's field that doesn't have this switch as its source switch; this must be the source field of the switch's "source switch" field.

In accordance with important aspects of the present invention and referring now additionally to FIGS. 23-55, there is depicted representations of system operation and response of the present invention to the loss of a substation identified as S1, e.g. due to transmission failure. The following notes apply to explaining the system response:

General Notes:

Notes on Coach Management

A coach has a coach ID number and an incrementing visit counter. Normally the coach roams the field at will. He must visit every team member in a prescribed period of time though. If he arrives at a team member that has already received that ID and visit counter (the counter must be greater than the last if the ID is the same), the coach assumes he is a duplicate and dies. If the coach arrives to find another coach with a higher ID has visited, again, this coach dies. If a team member does not hear from the coach within a prescribed period (2× the visit time), that team member can spawn a new coach with an ID number one higher than the last coach he heard from, and a new visit counter. The new coach must determine the state of the field and begin to take action if necessary.

Notes on Event Initiation

When an event begins, any team member that has witnessed the event may call out to the coach and the other team members within that field. This call includes a sequence number, the nature of the event, and which team member made the call. Each team member contains a process that continually monitors for these calls. If the call is to restore service to the local field, the coach must first visit the other normally closed team members to verify that they are open. Then he will move to normally open switches that can be used to restore service, going to the First Alternate if configured. If the call is to allow service to be restored to an adjacent field, the coach will immediately move to the calling team member.

Notes on Loading Restrictions

The decision to restore a field (circuit segment) based only on loading will be done without prior contract for those resources. The criteria will be the available ampacity of the feeder, updated as the reconfiguration progresses, and any restrictions placed on a field due to wire size or other limiting factors. The lesser of the two will be used. Note that the loading information is assumed to be up to date and accurate. This method does not prevent the overloading of a circuit when disjoint fields (such as on a bifurcated circuit) assume the loading information is correct, and both close to restore independent loads at the same time, or near to the same time.

Notes on Segment Restrictions

The decision to restore a field when a segment restriction has been configured requires prior contract for the resource. This involves setting a simple lock if the adjacent field is the field with the segment restriction. If the field with the segment restriction is further toward the source, a coach may need to daisy chain, possibly through more than one field, down to field with the restriction in order to verify the resource still exists. He may then secure a contract for the resource. This may add time to the restoration process, but is necessary to prevent the overload of a feeder.

Notes on Return to Normal

The configuration of open or closed transition back to normal is an attribute of an individual team member.

Fields with no normally open switches do not get configured for open or closed transitions at all. They must follow the needs of the adjacent fields.

During a return to normal sequence, a normally closed switch between fields where an open transition will be required will remain closed. It will relay the RTN request, become deenergized, and relay the go-ahead message back before finally being reenergized from the normal source.

During a return to normal sequence, a normally open switch that is configured to use a closed transition, but is presently limited by another switch requiring an open transition, will reopen immediately. This is the appropriate action since the source side field will be deenergized anyway when the open transition switch opens. It will also allow the source side field to complete its RTN operation sooner.

Figure 24:
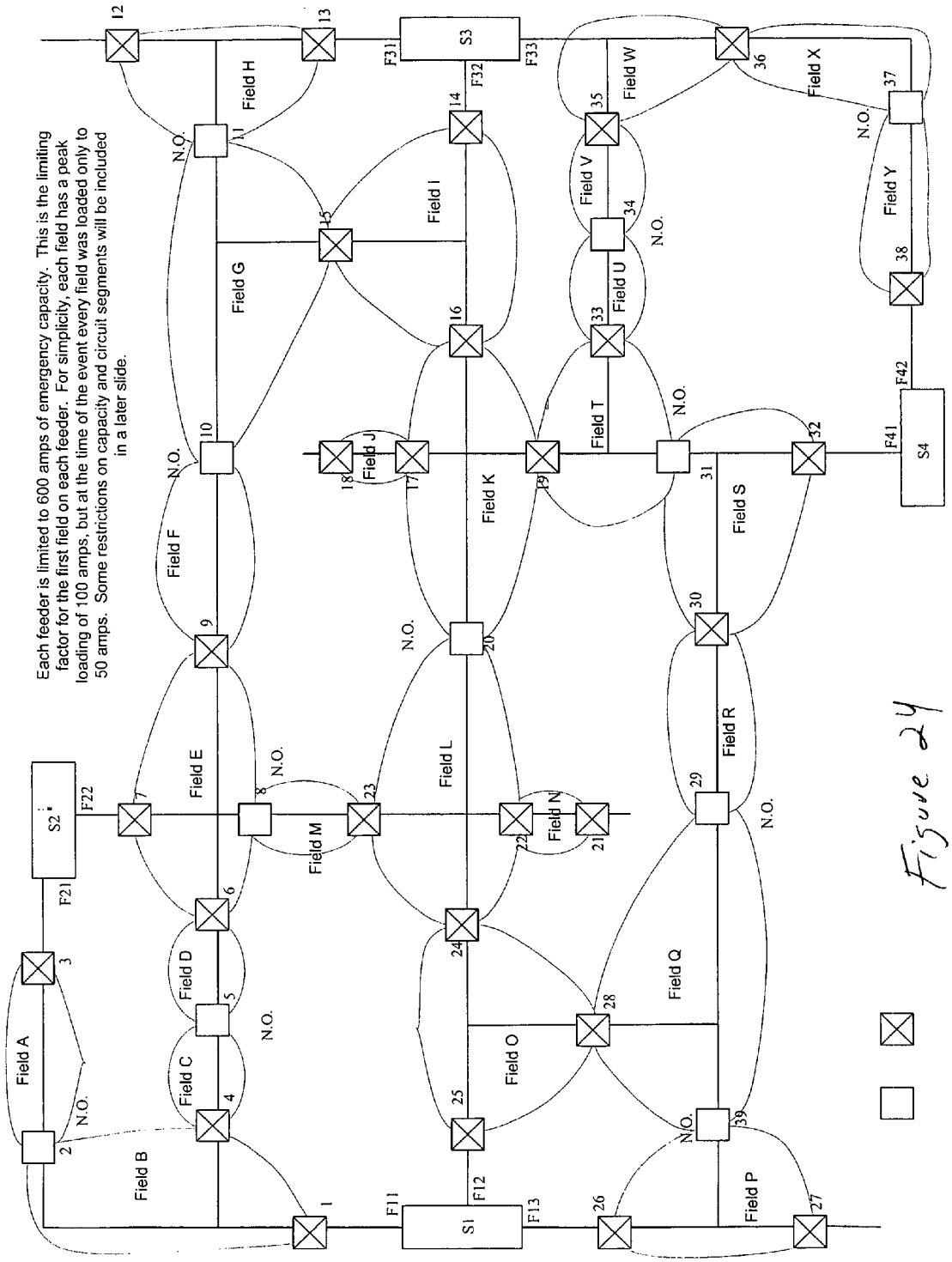

Specific Notes on FIGS. 24-55:

FIG. 24: Each feeder is limited to 600 amps of emergency capacity. This is the limiting factor for the first field on each feeder. For simplicity, each field has a peak loading of 100 amps, but at the time of the event every field was loaded only to 50 amps. Some restrictions on capacity and circuit segments will be included in a later Figure.

Figure 25:
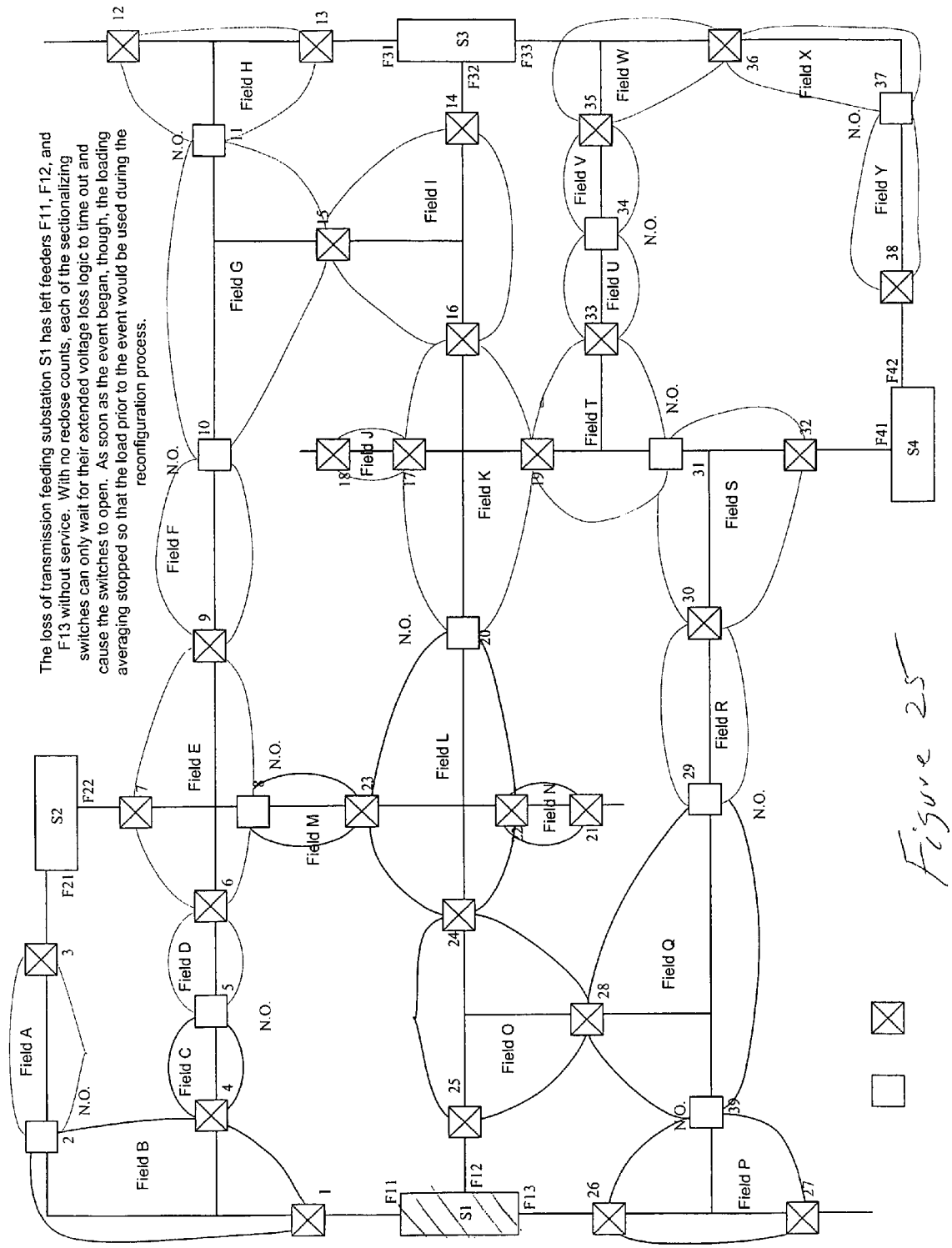

FIG. 25: The loss of transmission feeding substation S1 has left feeders F11, F12, and F13 without service. With no reclose counts, each of the sectionalizing switches can only wait for their extended voltage loss logic to time out and cause the switches to open. As soon as the event began, though, the loading averaging stopped so that the load prior to the event would be used during the reconfiguration process.

Figure 26:
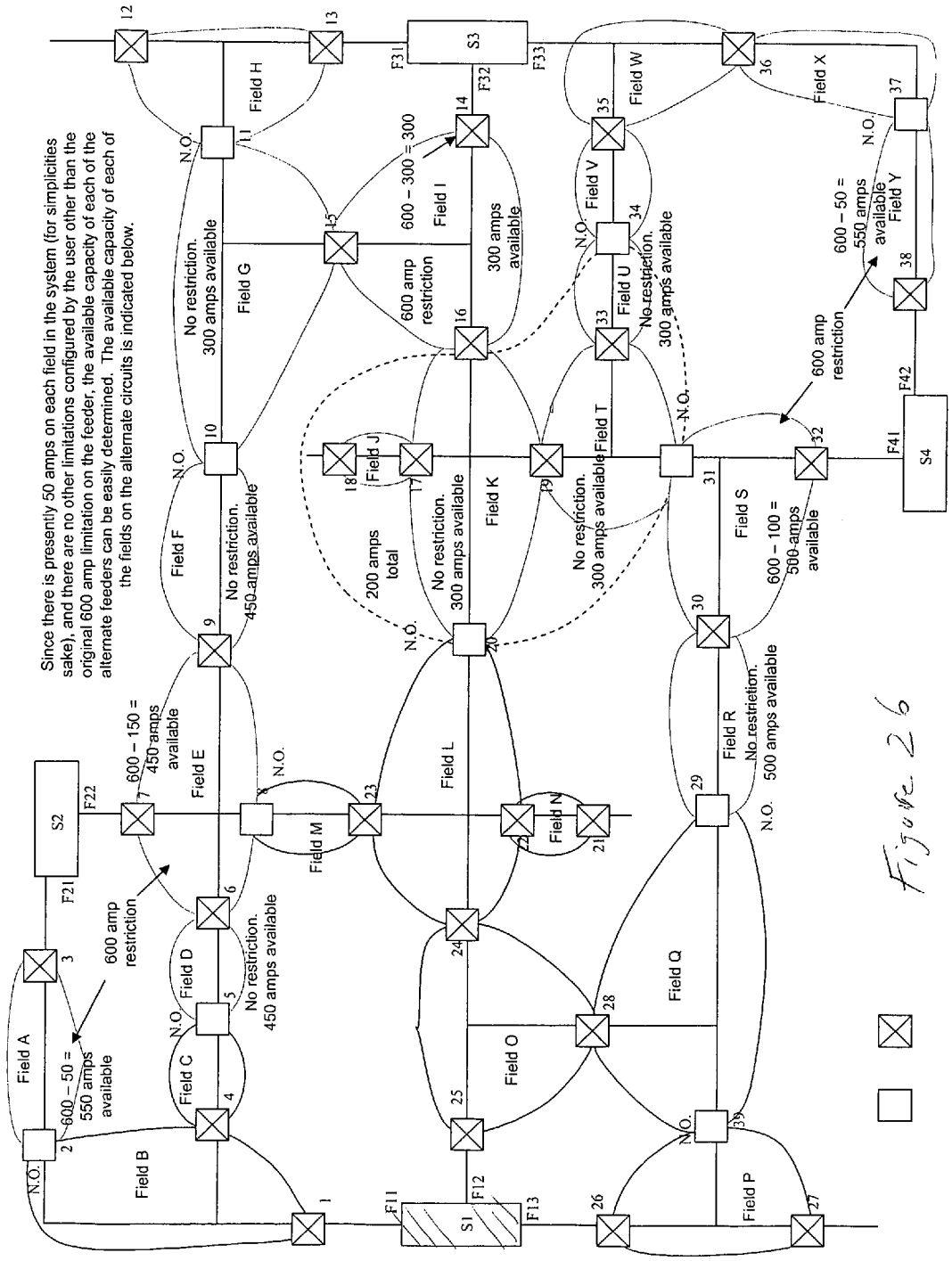

FIG. 26: Since there is presently 50 amps on each field in the system (for simplicities sake), and there are no other limitations configured by the user other than the original 600 amp limitation on the feeder, the available capacity of each of the alternate feeders can be easily determined. The available capacity of each of the fields on the alternate circuits is indicated below.

Figure 27:
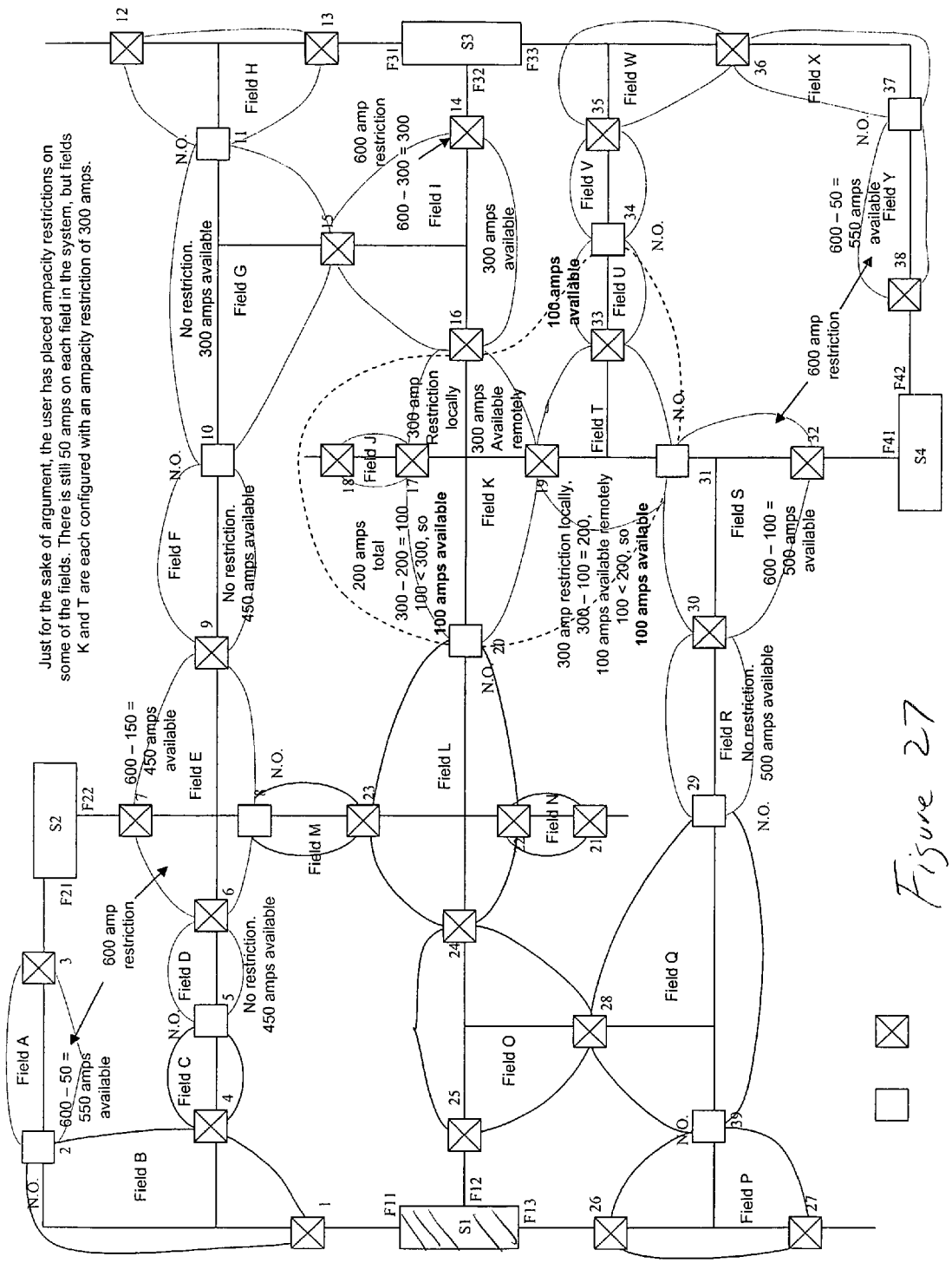

FIG. 27: For illustrative purposes, assume that the user has placed ampacity restrictions on some of the fields. There is still 50 amps on each field in the system, but fields K and T are each configured with an ampacity restriction of 300 amps.

Figure 28:
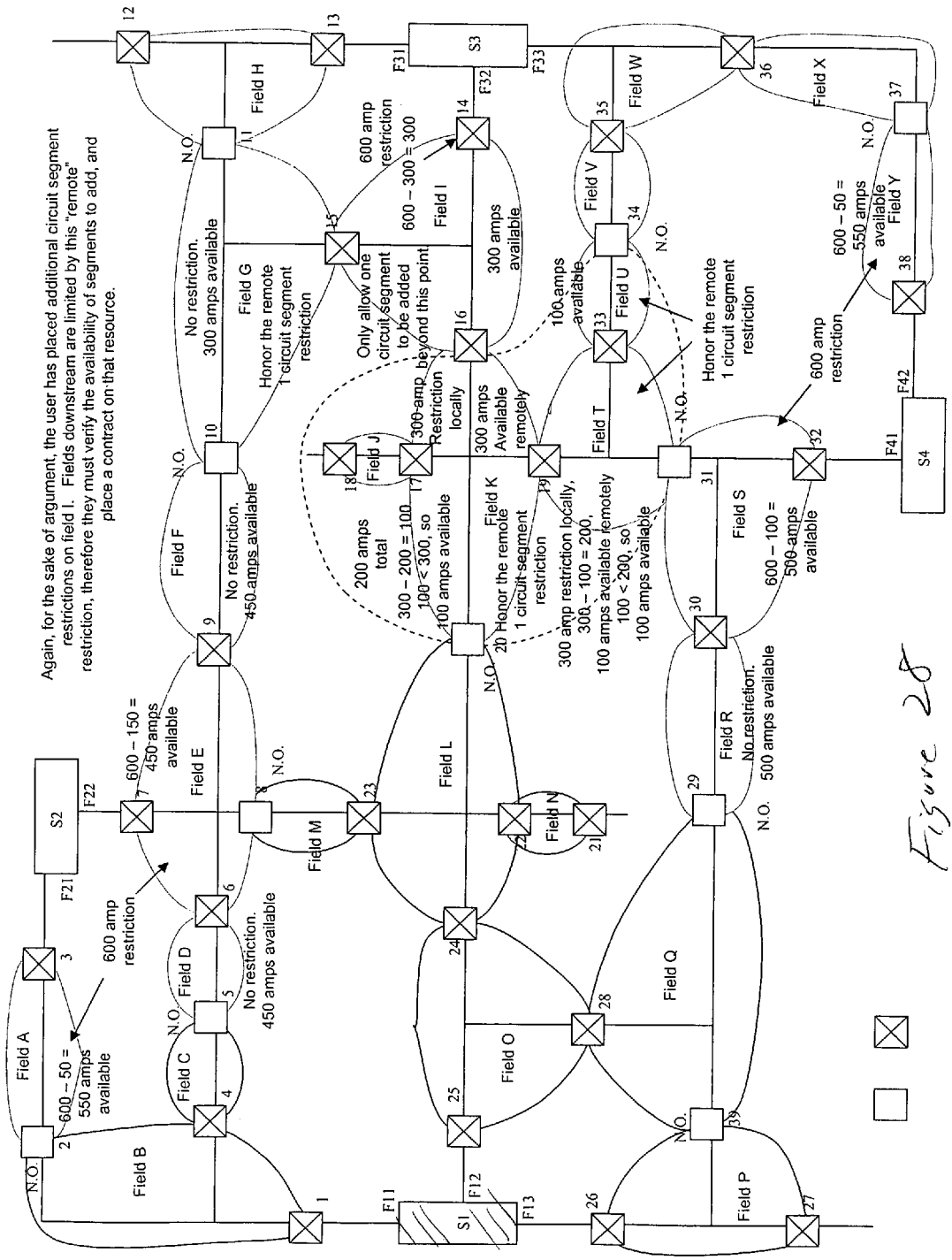

FIG. 28: Also for illustrative purposes, assume that the user has placed additional circuit segment restrictions on field 1. Fields downstream are limited by this "remote" restriction, therefore they must verify the availability of segments to add, and place a contract on that resource.

Figure 29:
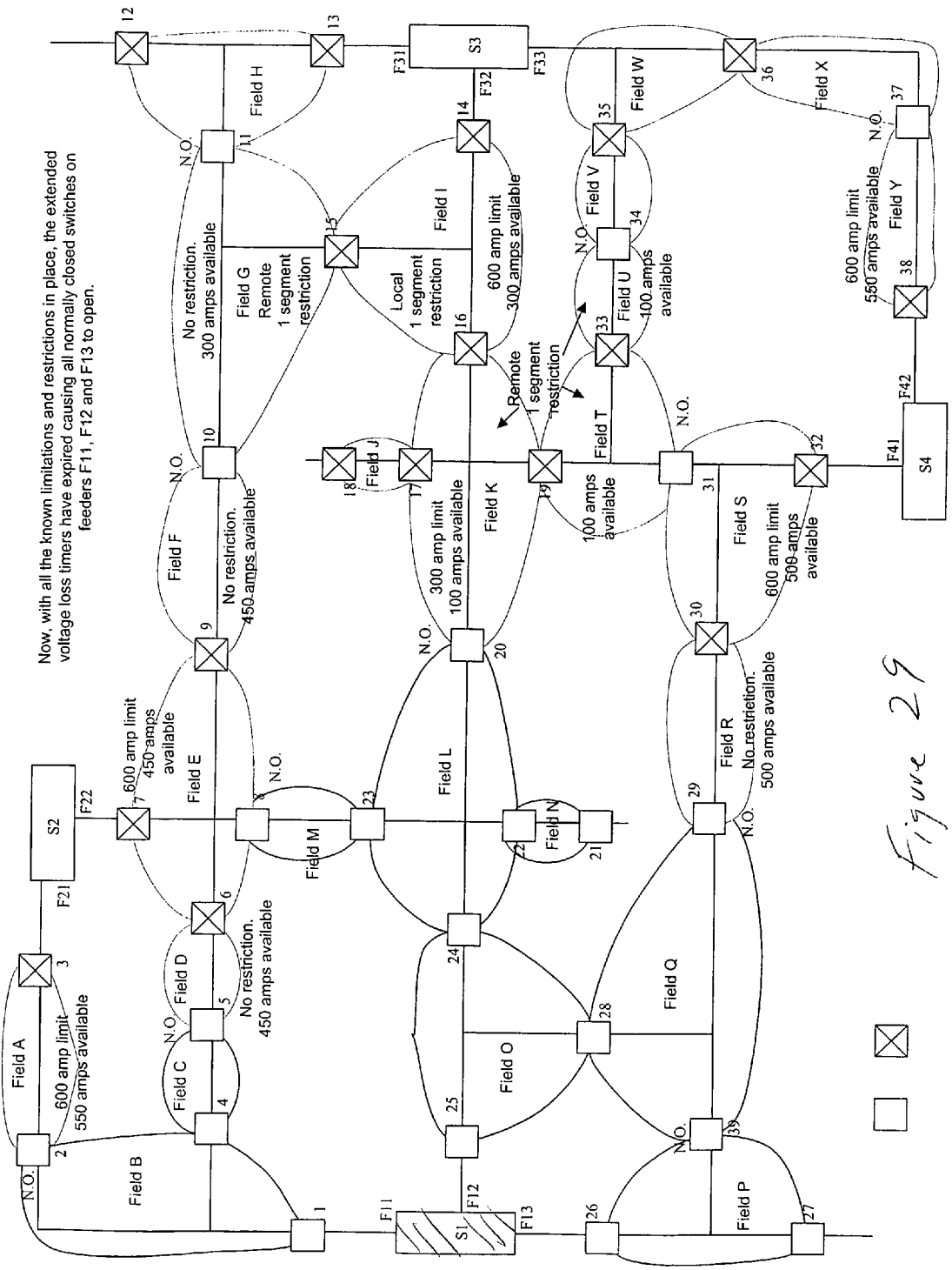

FIG. 29: Based on the foregoing, the extended voltage loss timers have expired causing all normally closed switches on feeders F11, F12 and F13 to open.

Figure 30:
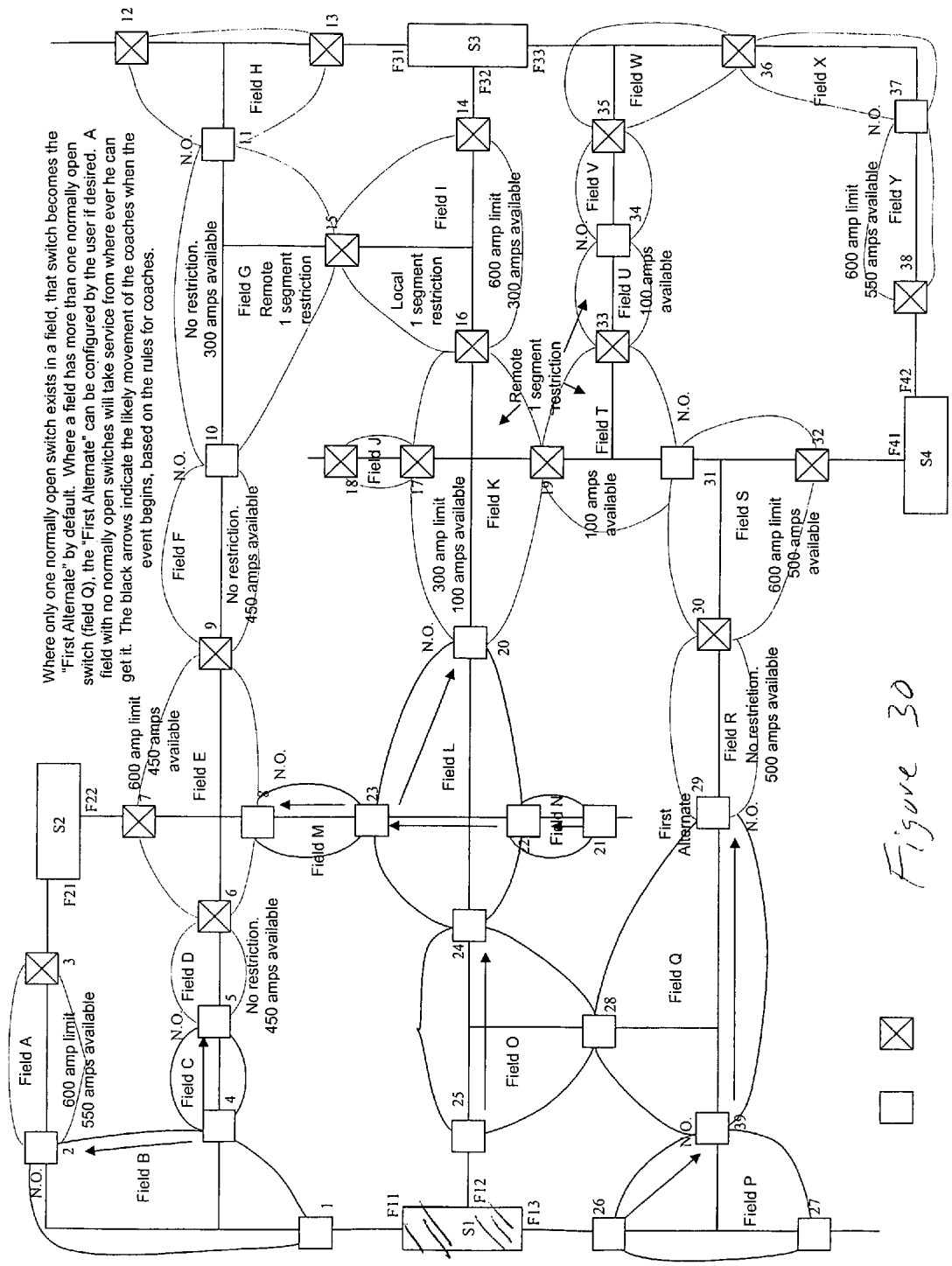

FIG. 30: Where only one normally open switch exists in a field, that switch becomes the "First Alternate" by default. Where a field has more than one normally open switch (field Q), the "First Alternate" can be configured by the user if desired. A field with no normally open switches will take service from where ever he can get it. The arrows indicate the likely movement of the coaches when the event begins, based on the rules for coaches.

Figure 31:
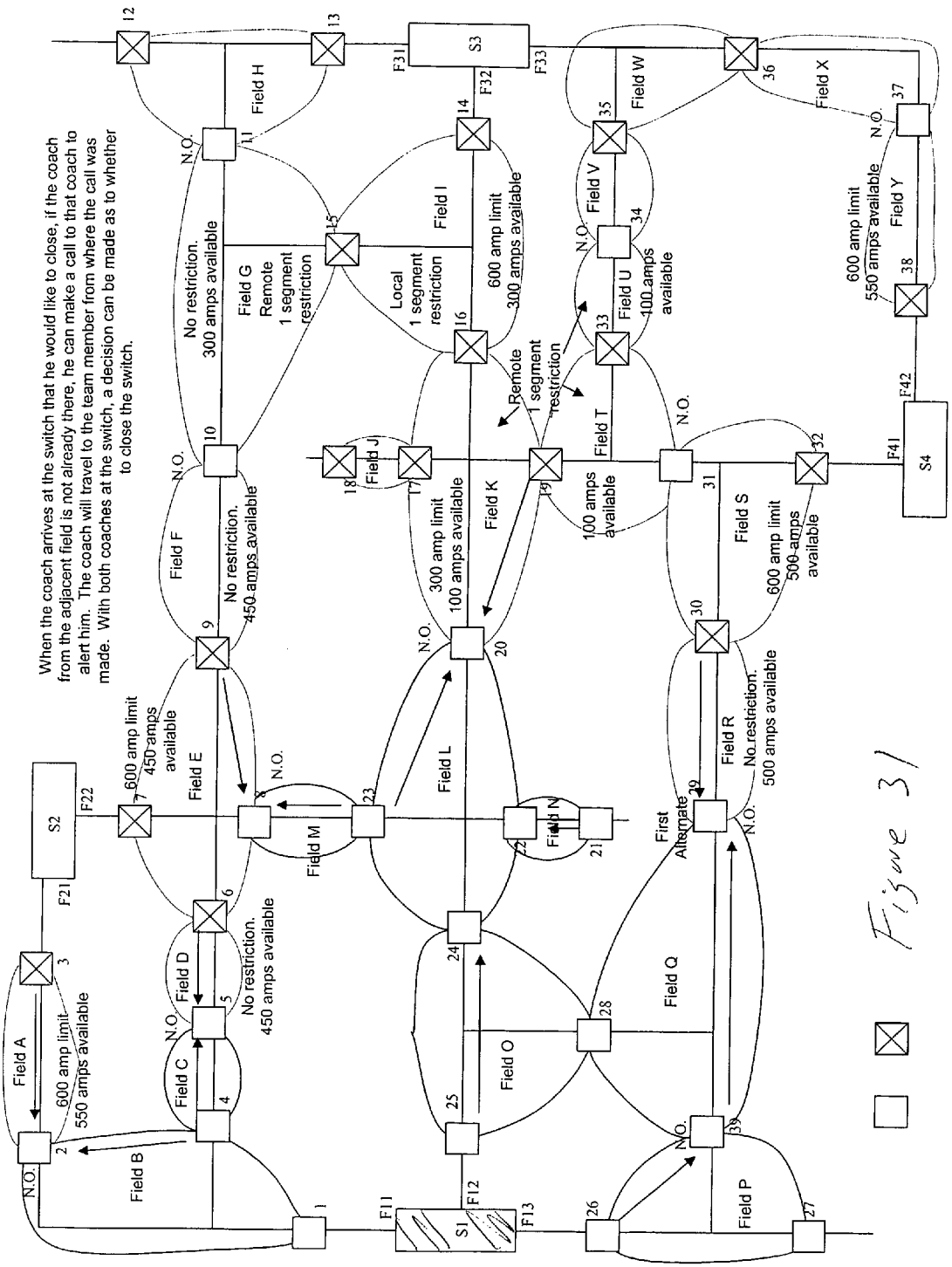

FIG. 31: When the coach arrives at the switch that he would like to close, if the coach from the adjacent field is not already there, he can make a call to that coach to alert him. The coach will travel to the team member from where the call was made. With both coaches at the switch, a decision can be made as to whether to close the switch.

Figure 32:
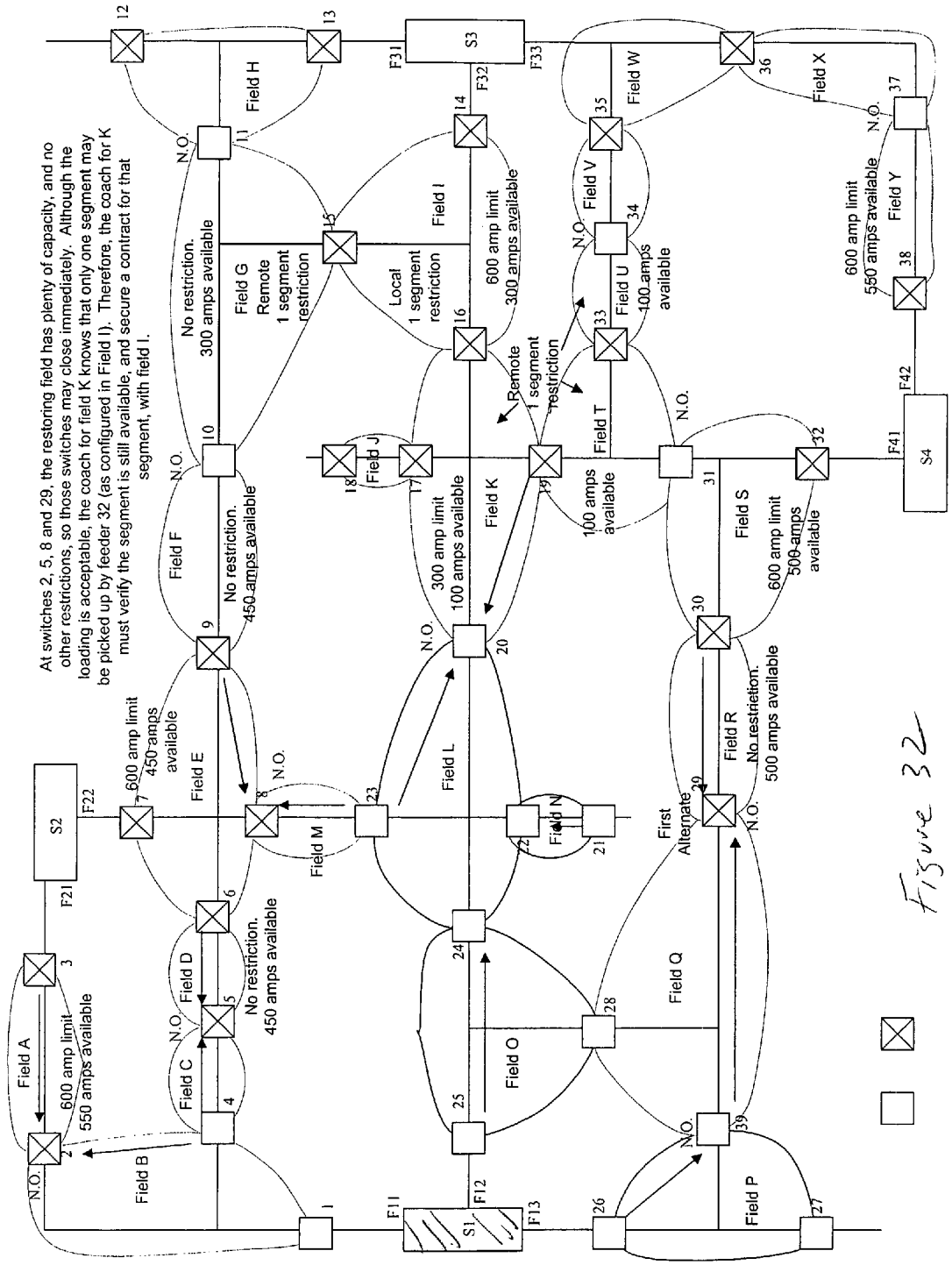

FIG. 32: At switches 2, 5, 8 and 29, the restoring field has plenty of capacity, and no other restrictions, so those switches may close immediately. Although the loading is acceptable, the coach for field K knows that only one segment may be picked up by feeder 32 (as configured in Field I). Therefore, the coach for K must verify the segment is still available, and secure a contract for that segment, with field 1.

Figure 33:
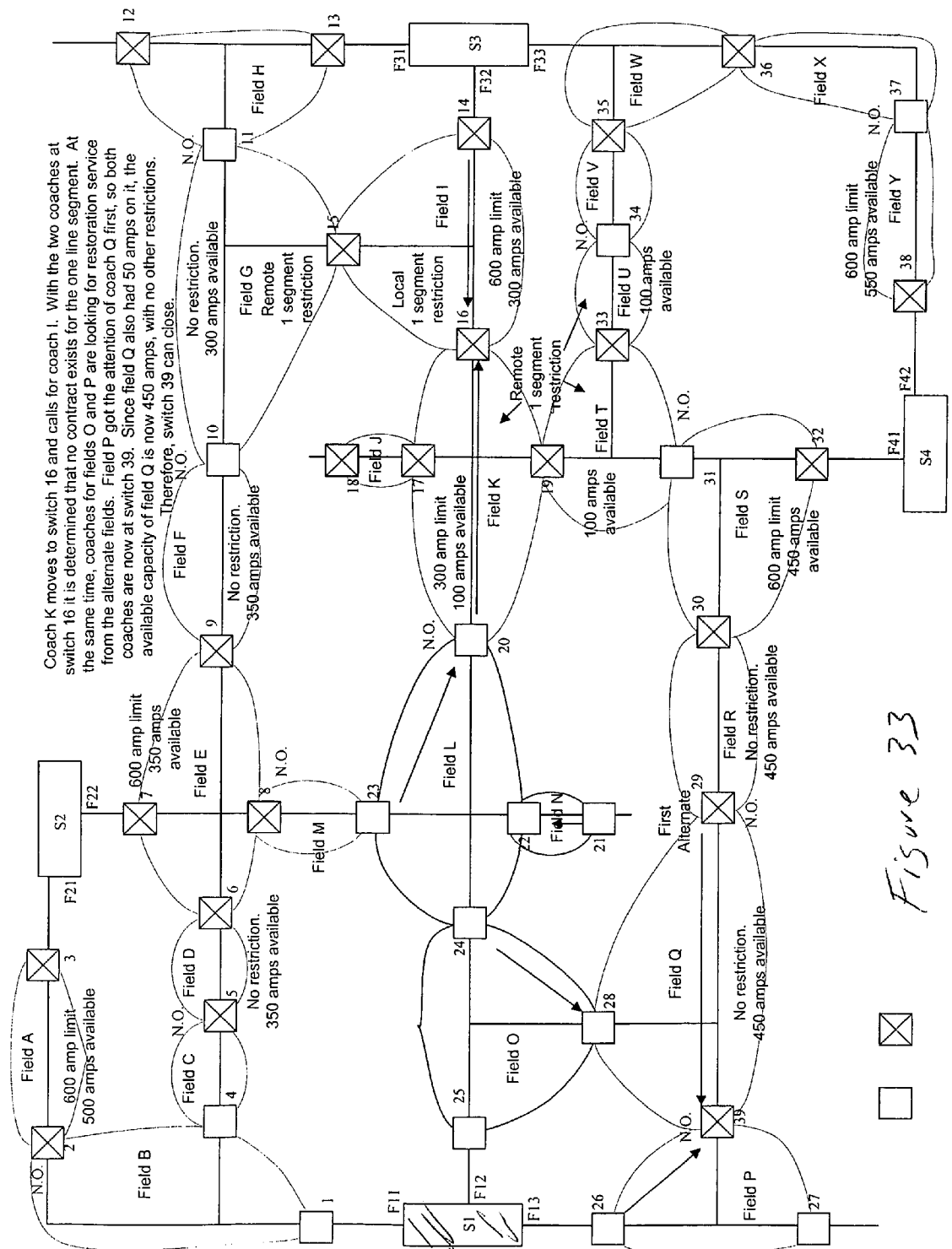

FIG. 33: Coach K moves to switch 16 and calls for coach 1. With the two coaches at switch 16 it is determined that no contract exists for the one line segment. At the same time, coaches for fields O and P are looking for restoration service from the alternate fields. Field P got the attention of coach Q first, so both coaches are now at switch 39. Since field Q also had 50 amps on it, the available capacity of field Q is now 450 amps, with no other restrictions. Therefore, switch 39 can close.

Figure 34:
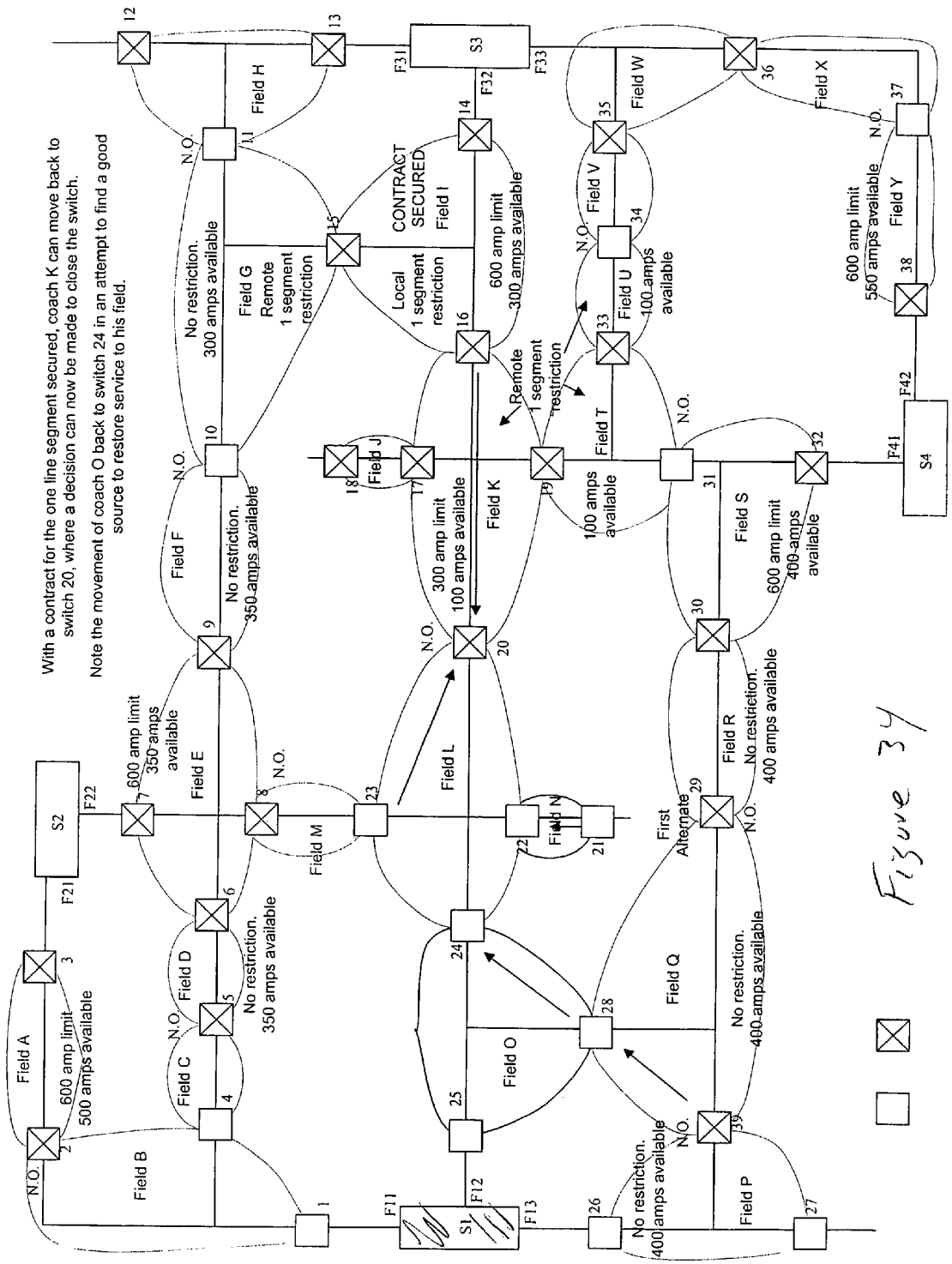

FIG. 34: With a contract for the one line segment secured, coach K can move back to switch 20, where a decision can now be made to close the switch. Note the movement of coach O back to switch 24 in an attempt to find a good source to restore service to his field.

Figure 35:
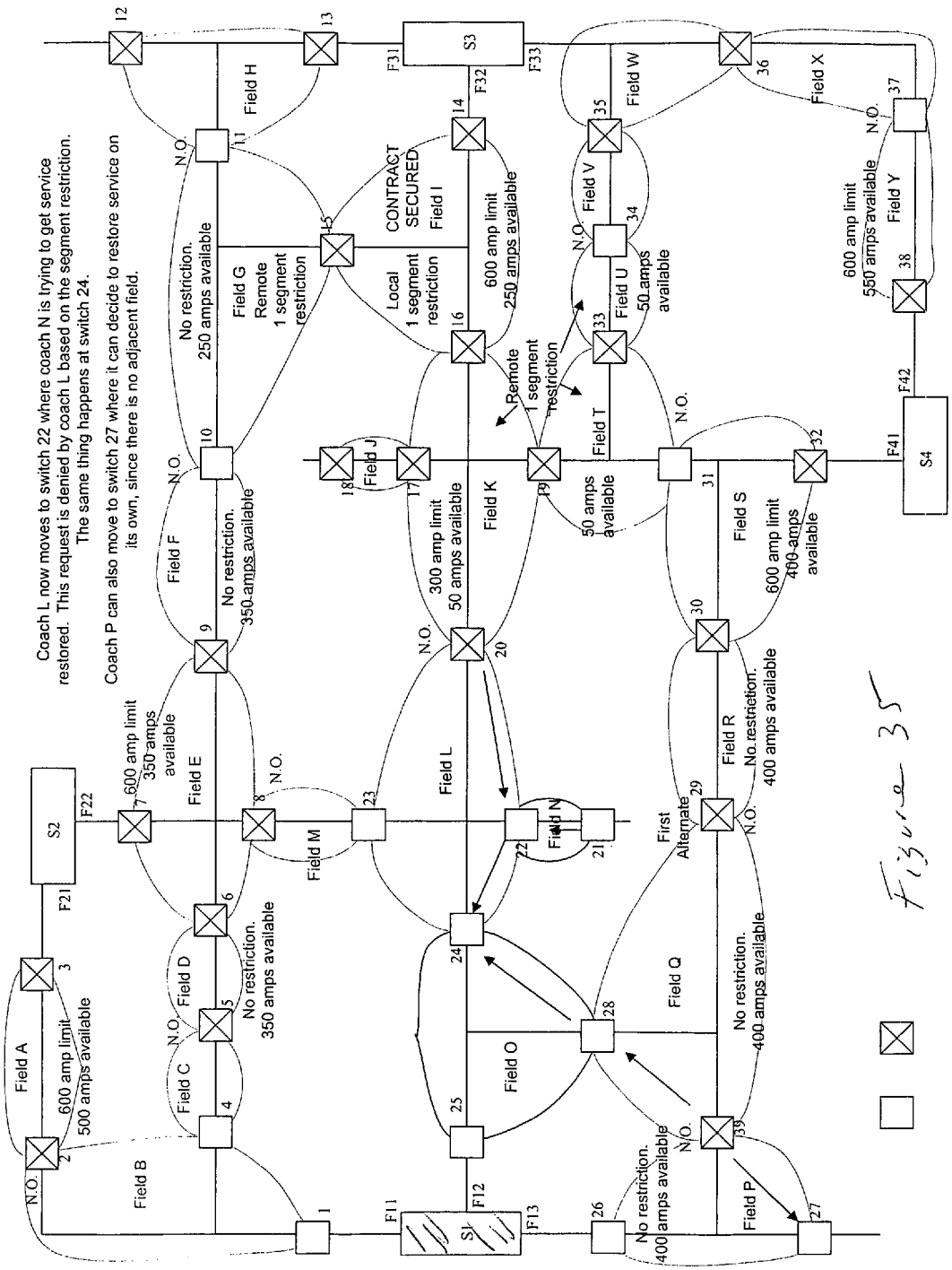

FIG. 35: Coach L now moves to switch 22 where coach N is trying to get service restored. This request is denied by coach L based on the segment restriction. The same thing happens at switch 24. Coach P can also move to switch 27 where it can decide to restore service on its own, since there is no adjacent field.

Figure 36:
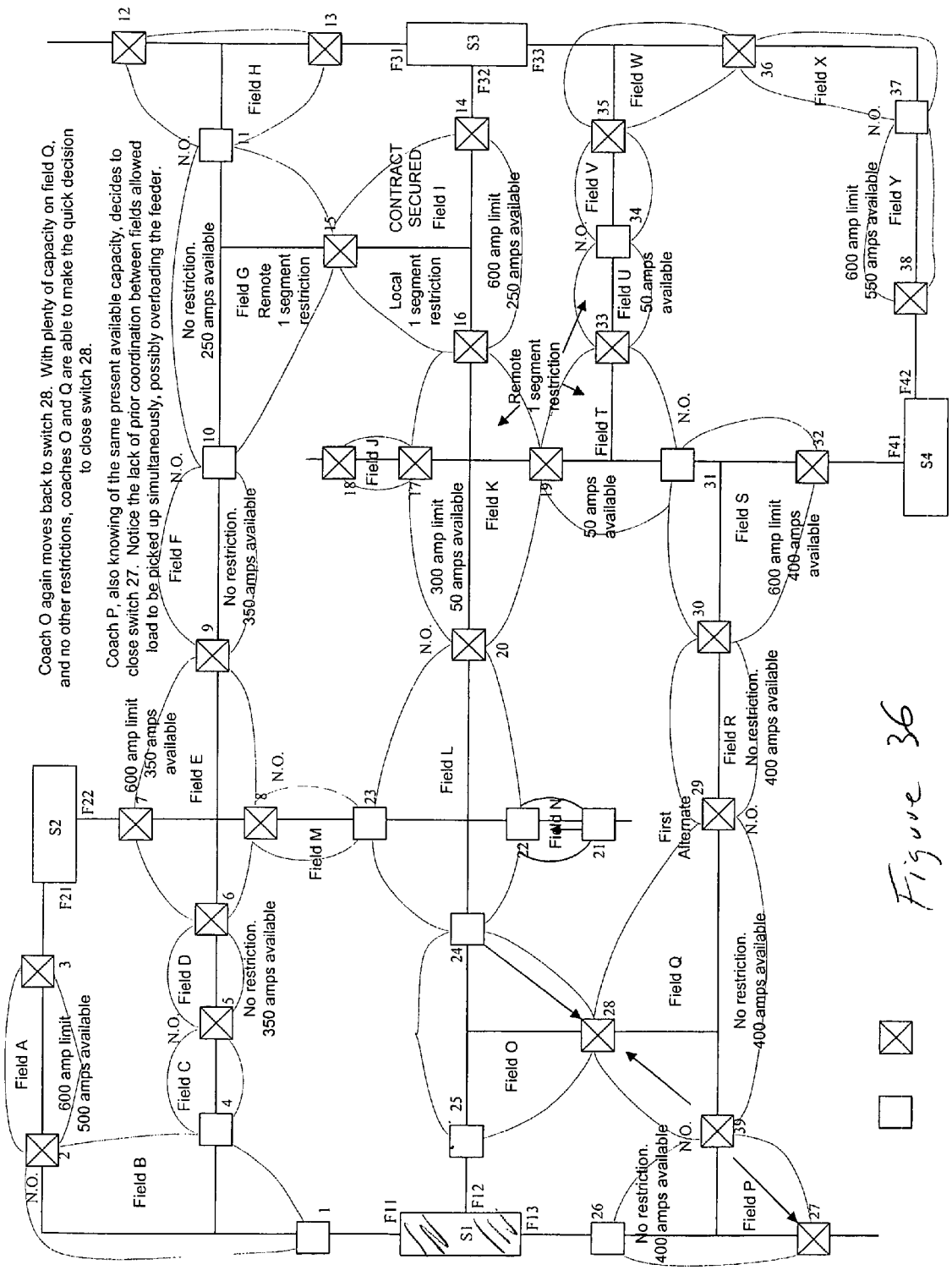

FIG. 36: Coach O again moves back to switch 28. With plenty of capacity on field Q, and no other restrictions, coaches O and Q are able to make the quick decision to close switch 28.

Coach P, also knowing of the same present available capacity, decides to close switch 27. Notice the lack of prior coordination between fields allowed load to be picked up simultaneously, possibly overloading the feeder.

Figure 37:
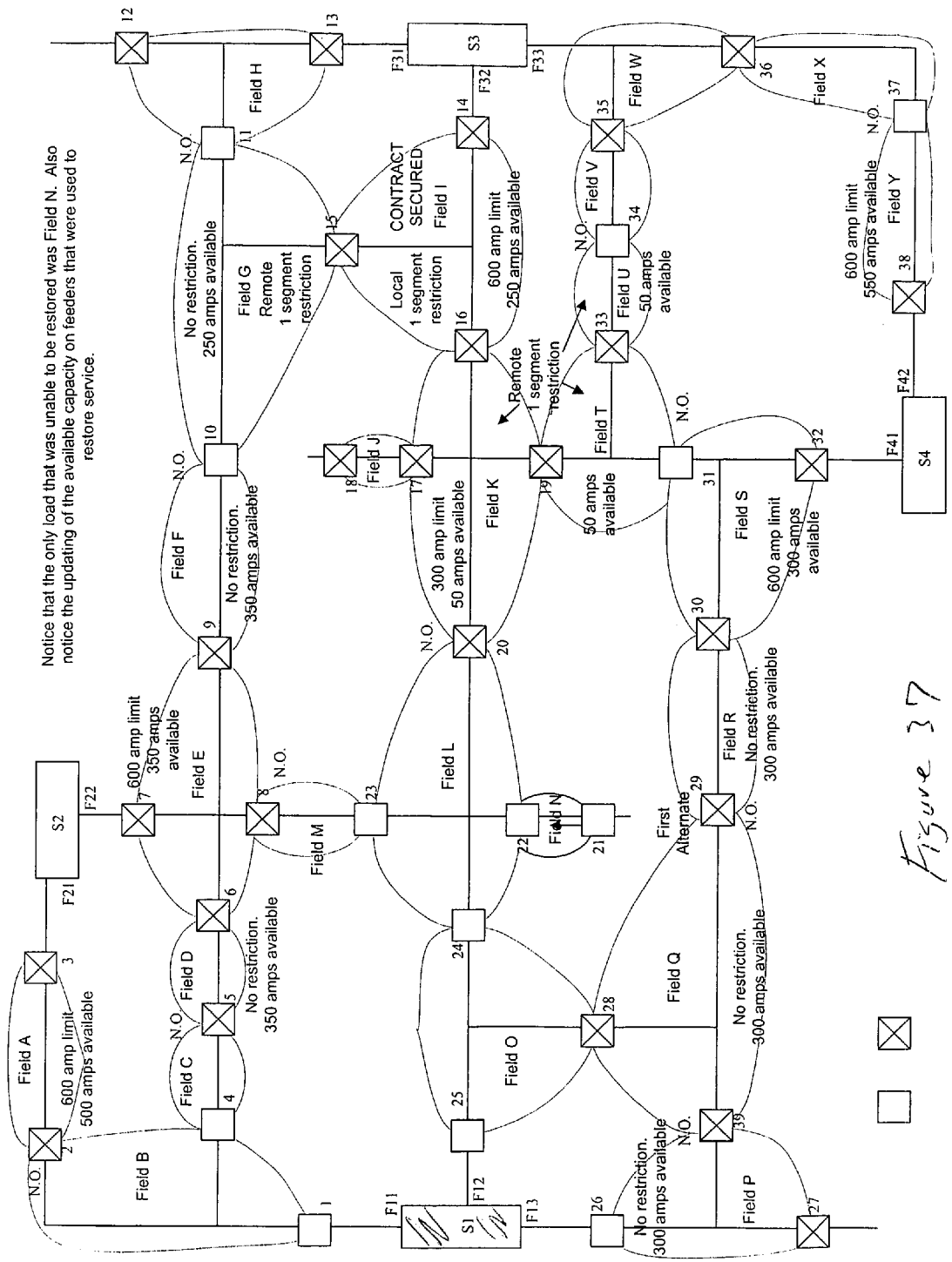

FIG. 37: Notice that the only load that was unable to be restored was Field N. Also notice the updating of the available capacity on feeders that were used to restore service.

Figure 38:
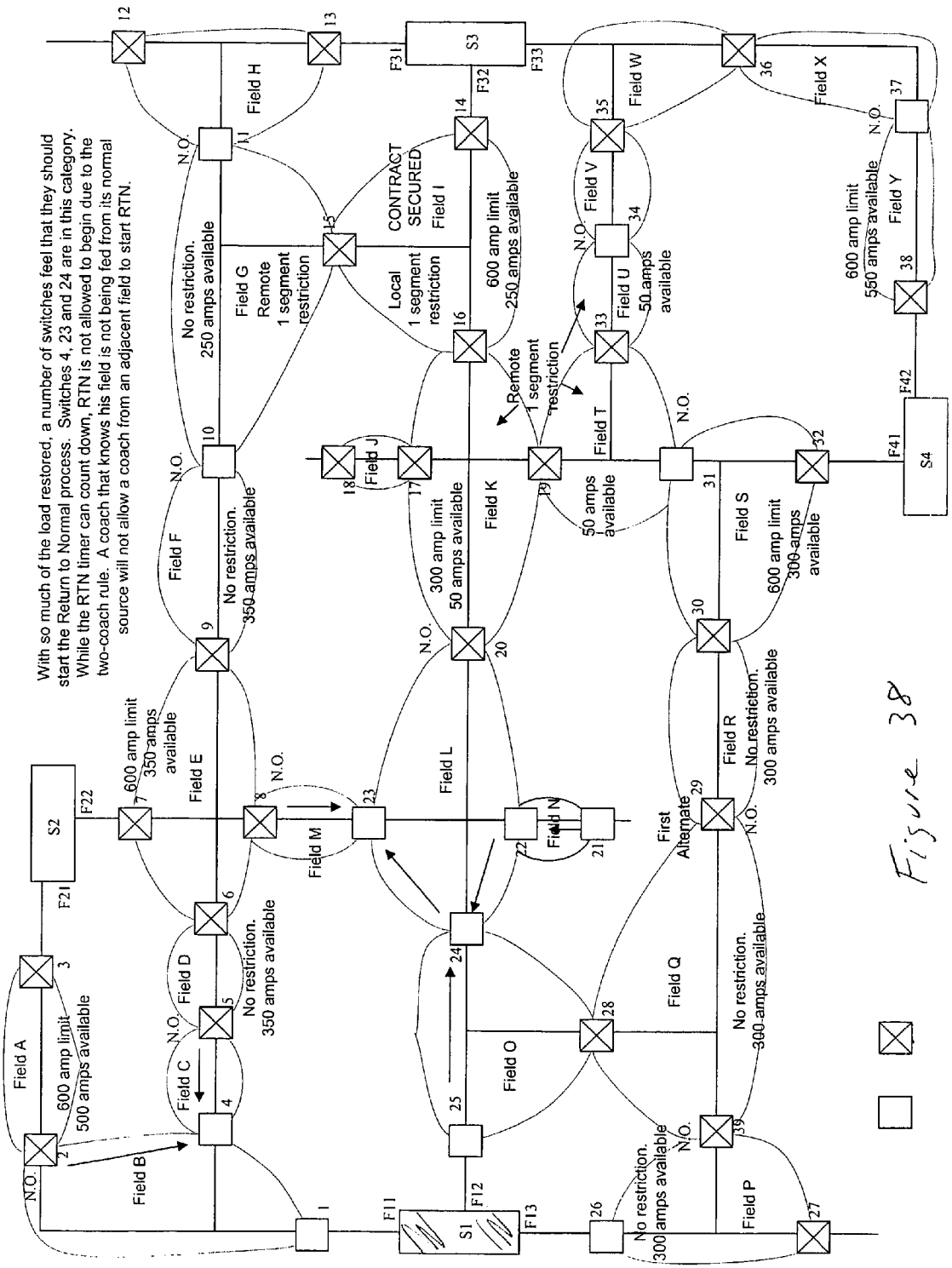

FIG. 38: With so much of the load restored, a number of switches feel that they should start the Return to Normal process. Switches 4, 23 and 24 are in this category. While the RTN timer can count down, RTN is not allowed to begin due to the two-coach rule. A coach that knows his field is not being fed from its normal source will not allow a coach from an adjacent field to start RTN.

Figure 39:
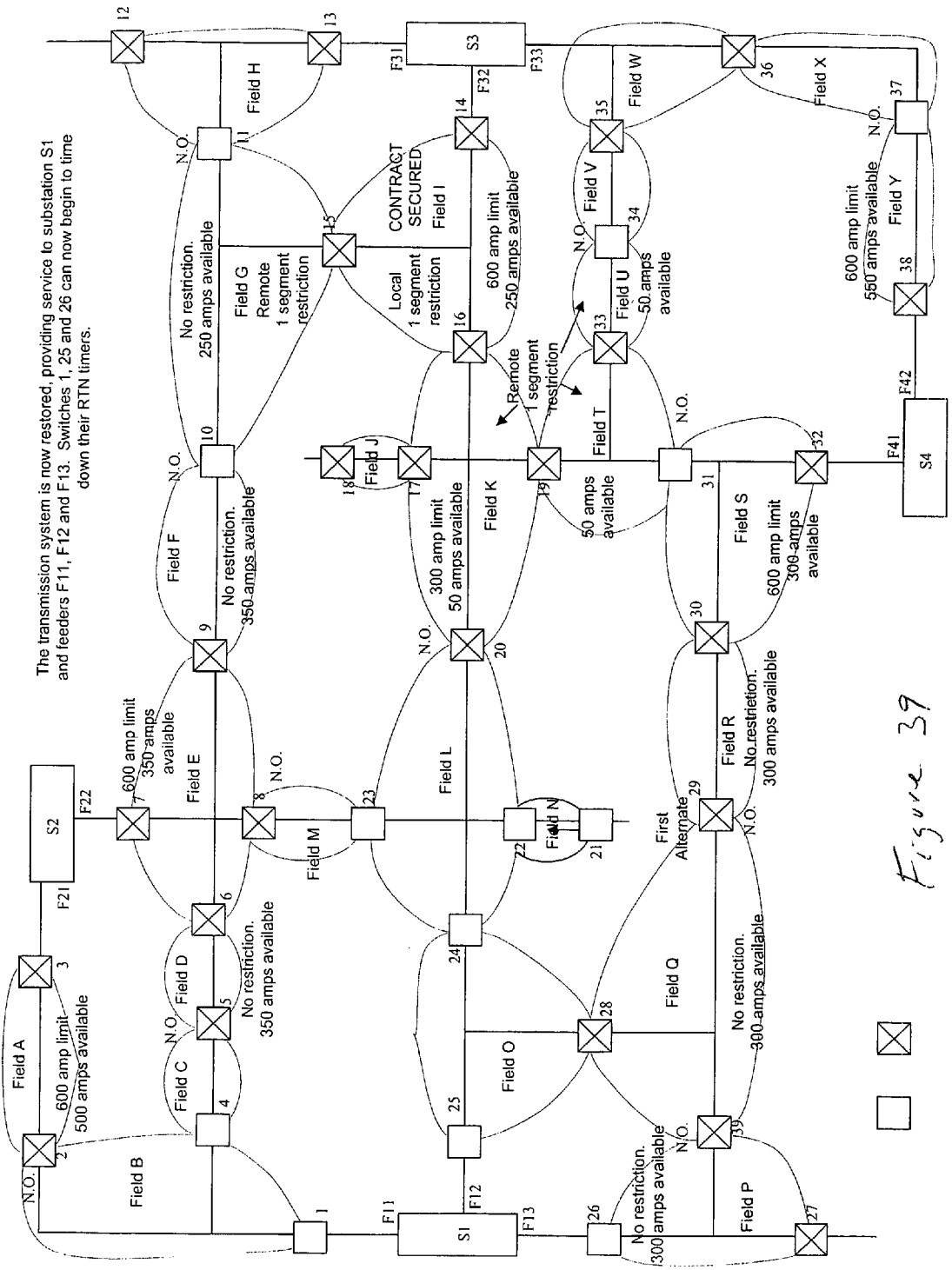

FIG. 39: The transmission system is now restored, providing service to substation S1 and feeders F11, F12 and F13. Switches 1, 25 and 26 can now begin to time down their RTN timers.

Figure 40:
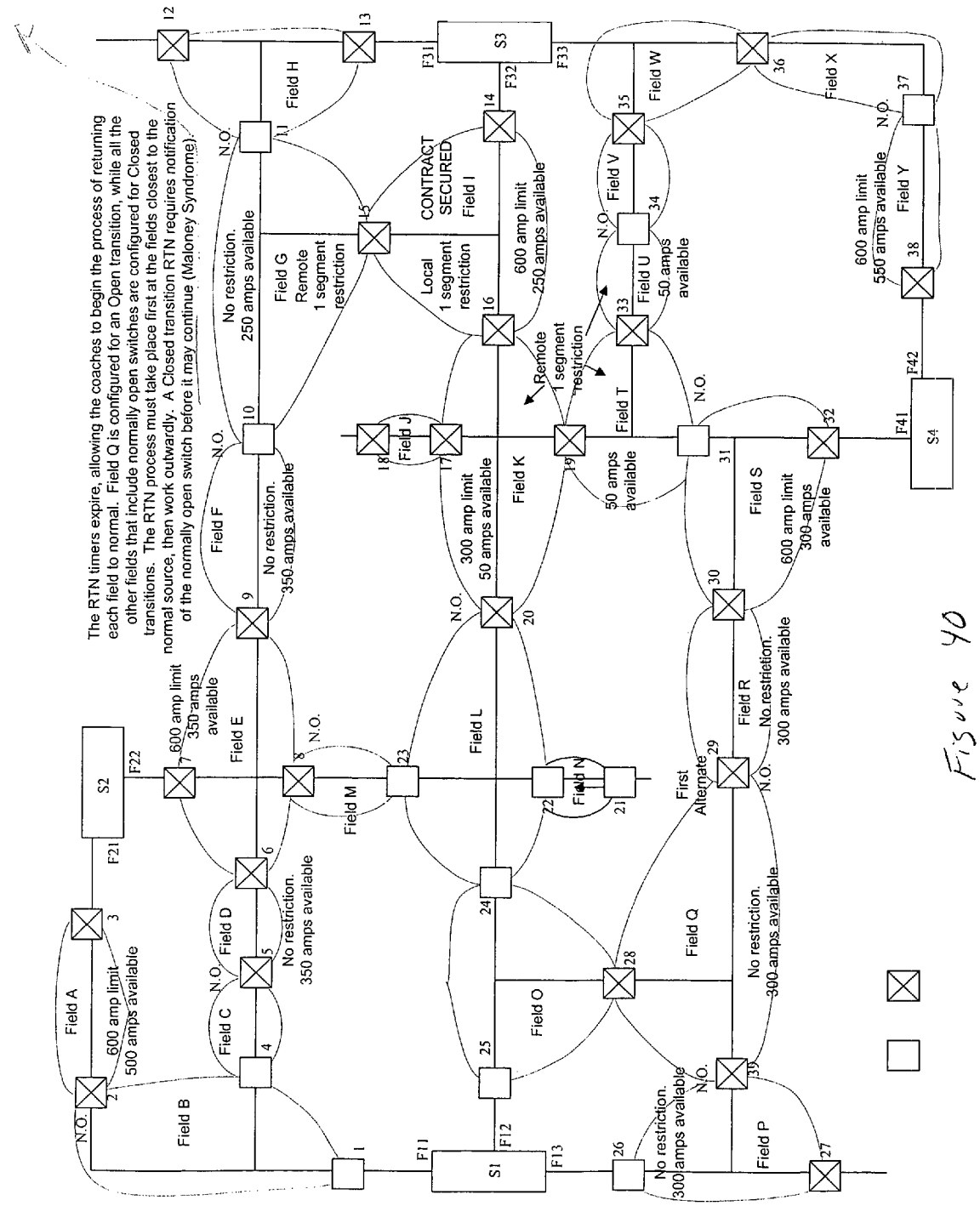

FIG. 40: The RTN timers expire, allowing the coaches to begin the process of returning each field to normal. Field Q is configured for an Open transition, while all the other fields that include normally open switches are configured for Closed transitions. The RTN process must take place first at the fields closest to the normal source, then work outwardly. A Closed transition RTN requires notification of the normally open switch before it may continue (M-Situation).

Figure 41:
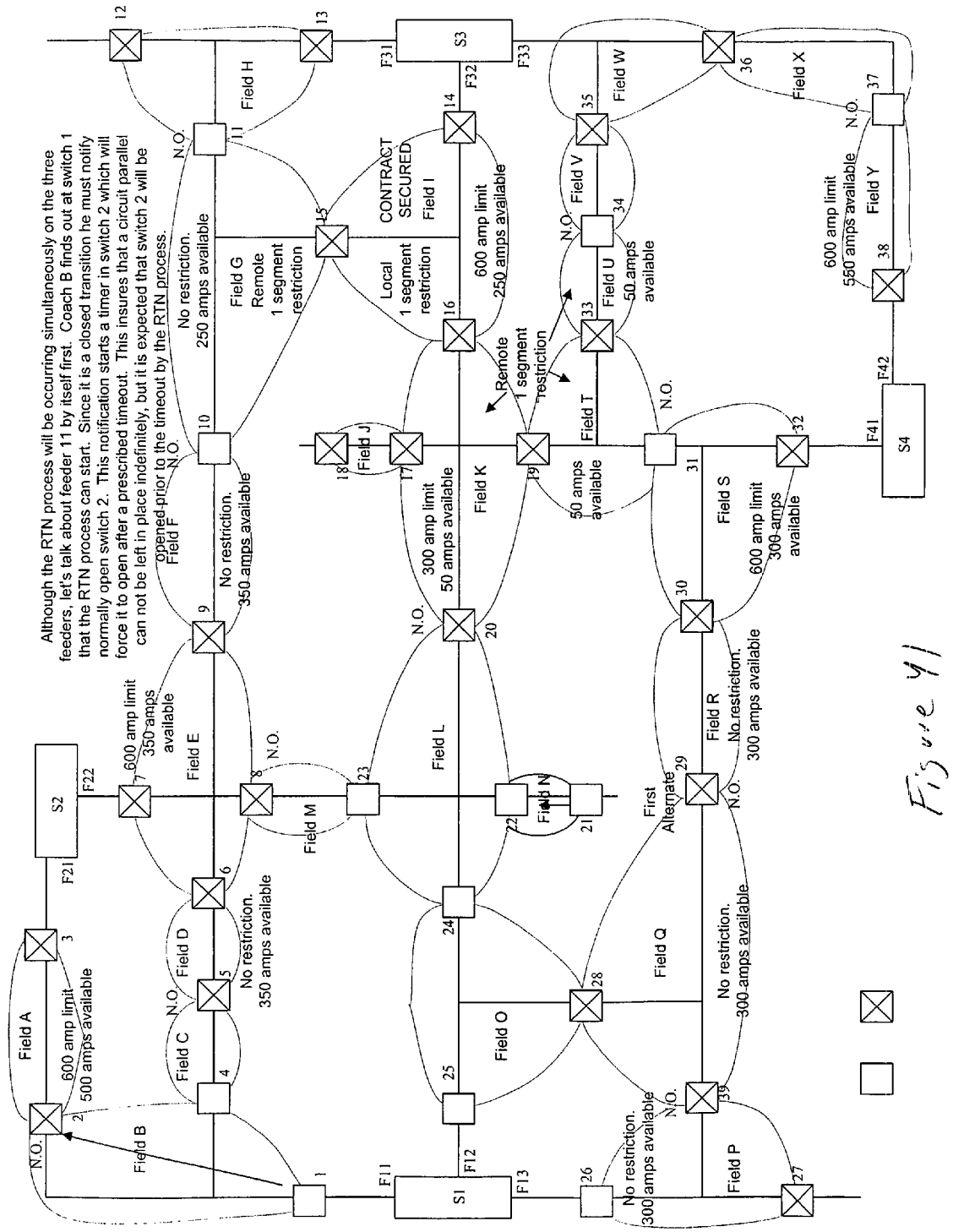

FIG. 41: Although the RTN process will be occurring simultaneously on the three feeders, let's talk about feeder 11 by itself first. Coach B finds out at switch 1 that the RTN process can start. Since it is a closed transition he must notify normally open switch 2. This notification starts a timer in switch 2 which will force it to open after a prescribed timeout. This insures that a circuit parallel can not be left in place indefinitely, but it is expected that switch 2 will be opened prior to the timeout by the RTN process.

Figure 42:
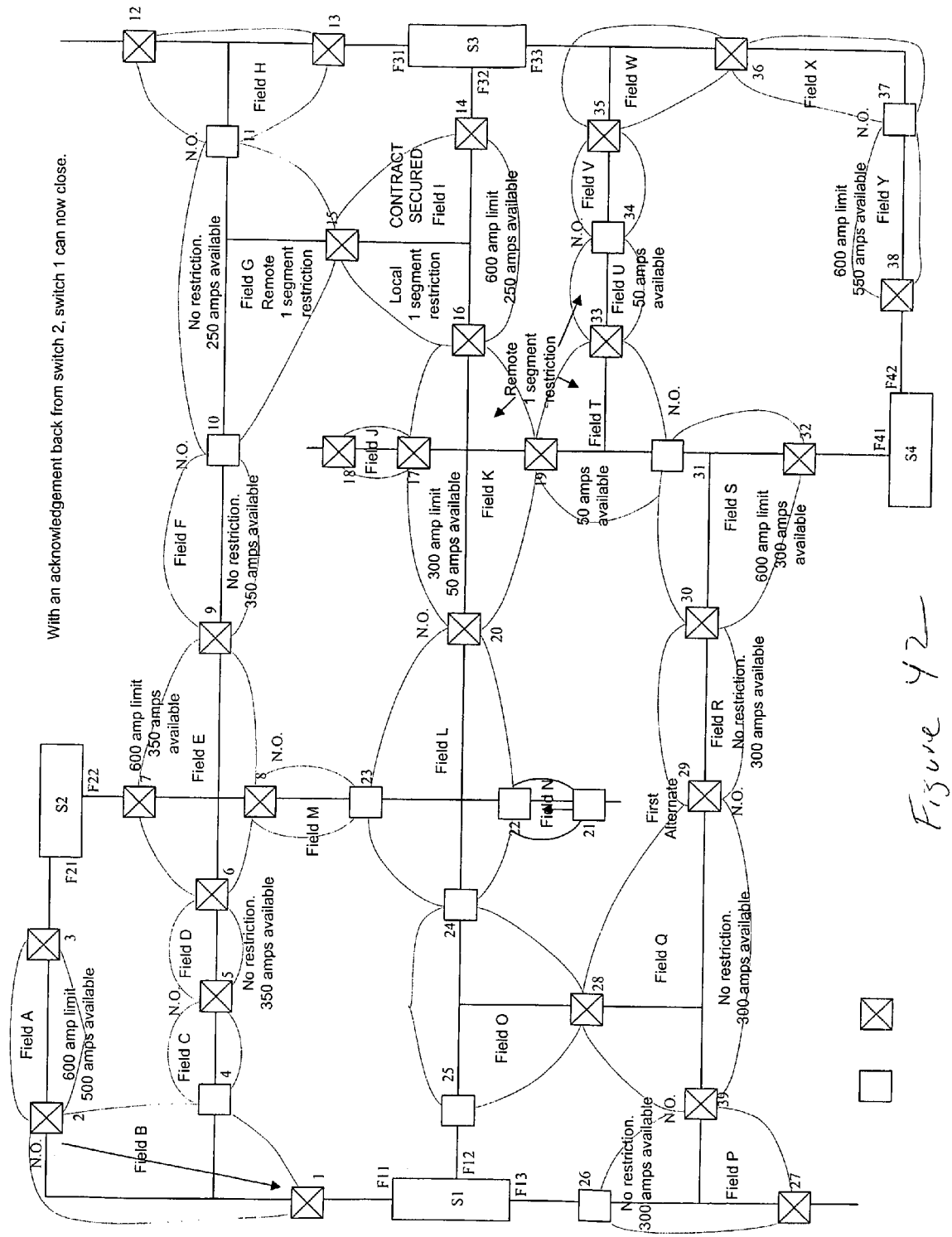

FIG. 42: With an acknowledgement back from switch 2, switch 1 can now close.

Figure 43:
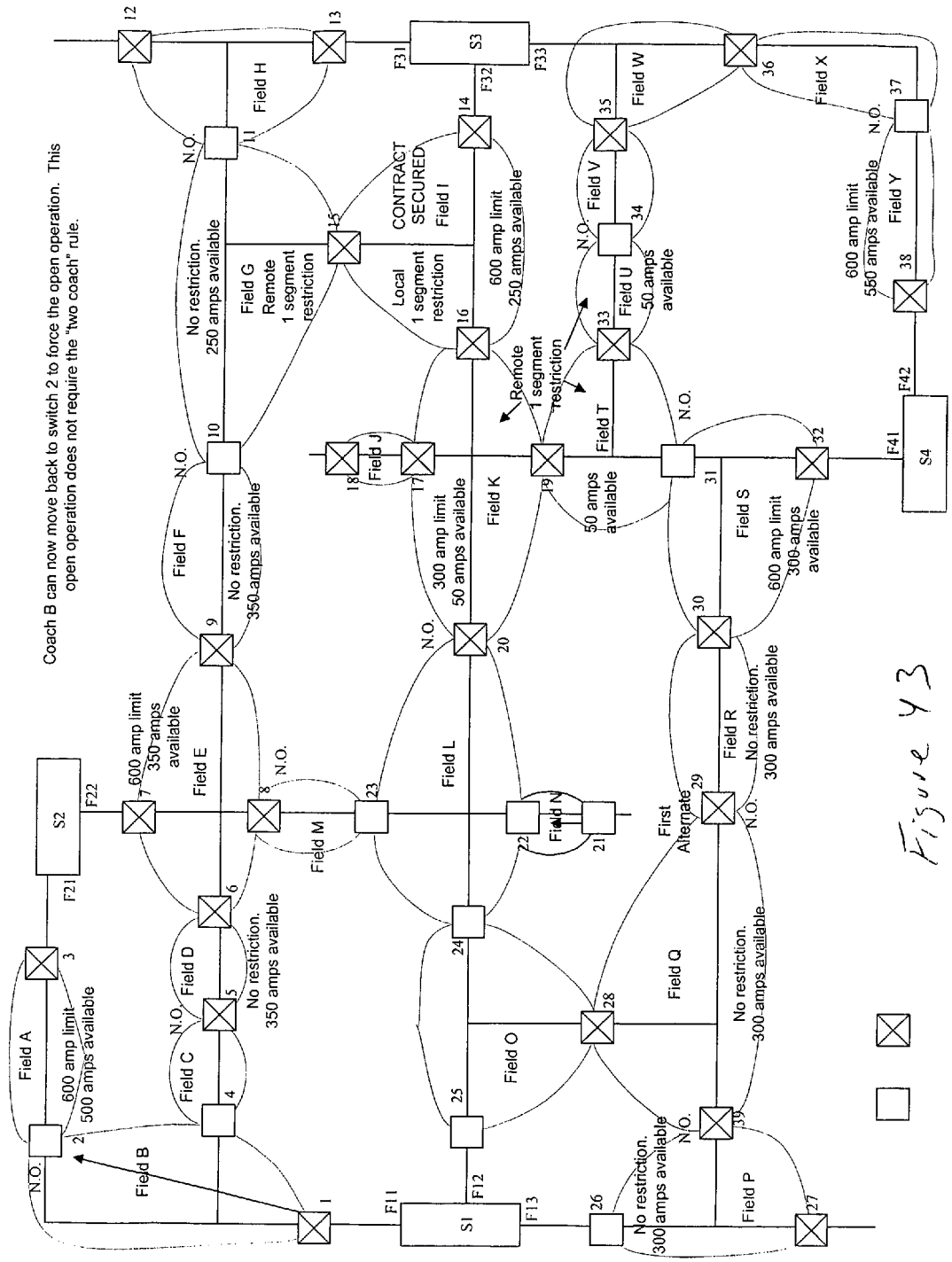

FIG. 43: Coach B can now move back to switch 2 to force the open operation. This open operation does not require the "two coach" rule.

Figure 44:
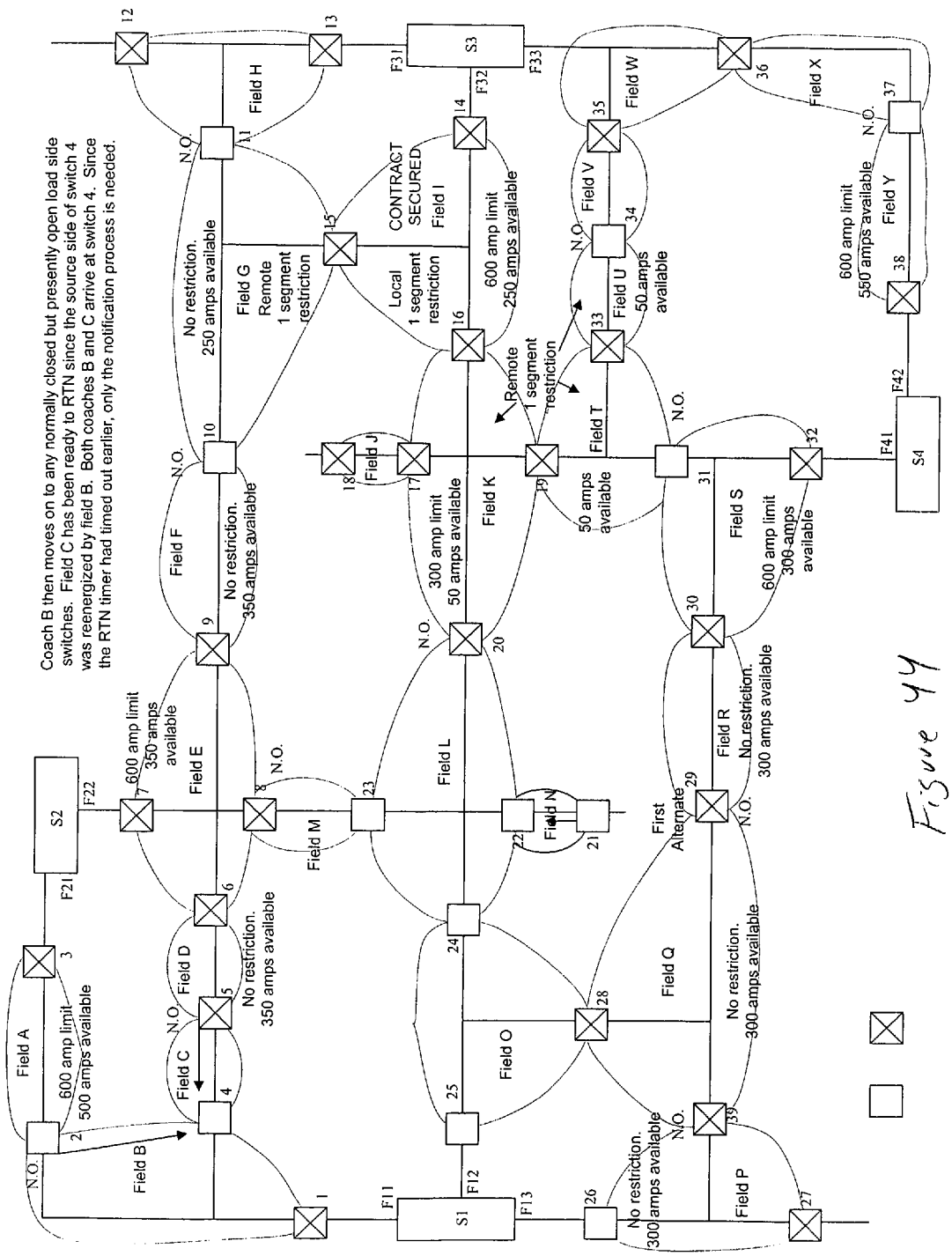

FIG. 44: Coach B then moves on to any normally closed but presently open load side switches. Field C has been ready to RTN since the source side of switch 4 was reenergized by field B. Both coaches B and C arrive at switch 4. Since the RTN timer had timed out earlier, only the notification process is needed.

Figure 45:
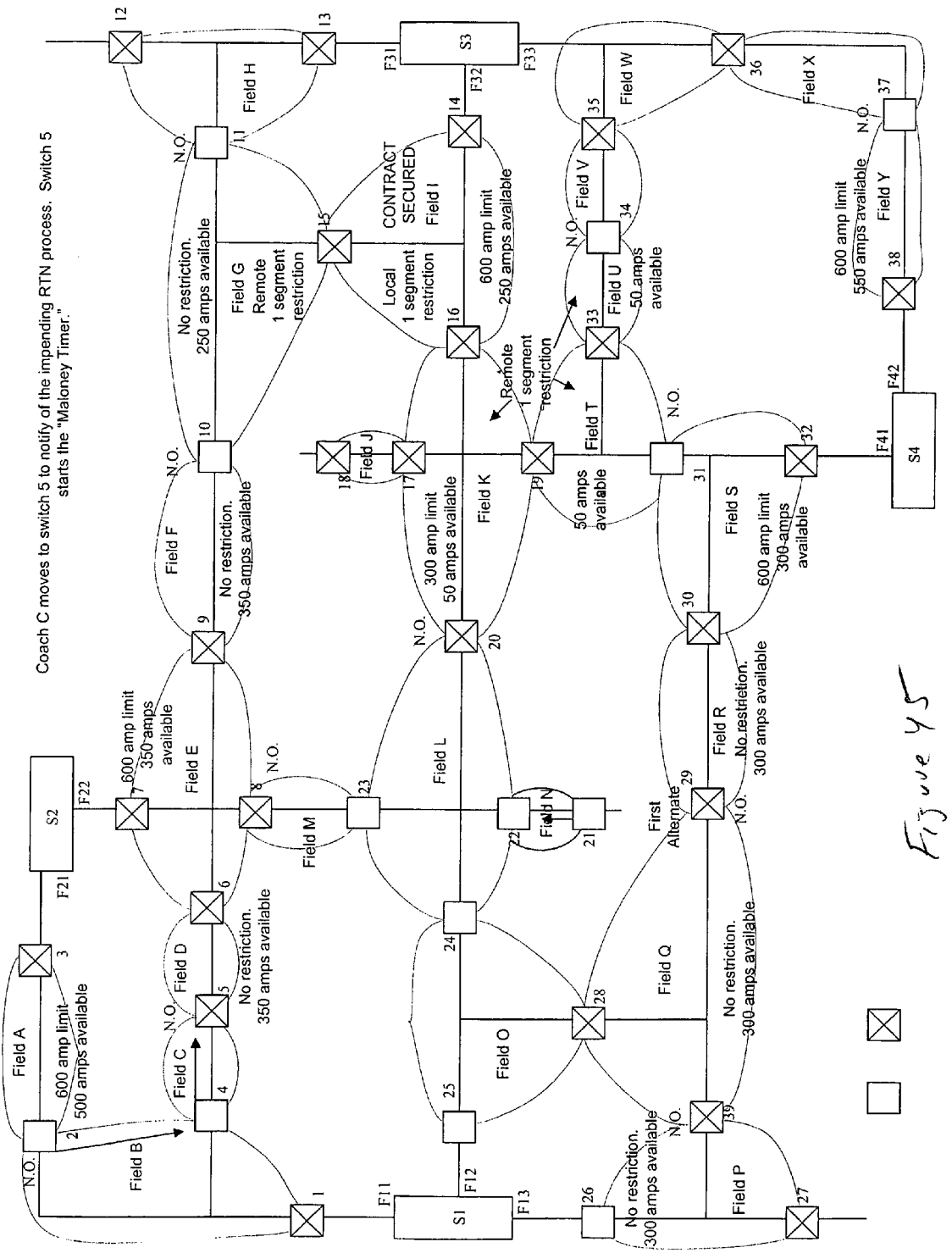

FIG. 45: Coach C moves to switch 5 to notify of the impending RTN process. Switch 5 starts the "M-Situation Timer."

Figure 46:
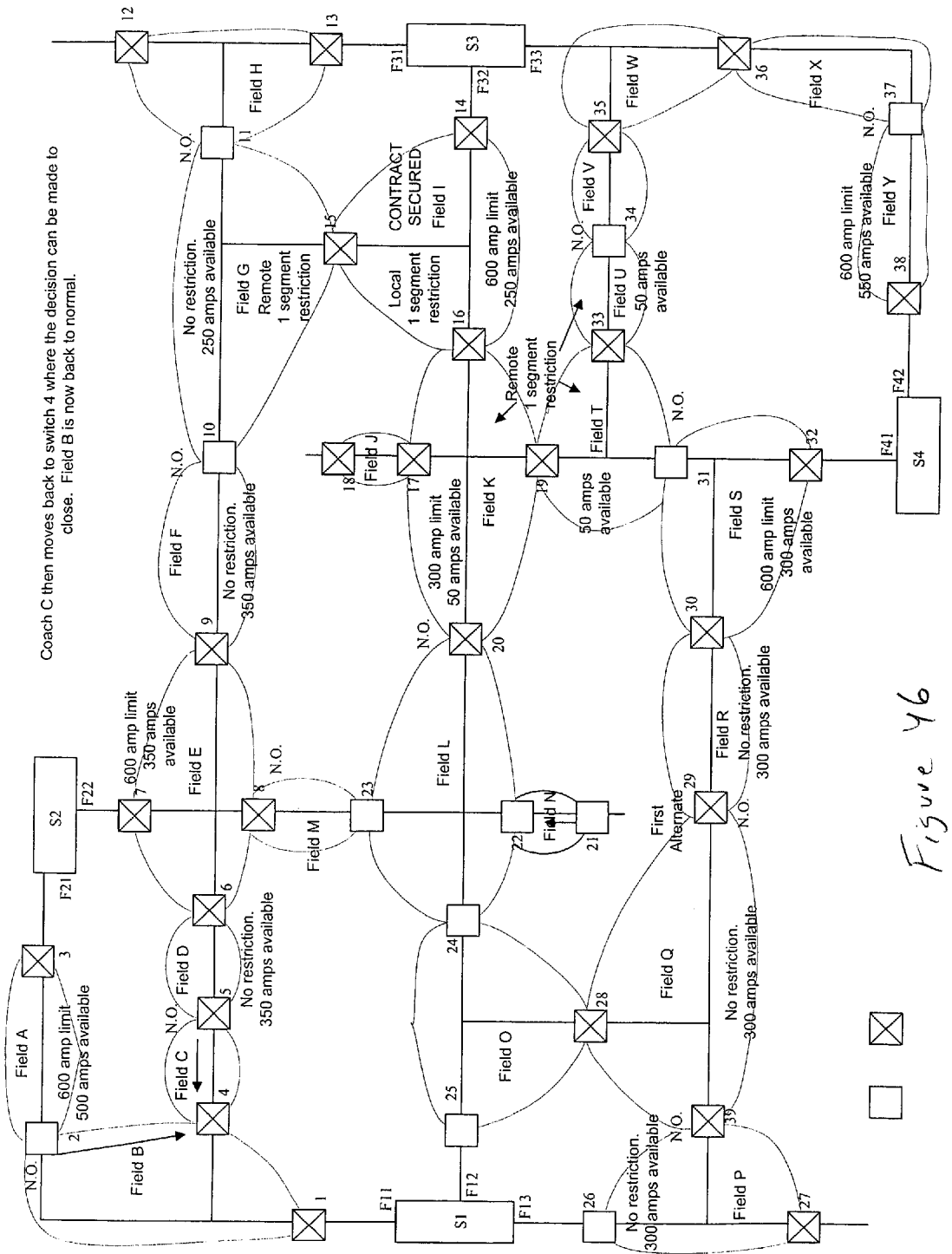

FIG. 46: Coach C then moves back to switch 4 where the decision can be made to close. Field B is now back to normal.

Figure 47:
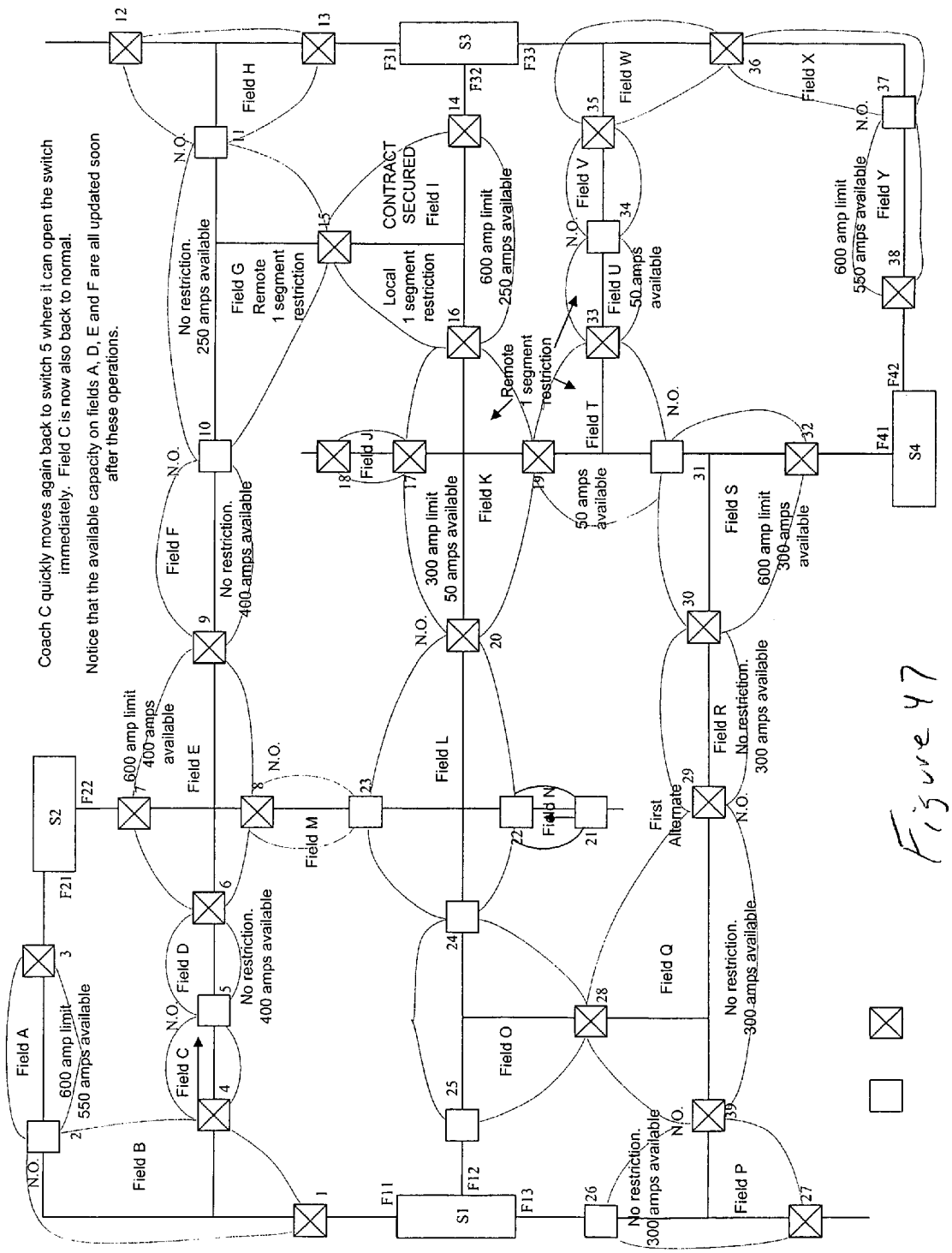

FIG. 47: Coach C quickly moves again back to switch 5 where it can open the switch immediately. Field C is now also back to normal.

Notice that the available capacity on fields A, D, E and F are all updated soon after these operations.

Figure 48:
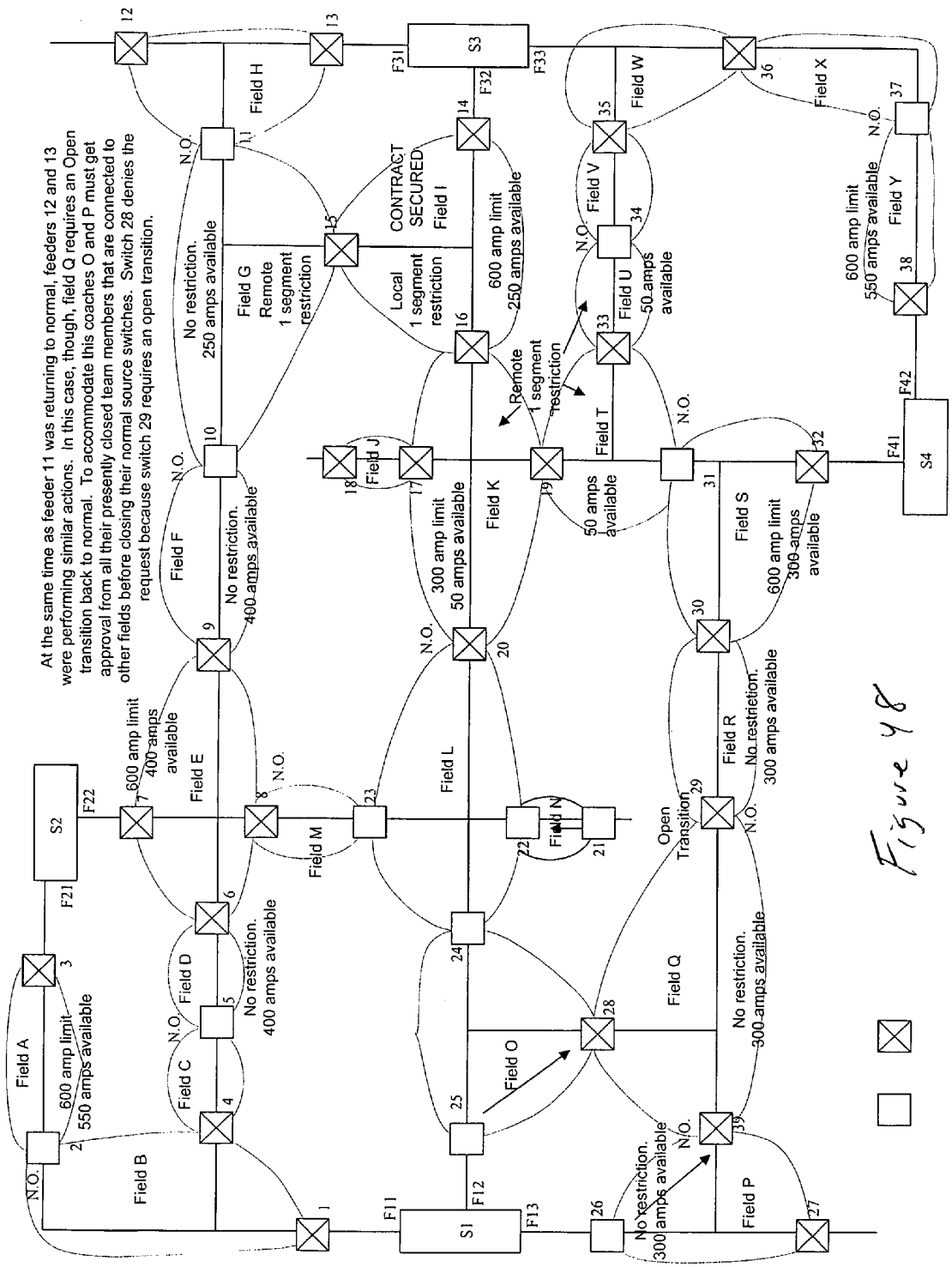

FIG. 48: At the same time as feeder 11 was returning to normal, feeders 12 and 13 were performing similar actions. In this case, though, field Q requires an Open transition back to normal. To accommodate this coaches O and P must get approval from all their presently closed team members that are connected to other fields before closing their normal source switches. Switch 28 denies the request because switch 29 requires an open transition.

Figure 49:
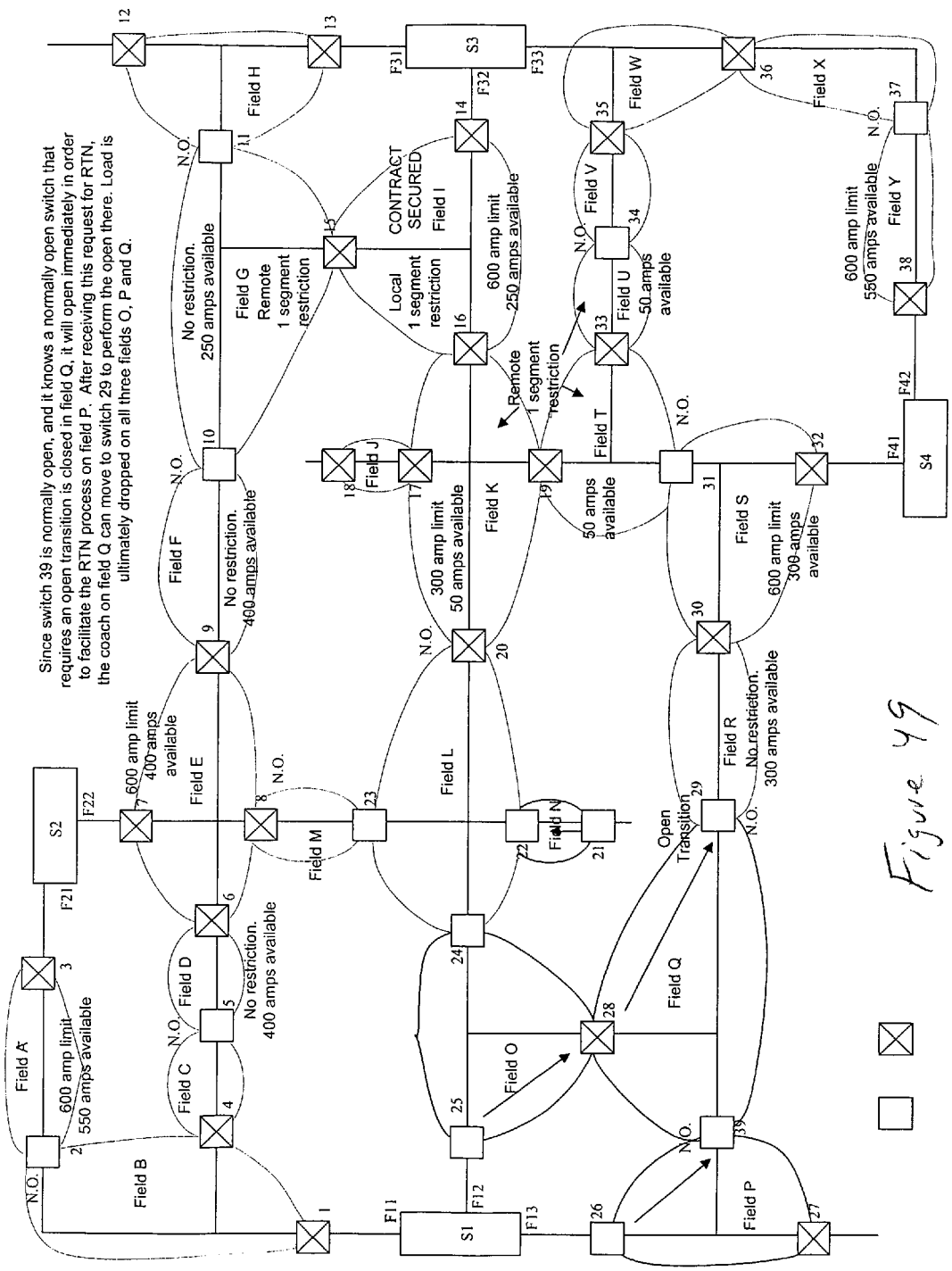
Figure 5D:
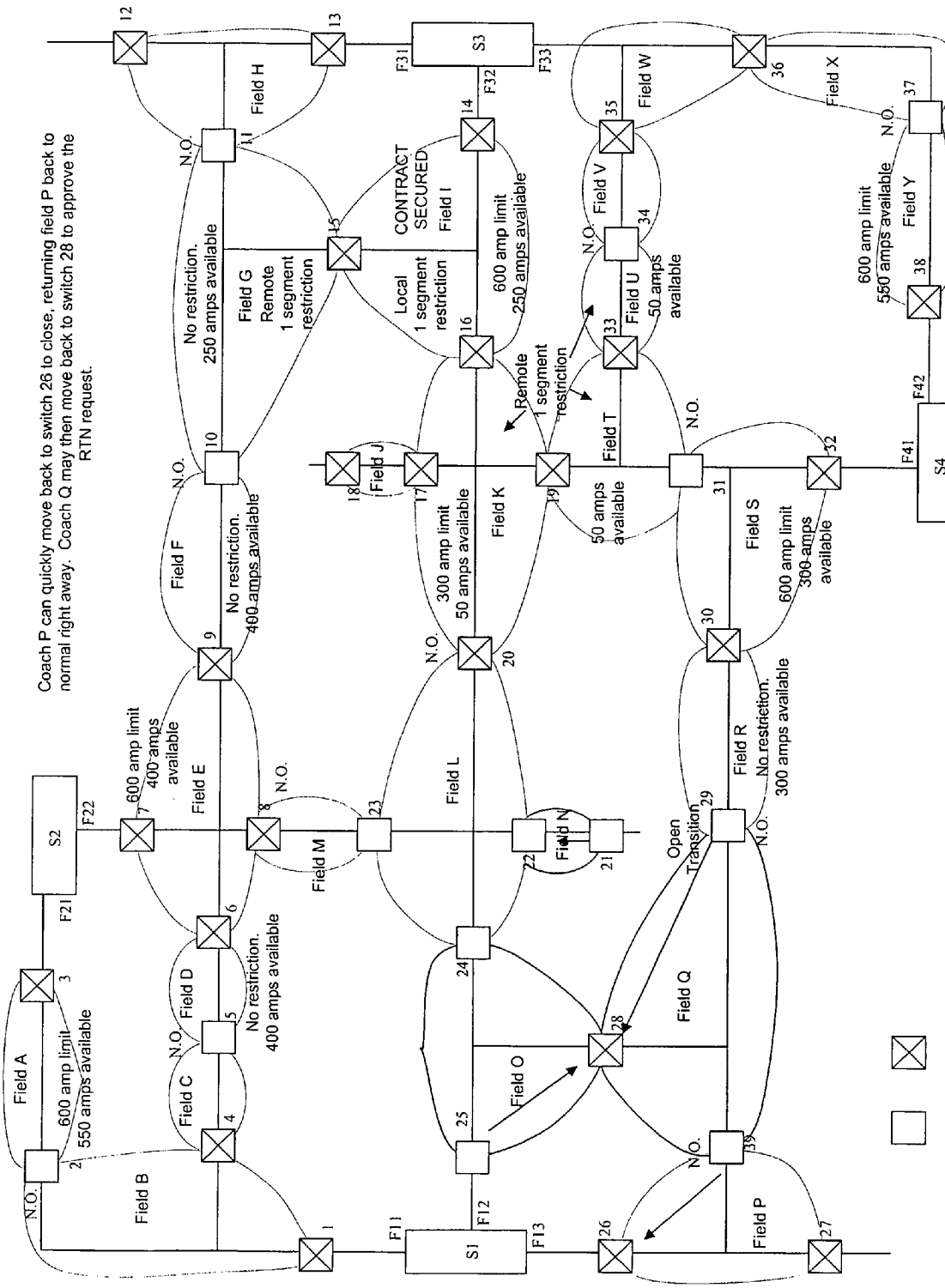

FIG. 49: Since switch 39 is normally open, and it knows a normally open switch that requires an open transition is closed in field Q, it will open immediately in order to facilitate the RTN process on field P. After receiving this request for RTN, the coach on field Q can move to switch 29 to perform the open there. Load is ultimately dropped on all three fields O, P and Q.

FIG. 50: Coach P can quickly move back to switch 26 to close, returning field P back to normal right away. Coach Q may then move back to switch 28 to approve the RTN request.

Figure 51:
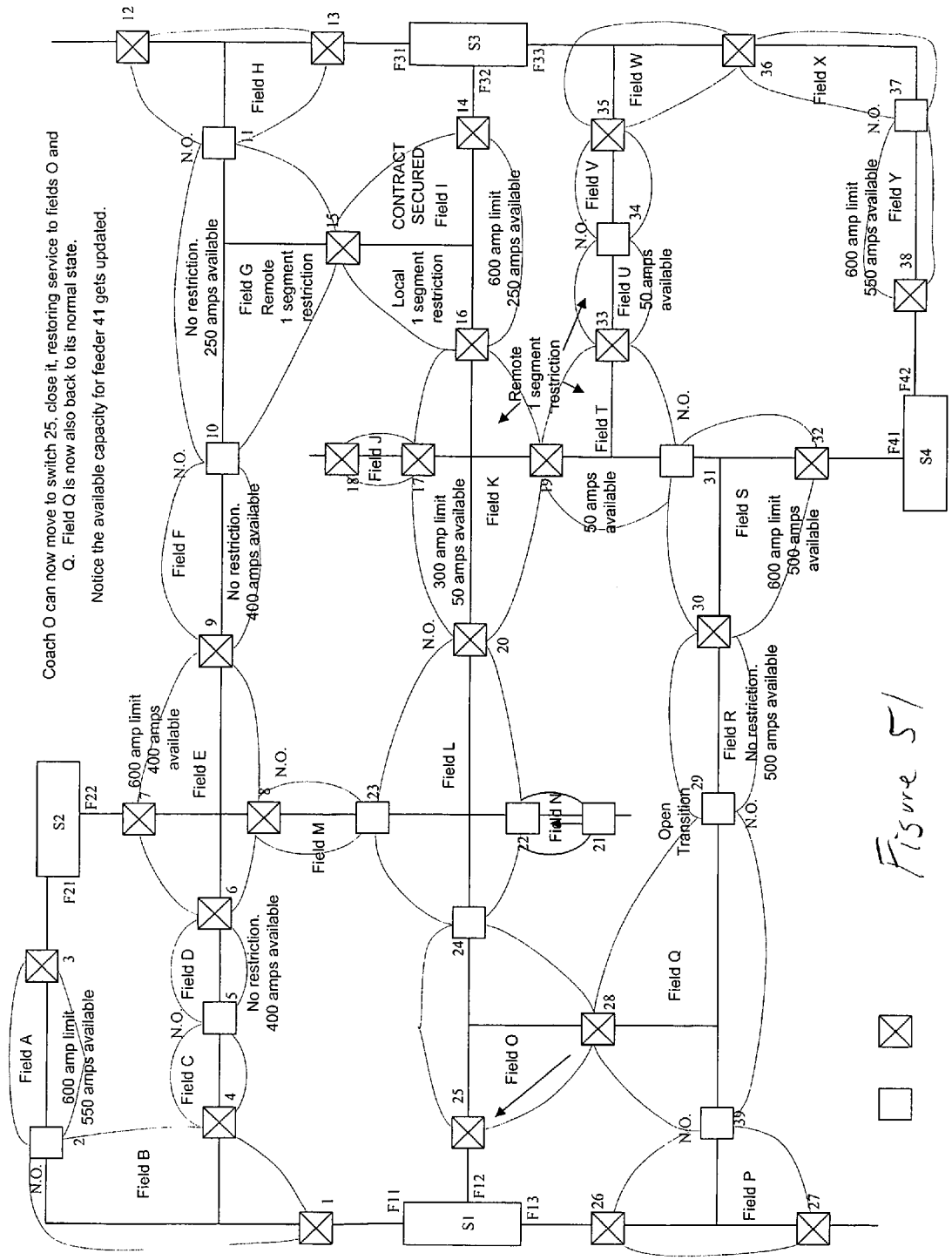

FIG. 51: Coach O can now move to switch 25, close it, restoring service to fields O and Q. Field Q is now also back to its normal state. Notice the available capacity for feeder 41 gets updated.

Figure 52:
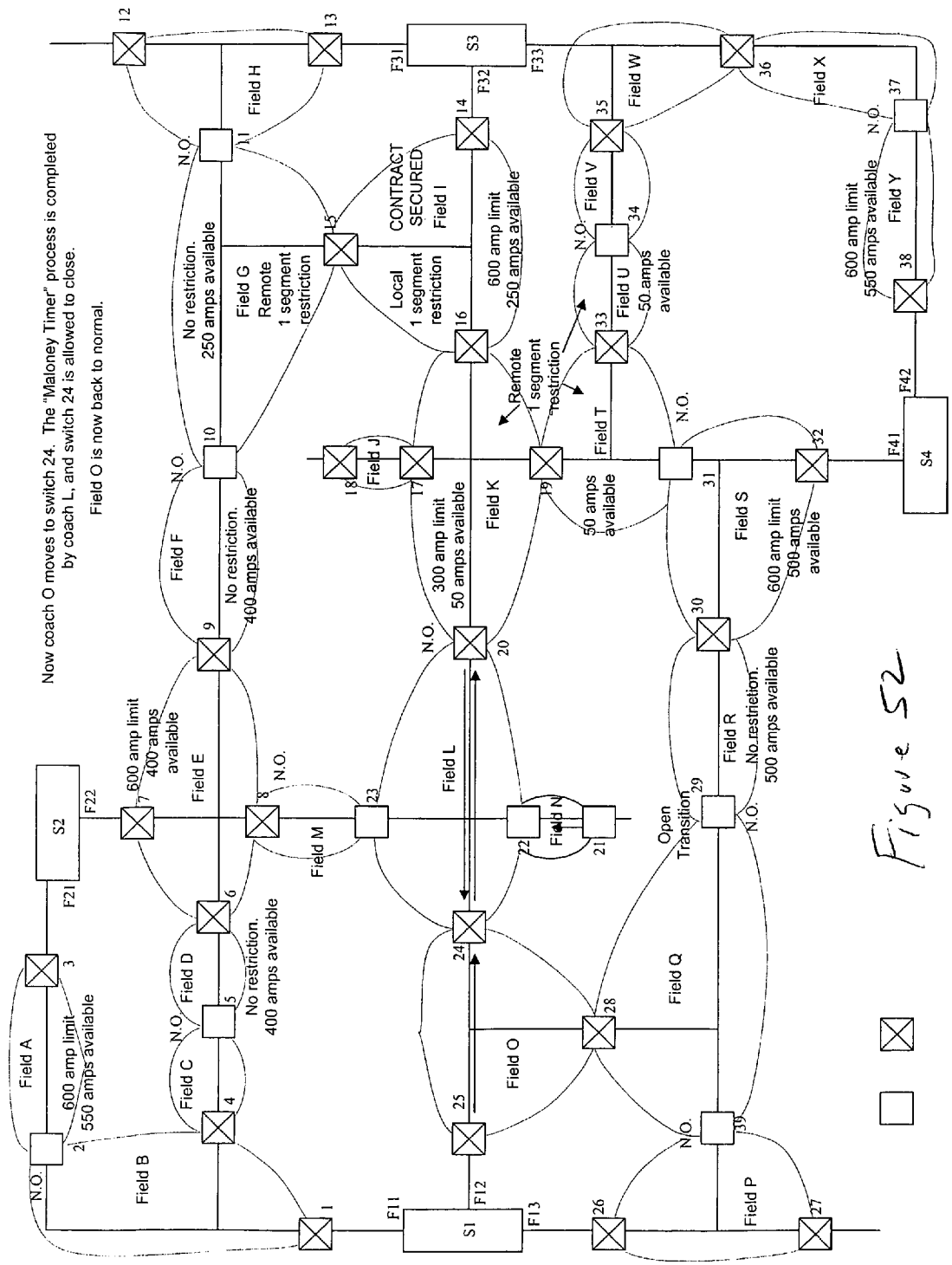

FIG. 52: Now coach O moves to switch 24. The "M-Situation Timer" process is completed by coach L, and switch 24 is allowed to close. Field O is now back to normal.

Figure 53:
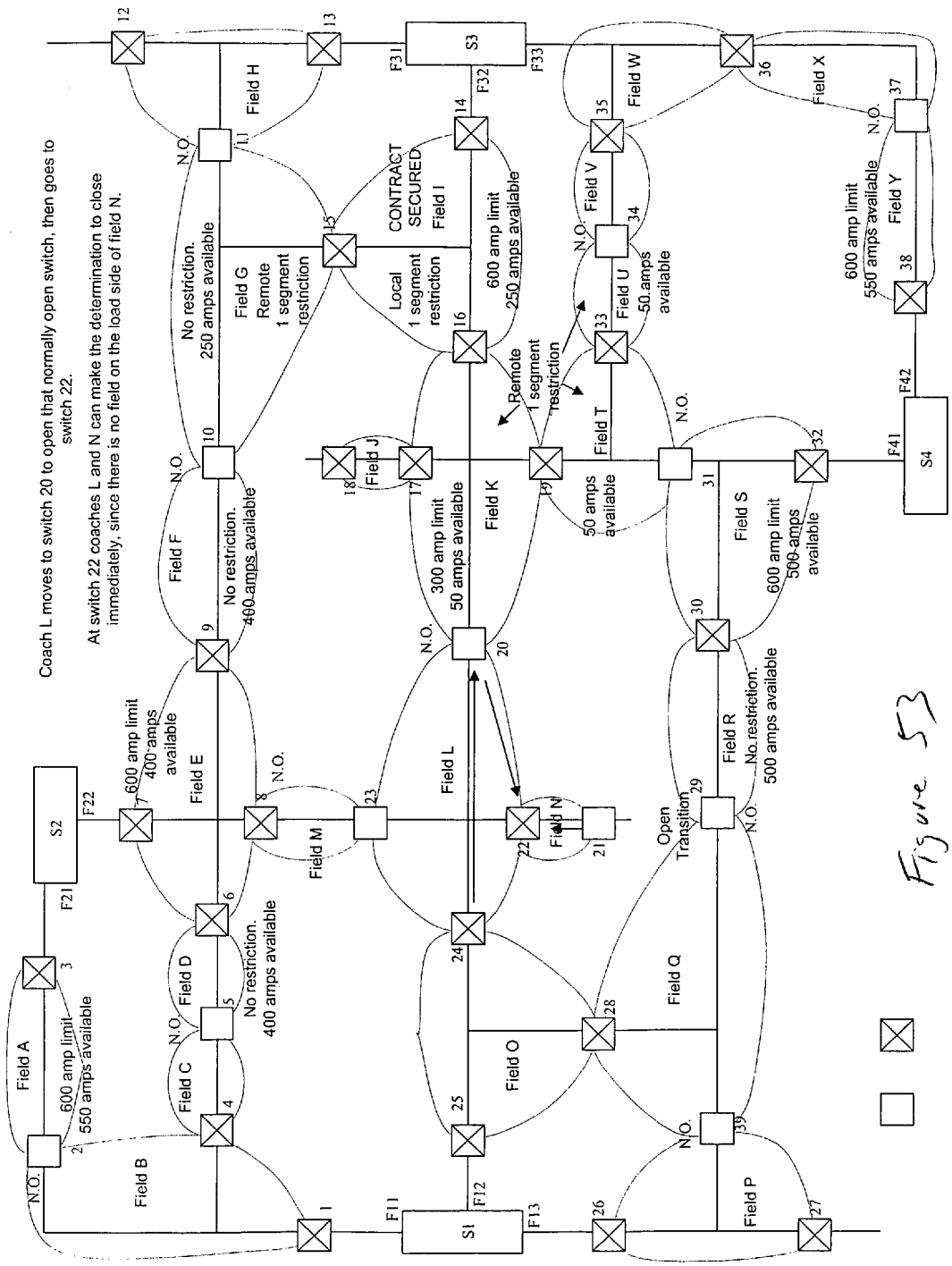

FIG. 53: Coach L moves to switch 20 to open that normally open switch, then goes to switch 22.

At switch 22 coaches L and N can make the determination to close immediately, since there is no field on the load side of field N.

Figure 54:
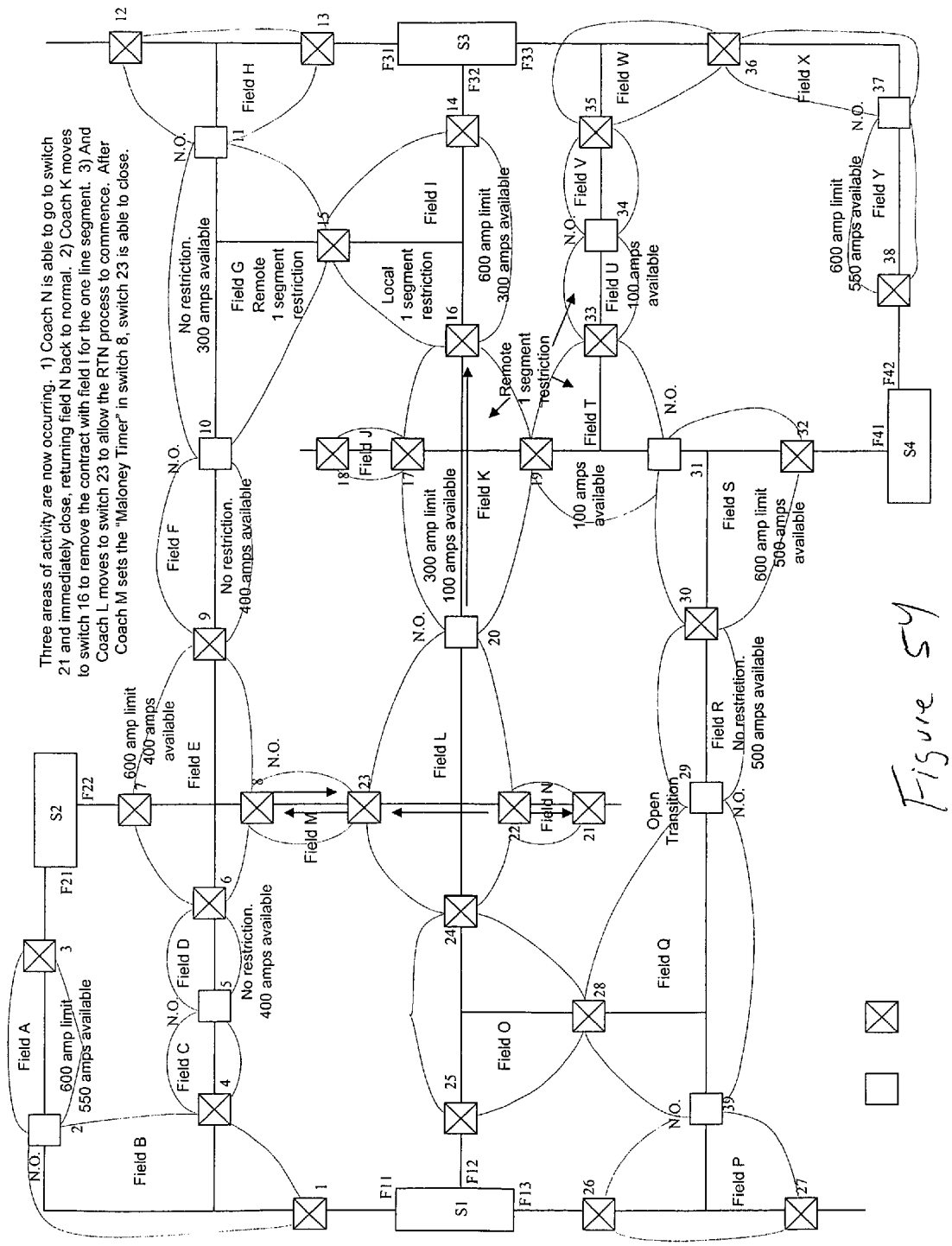

FIG. 54: Three areas of activity are now occurring. 1) Coach N is able to go to switch 21 and immediately close, returning field N back to normal. 2) Coach K moves to switch 16 to remove the contract with field I for the one line segment. 3) And Coach L moves to switch 23 to allow the RTN process to commence. After Coach M sets the "M-Situation Timer" in switch 8, switch 23 is able to close.

Figure 55:
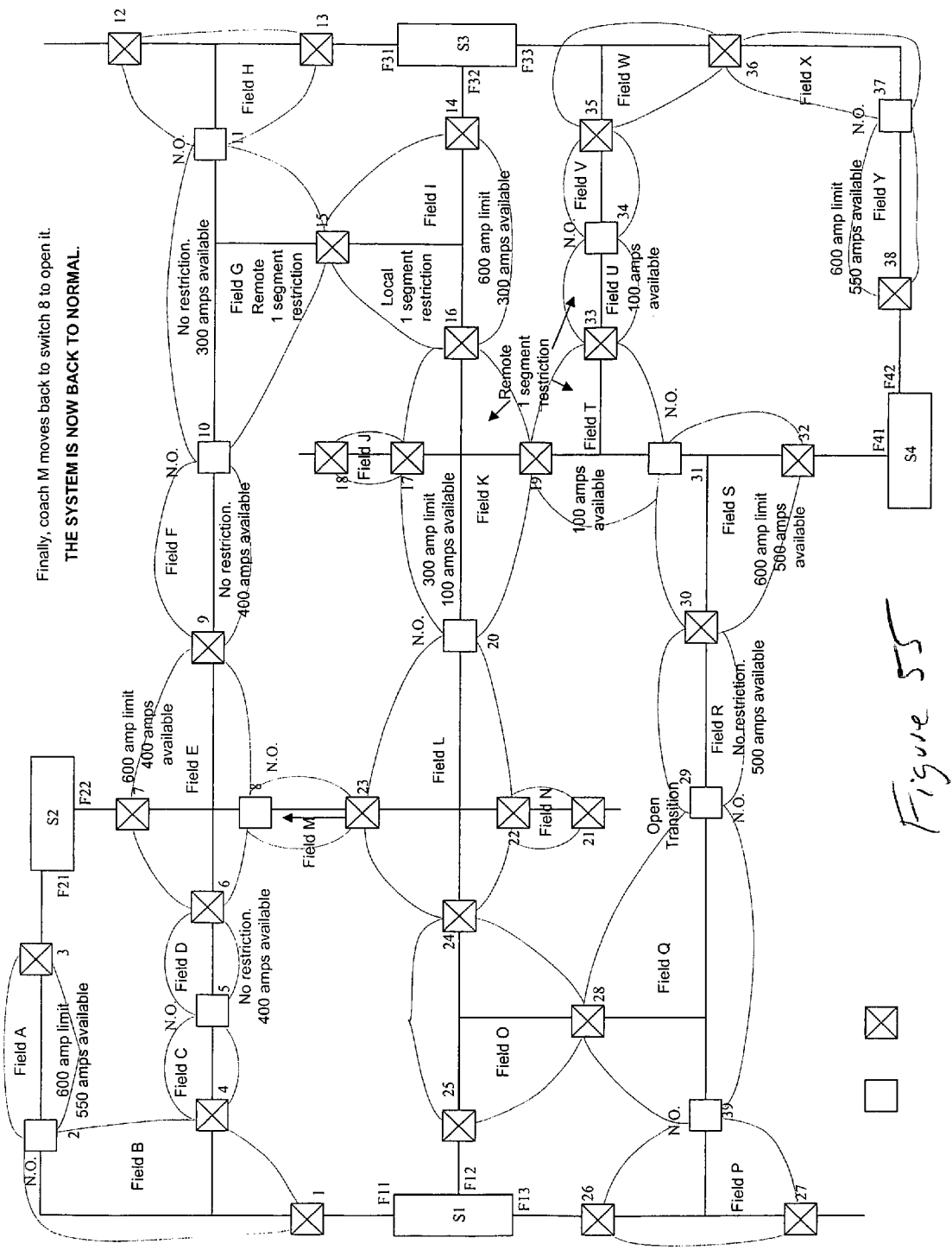

FIG. 55: Finally, coach M moves back to switch 8 to open it. The system is now back to normal.

System Resource Allocation Methodology

Considering now additional aspects and features of the present invention to provide system resource allocation methodology, e.g. to prevent the overloading of electrical power sources, resources are provided at each node and communications of source allocation data or messages are performed to other nodes to request and establish an appropriate allocation of system resources. For illustrative purposes, this methodology will be described in connection with team members or players although it should be understood that the methodology may also be implemented in systems of nodes and individual node controllers 206 without the definition of multiple teams. Also for illustrative purposes for simplicity of explanation but not to be interpreted in any limiting sense, the resources and the methodology will be referred to as "Contracts" and "Contract Agents". The "Contract Agents" (or CA's hereafter) facilitate the use of the Contracts methodology. The CA, implemented as an autonomous processing task, i.e. independent of the Coach functionality and the Player functionality that manages the local switch, is employed to manage both the addition of load during load transfer, and the reduction of load on return-to-normal. Thus, the CA may be characterized as a process that is active or enabled in each switch control and that manages only "Contract-related activities" as described hereinafter. The CA functions by communicating locally with the Player task, and remotely with other CA's via CA-specific messages. It should also be understood that while the CA will be discussed in connection with a single-switch configuration, the CA is applicable to all devices such as dual switches, reclosers, etc.

If the user of the system has specified load pickup based on loading restrictions in terms of a segment count, the CA will be active to control the management of the line segment restrictions. The CA is also active if a valid line segment limit has been announced (propagated down) from the source. The line segment limit is continuously propagated out from the source (field) as the coach travels from team player to team player, as an independent process. As the line segment limit propagates outward (from the source field), lower set counts of line segment limits take precedence and are then propagated further. If load restrictions have been set based upon maximum amperage, the CA is then active in response to this setting. The discussion of the CA functionality hereinafter is based on one of these settings or specifications such that the CA functionality has been enabled. It should be noted that even with the CA functionality enabled, the Player does not request a Contract unless the circuit segment being energized is being fed from an alternate source, either directly or indirectly. For example, the closing of a source/sub switch (the team switch closest to the circuit's source) would never require a Contract, but the closing of a tie switch (between sources) would always require a Contract. Beyond these two absolute cases the general rule (as will be explained in more detail hereinafter) is that a Contract is required if the present source Field, or granting Field, indicates it is being fed from an alternate source.

The indication of alternate source is initially set by the Coach that closes a normally-open tie switch. From that point the indication of alternate source is propagated out each time an additional circuit segment is restored. This way all teams will know they are on an alternate source, even if the switch that was closed to restore service was the normal source switch for that field (for example switched radial tap lines).

The logic at the Player (team member) level requires that if the granting field is already fed by an alternate source, or the local switch is a "last-load-only" position and the requesting field is being fed from an alternate source, or the local switch is a tie switch for the requesting field, the Coach will be informed so that he/she can take appropriate action regarding transfer restrictions. In this way an "alternate-source" flag (condition/indication) will propagate as necessary to subsequent fields energized from the same alternate source.

When the alternate-source flag is set, the Coach also performs a task (running on a periodic basis) to initiate a check for the ability to remove the alternate-source flag (condition). Since this task requires information from an adjacent team, the Coach will request the Player to perform the check and report back. The Player will look to see whether this switch on the requesting field is not a tie switch, and the other field still has its alternate source flag set, or, if this switch is a last-load-only switch and this field still has its alternate-source flag set, or, if this is a tie switch on the requesting field and current switch state is still closed. If any of these conditions are true the Player reports back that the Coach must continue checking. Otherwise the report is that the alternate-source flag may be cleared.

In order for the clearing process to begin the flag must be cleared at the normal7ly-open switch first. During the return-to-normal process, when a normally-open switch is able to reopen, the alternate-source flag can be cleared without question.

Figure 22A:
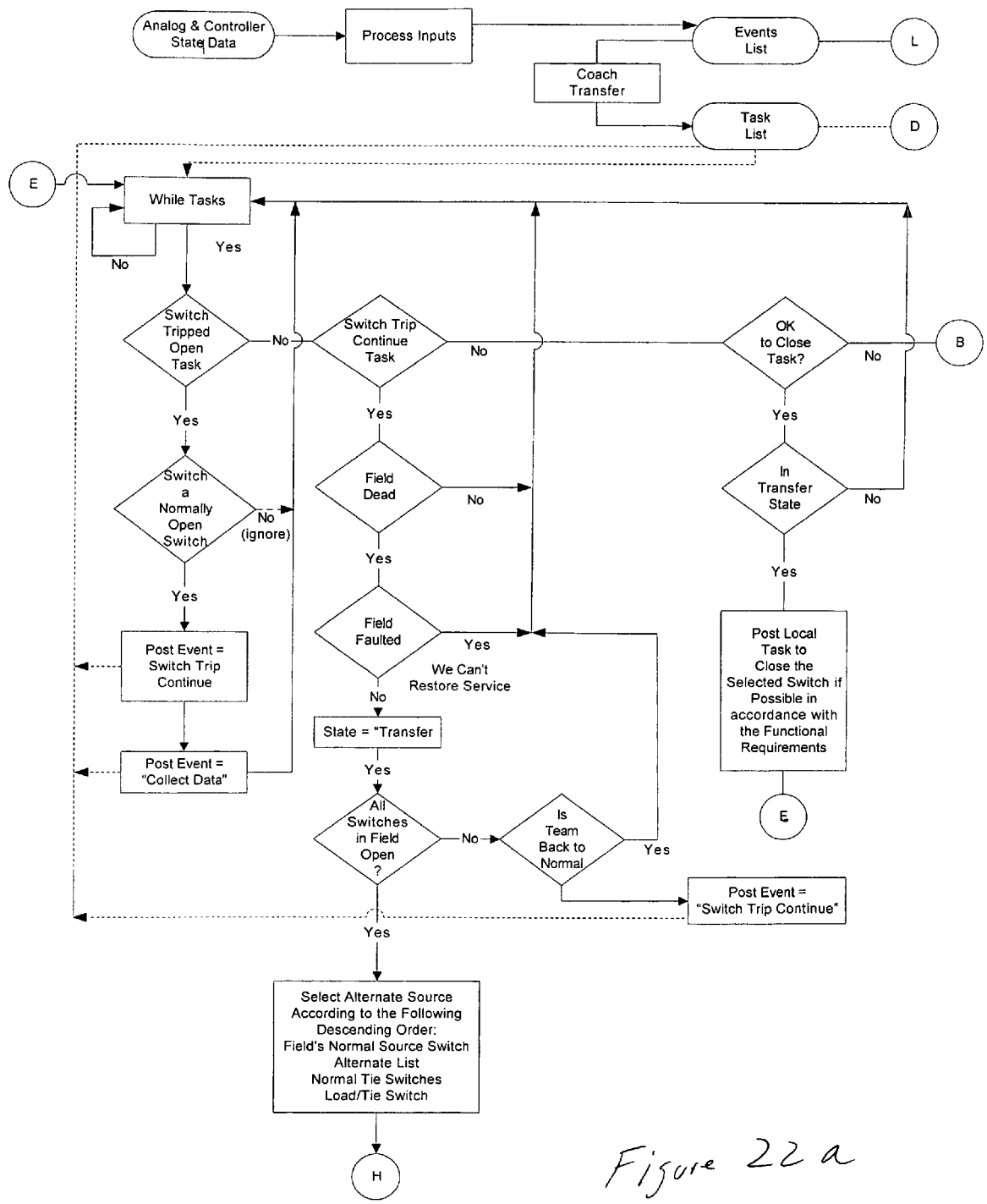
Figure 22C:
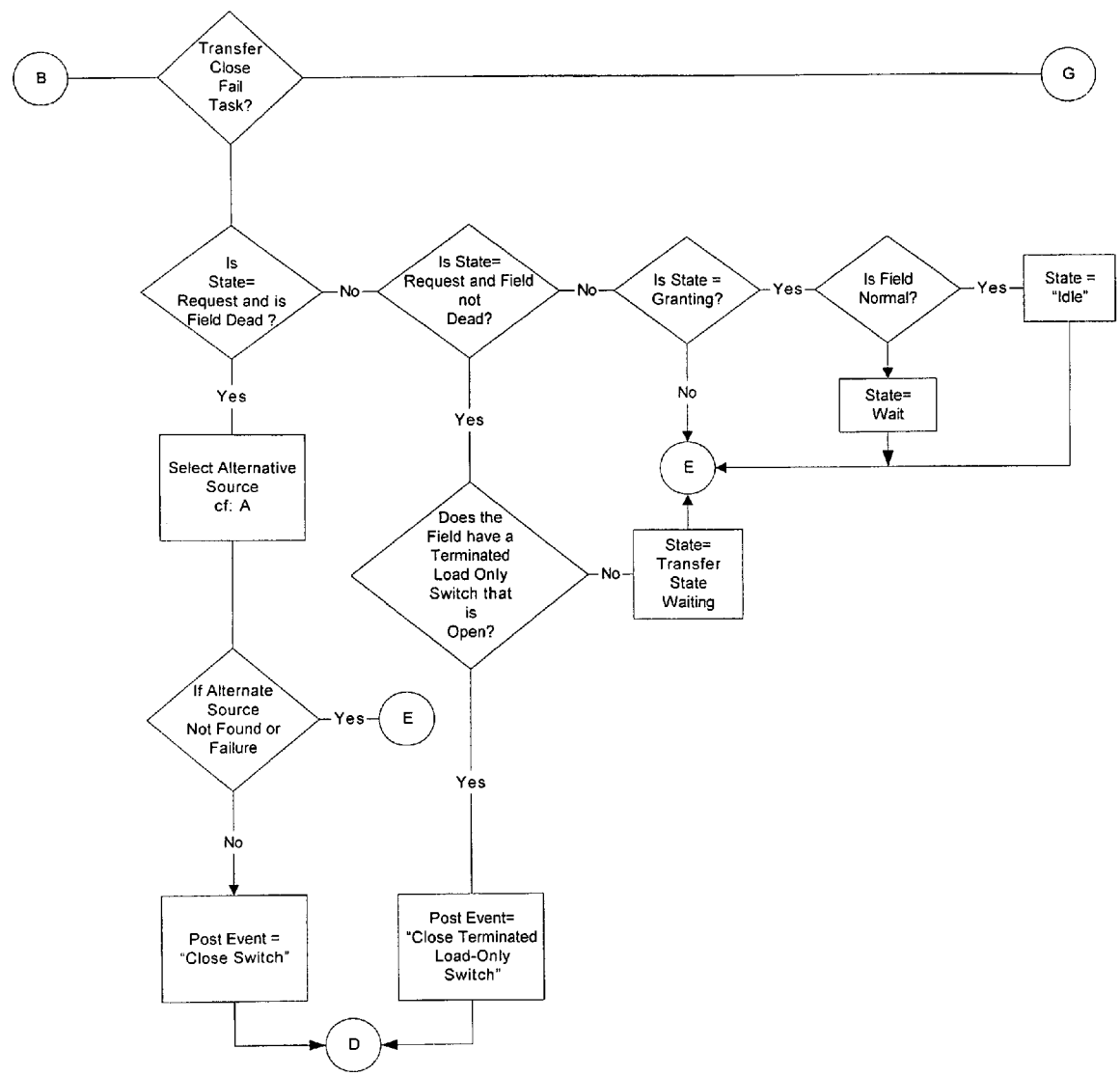
Figure 22D:
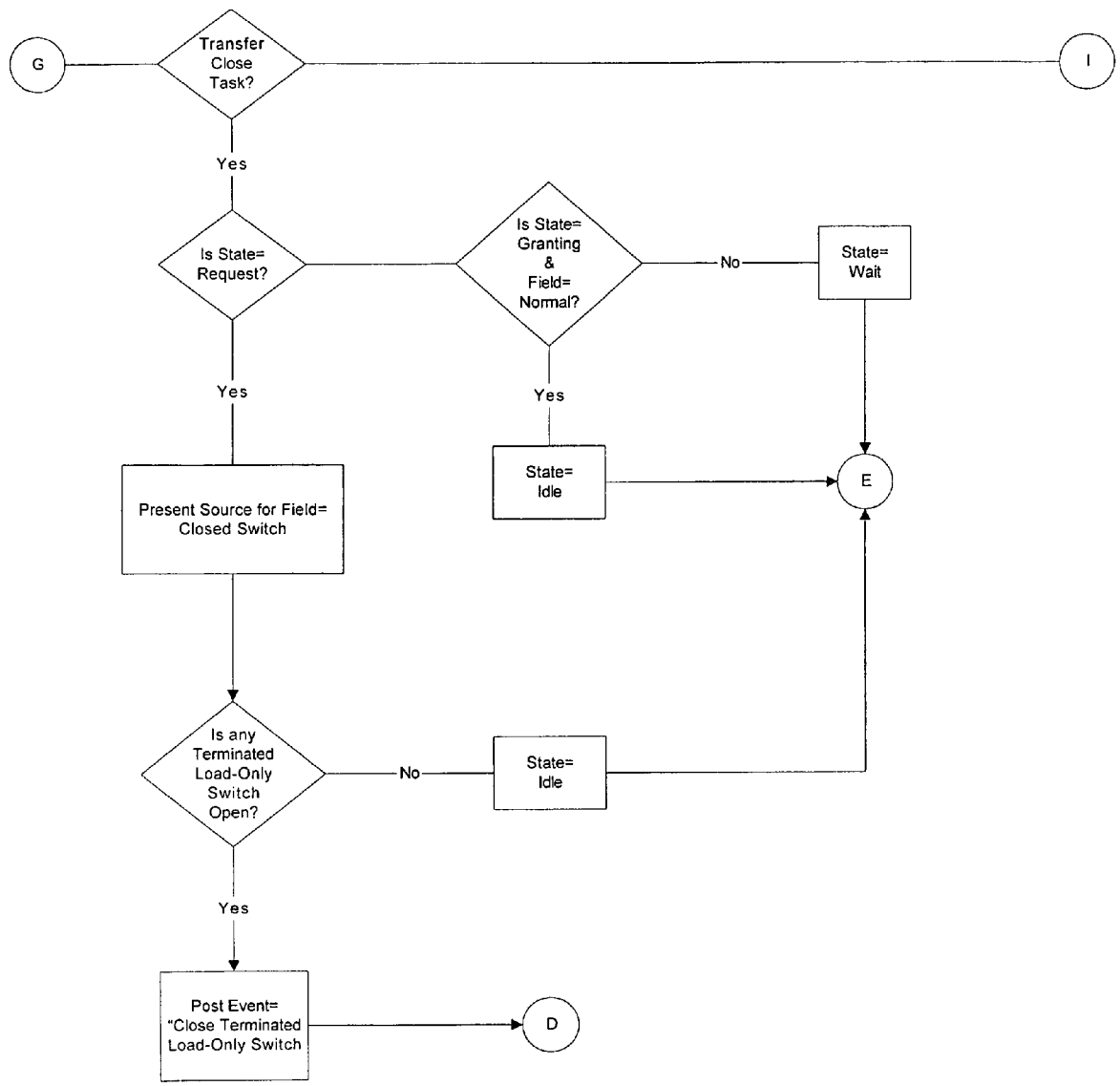
Figure 22E:
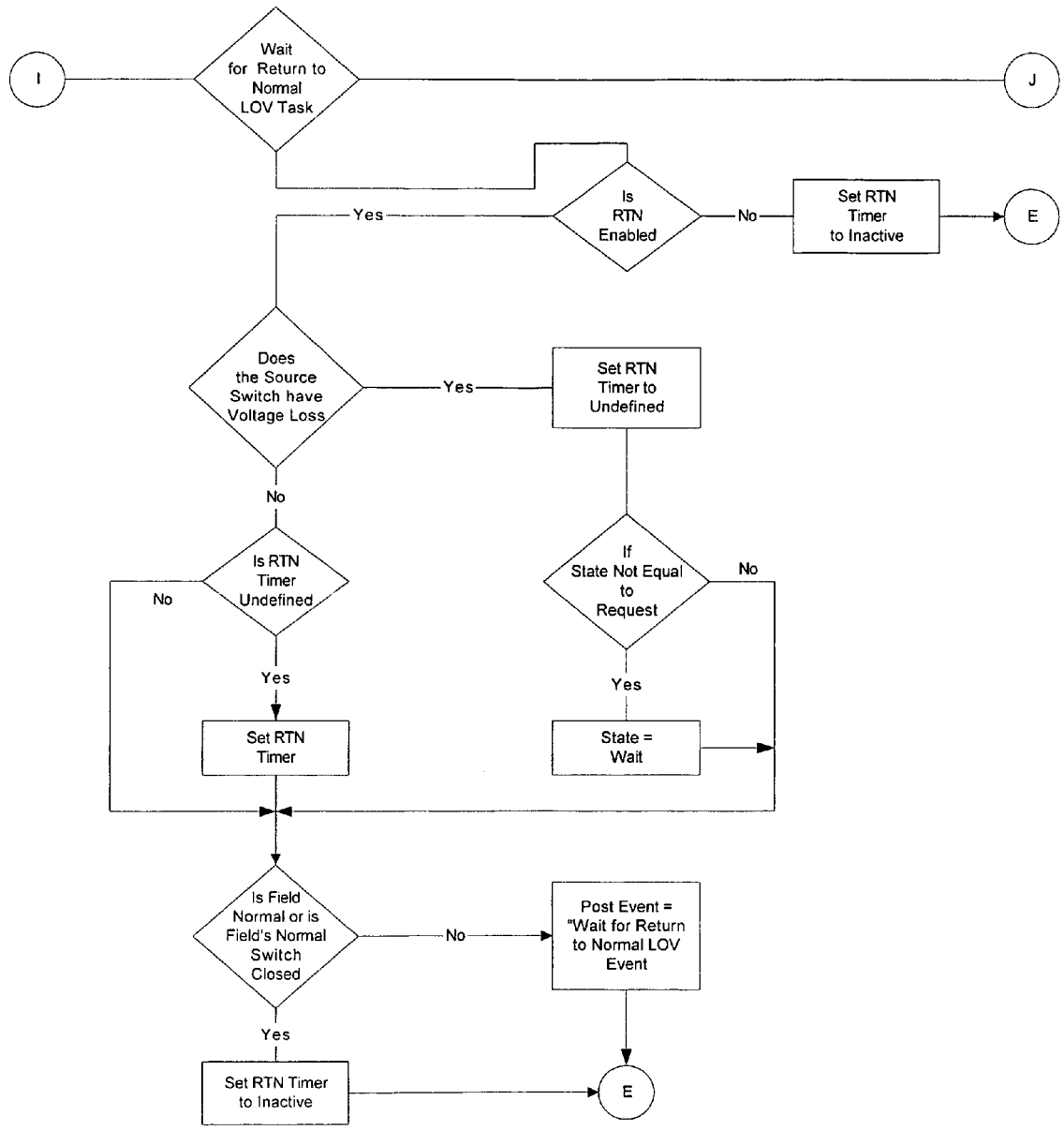
Figure 22F:
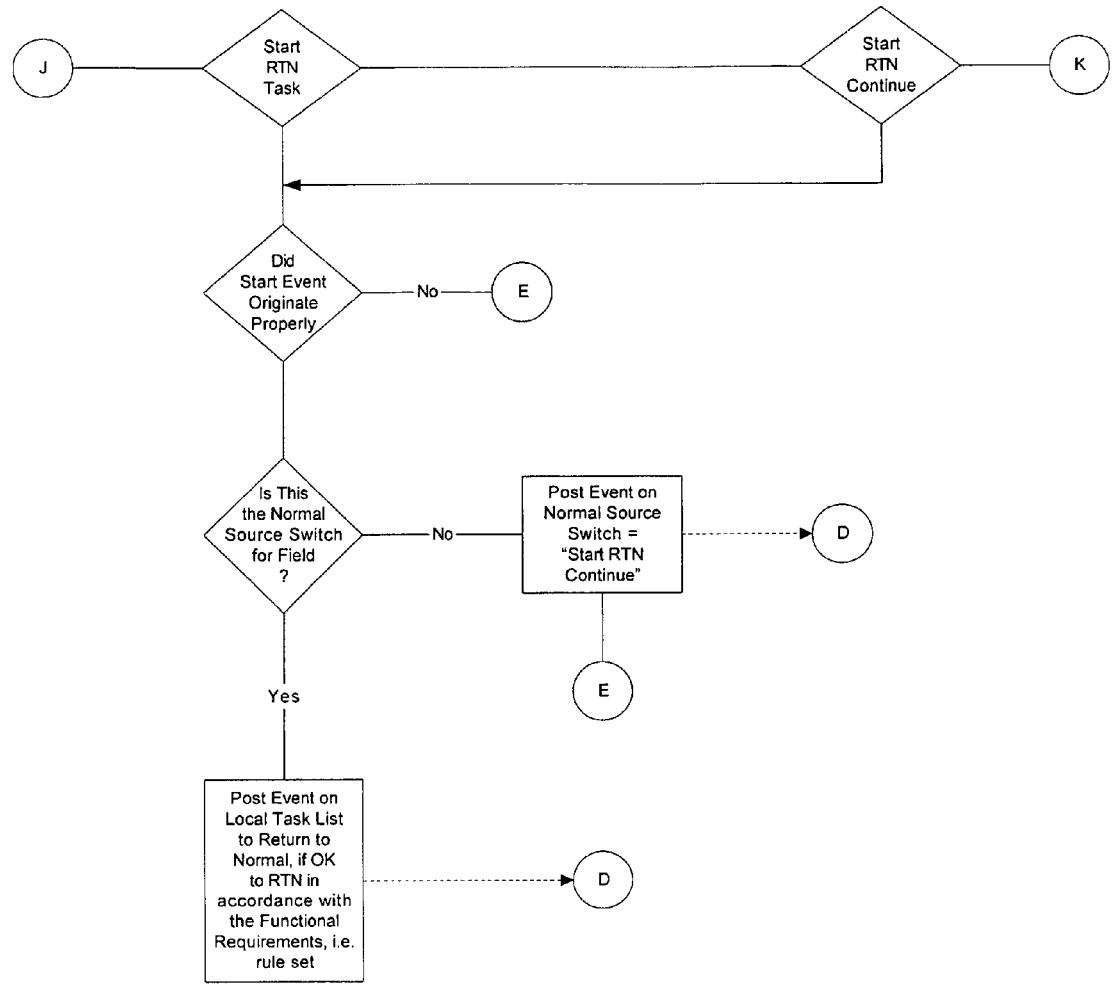
Figure 22G:
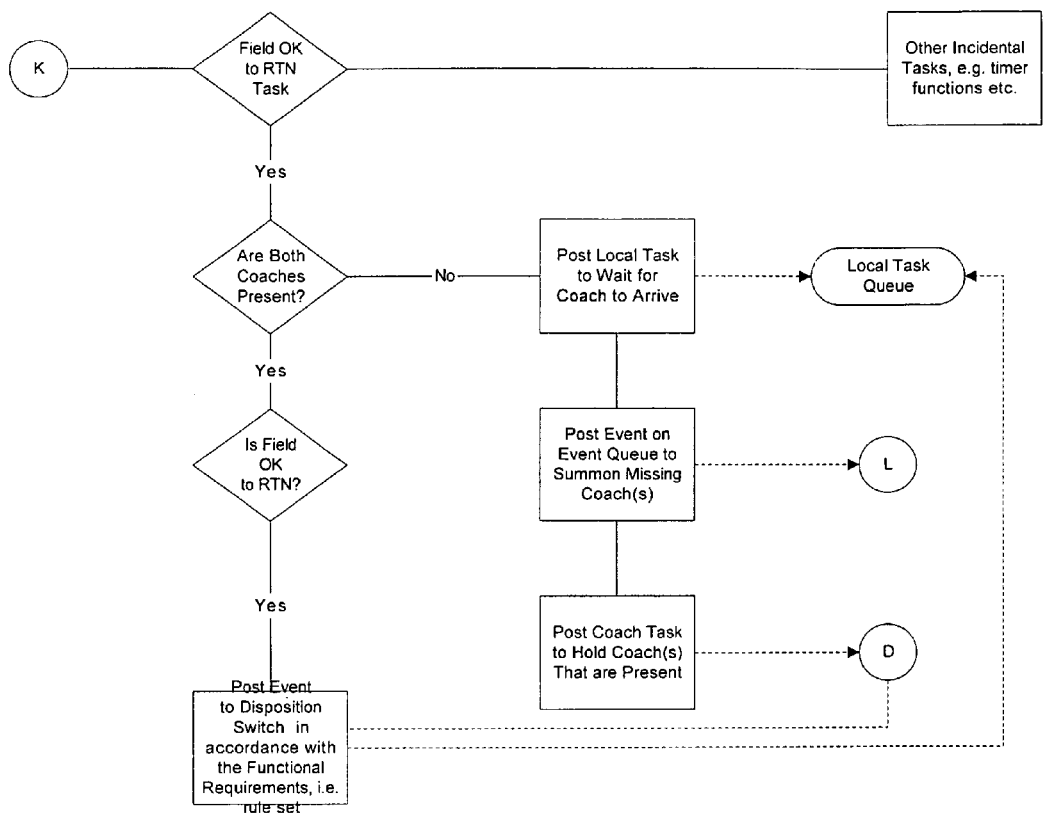
Figure 23:
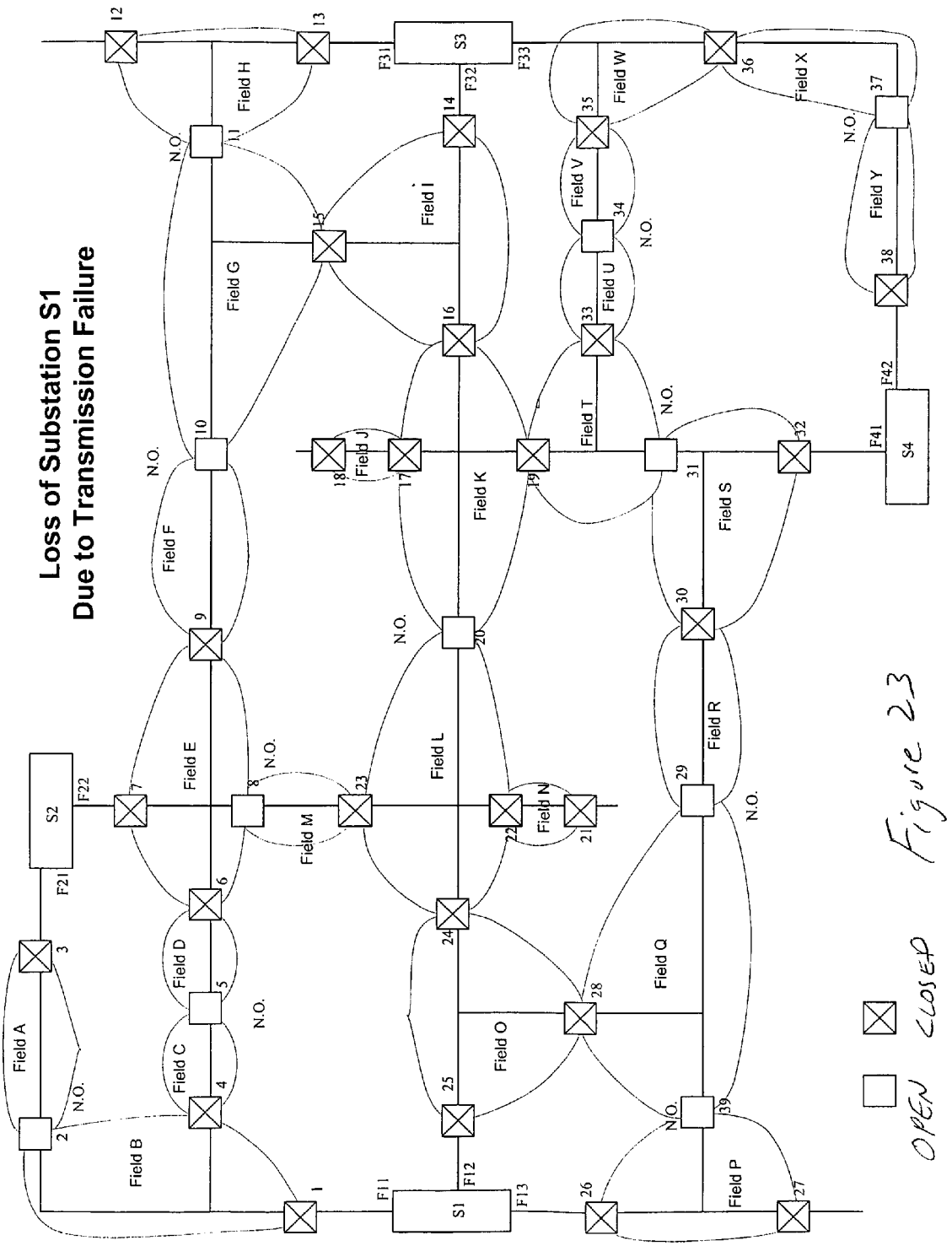

The CA functionality interacts in the Player (team member) functionality (logic flow) that evaluates the rules for transfer when attempting to close a switch to pick up load from an alternate source (e.g. after the logic has proceeded through FIG. 22*a* to FIG. 22*b*, at the YES output flow of the "Is Switch Open . . . " decision block). If the CA functionality is enabled, and all the rules for transfer have been satisfied, the Player task requests a Contract from the CA, suspending load pickup until it has been notified by the CA of Contract acceptance. Upon receipt of the requested Contract, the Player task then resumes and closes the switch (e.g. Player logic flow proceed in FIG. 22*b* through connector C to the "Post Event='OK to close'"process block). It should also be noted that as part of the Contract negotiation process, various errors (involving request rejection or timeout as will be explained in more detail hereinafter) may occur that prevent the Contract from being granted. In the preferred embodiment of the invention, the Player notifies the Coach of the failure status and the Coach is free to decide whether to retry the request or to take some other action.

To better understand the methodology of the resource allocation feature of the present invention as characterized by the Contract Agent, the following terminology/definitions are useful for illustrative purposes:

Contract Terminology:

Contract—A data structure that contains a record of the allocation (or request for allocation or maintenance) of limited available source capacity to distribution loads. The data structure contains a characterization of the resource whose allocation is to be controlled, plus related information necessary to build and maintain a record of that allocation. The data structure also contains a routing table that allows the Contract to be transmitted back and forth between the Contract Requestor and the Contract Grantor. Description of this data structure follows hereinafter.

Contract Requestor (CR)—A team member that has determined that a Contract is needed and then initiates the request to create the Contract.

Contract Grantor (CG)—The CA which resides at the closest Player in the closest Field to the resource (typically the source or alternate source which is presently feeding the circuit).

Contract Intermediary (CI)—A CA which is neither the CR or CG but which is in-between the CR and CG.

Contract Transaction (CT)—A message including a copy of a Contract that is in some state of processing (requested, waiting for acceptance, etc.). The purpose and processing of the transaction is implied from the contents of the Contract State field (see "8. Contract State" of Contract Data Elements hereinafter).

Contract Agent Functionality Overview

In a distributed processing environment, the CA is effective to:

- Traverse a distribution circuit from a point requiring the allocation of a critical resource (Contract Requestor or CR), in this case available capacity, to a uniquely defined point of supply (Contract Grantor or CG).
- Check for available capacity at all intermediate points along the way (Contract Intermediary or CI), tracing the route from CR to CG.
- Check for available capacity along the entire route from CR to CG and to only allocate the capacity once it has been determined that the capacity can be accommodated along the entire route.
- Reliably allocate, maintain and deallocate the resource.
- Determine at intermediate points along the route of an active Contract that the Contract is no longer needed and to propagate the need to dissolve the Contract in one or two directions simultaneously if necessary.
- Keep active contracts alive by having the CR periodically transmit a keep alive message to CI's and the CG with a minimum of message passing in an error-free communication environment.
- More reliably recover from lost messages by sharing the ultimate responsibility (to maintain Contracts) between all participating CA's through the use of parallel activity timers and recovery logic.
- To restore a lost contract rather than just remove it, allowing the restoration to be triggered at any participating CA.
- Reduce the possibility of redundant Contracts through adequate identification and the propagation of a creation time/date stamp throughout the Contract's area of travel.

Contract Data Elements

The data elements that form the contents of a Contract are:

1. Maintenance Timer. A countdown counter initialized to a predefined maintenance interval. The duration of the timer is based on the state of the contract and the action being performed. The timer is decremented by the CA independently for each active Contract and when it reaches zero, a Contract maintenance request message is initiated.
2. Requesting Agent ID. The identity (communication address) of the CA that originated the Contract request.
3. Granting Agent ID. The identity (communication address) of the CA that granted the Contract request. Either or both requestor and grantor agents may reside on Fields that are external to an intermediate CA and its associated Contract database. That is, there may be many Fields separating requesting and granting CA's, and a modified copy of the Contract will reside at each intermediate CA.
4. Requesting Field Number. The Field ID of the Field that originally caused the Contract request.
5. Temporary Field Number. A Field number which may frequently be the number of the Field the contract just passed through, aiding in the building of the contract route, but which may be used for other purposes in certain cases.
6. Contract Quantity. Number of resources (line segments) Contracted for.
7. Contract Capacity. Amount of capacity in units of 10 amps that are to be allocated or associated with the Contract.
8. Contract State. Present status of the Contract. The Contract State may indicate the Contract is new and still in the negotiating stage, it has been rejected by the granting CA, is an active and valid Contract, or is being dissolved. A complete list of these states is below:
   a. Contract Active. A Contract request has been granted, and is stored in this state at the CG, any CI's, and at the CR, until further action is necessary (i.e. maintenance, dissolve).
   b. Contract Request Pending. A Contract request has been issued and the requesting CA is now waiting for a response from the granting CA.
   c. Contract Request Unsent. A Contract request has been made by the Player, has been accepted by the CA and is now waiting to be sent toward the CG.
   d. Contract Request Travel. A Contract has been requested and the CA is now sending this request toward a potential CG.
   e. Contract Request Accepted. The grantor has accepted a Contract for the requested resource. The resource is now reserved for use. This status is passed to all CA's along the path traversed from the grantor to the requestor and the contract is then stored at each CA as Contract Active. When received by the CR this state is communicated to the Player, allowing the switch to be closed.
   f. Contract Request Declined. This status will appear in Contracts sent from any CA that determines that the Contract request must be rejected.
   g. Contract Request Declined. This status will appear in Contracts sent from any CA that determines that the Contract request must be rejected.
   h. Contract Request Decline Continue. This status is a placeholder that allows a CA that is (so far unsuccessfully) attempting to send a decline message to the requesting CA, to remember to resend the message later.
   i. Contract Dissolve Start. This status is present in a Contract at a CA that determines that the Contract should be eliminated.
   j. Contract Dissolve Continue. This status is present in Contracts passed along from the CR to the CG.
   k. Contract Maintenance Start. This status is present at a CA that is the originator of an active Contract whose maintenance timer has timed out, or has been tickled, thus triggering the start of a maintenance sequence.
   l. Contract Maintenance Tickle. If an intermediate CA for an active Contract determines that maintenance needs to be performed, it can request (tickle) the CA that originally requested the Contract to begin a maintenance sequence.

m. Contract Maintenance Travel. This status is present in a Contract that is being sent from its originating source to other Contract Agents (containing copies of the Contract) for the purpose of satisfying the Contract's maintenance timer.

n. Contract Maintenance Travel Not Found. A CR has sent a Contract Maintenance Request to a CI or CG which has no record of the Contract and this information is being returned to the CR.

o. Contract Maintenance Travel Return Not Found. This status is present in a Contract which is being sent from a CA which, in response to a Contract Maintenance Travel message, has been unable to find the Contract. Upon receipt of the message by the Contract Requestor CA, the request for a Contract will be reissued.

p. Contract Maintenance Tickle Not Found. This status is present in a Contract sent back to the originator of a Tickle when another CA receiving the Tickle is also missing the associated Contract.

q. Contract Maintenance Tickle Return Not Found. This status is present in a Contract sent back to the originator of a Tickle request when the Contract at the destination CA was not found. This will cause the Contract in the intermediate CA to be dissolved.

r. Contract Maintenance Reactivate. This status is found in Contracts sent from a CA which has received a message indicating that an existing, accepted Contract is no longer present. The status will cause all receiving CA's to reactivate the Contract, and pass along the reactivate request to the previous CG. The reactivate request will cause a reallocation of the resources to meet the Contract requirements.

s. Contract Maintenance Reactivate Continue. This status will appear as a placeholder in a Contract that cannot be reactivated because the CA is busy, and will cause the Reactivate to be retried later. This status is also used when the Contract is at a Contract Agent that did not lose the Contract, thus it must not reactivate the Contract, but will only continue to forward the Contract toward the CG.

9. Contract Timestamp The timestamp may be used for both Contract identification, and for Contract timing purposes. (In a preferred embodiment, a 4-byte timestamp in UNIX format corresponding to the time the original Contract was requested).

10. Contract Route Count. The number of Contract Agents that had to be traversed to reach the granting agent from the originator. The identity (communication address) of each CA along this route that must be traversed to reach from the requestor CA to the grantor CA is stored in the Contract Routing Table (see hereinafter).

11. Contract Route Direction. In each copy of the Contract, this is the direction within the Contract Routing Table (see below) that must be traversed to move the Contract along its route to completion. Initially the Contract is moved Up from the requester towards the grantor, and when granted, the Contract is moved Down toward the requestor.

12. Contract Routing Table. A list of CA identities (communication addresses) that must be traversed to go from the requestor CA to the grantor CA.

13. Contract Route Field Numbers. A list of field numbers associated with each Contract Agent listed in the Contract Routing Table.

Additional Notes on the Contract Data Elements

In an illustrative example of the preferred embodiment, the CA ID's above are simply the communication address of the team member at which the CA resides. Since the team member may take part in two or more Fields, and there is only a single CA at each team member, the Field number must be included to further qualify the identification of the CA.

The time that the Contract was originally requested at the CR serves two purposes. It is used to uniquely identify the Contract (along with CA IDs and Field number). Unique identification of the Contract is used during maintenance of the Contract to be sure the Contract still exists in the locations where it is supposed to exist. In a modification to the present implementation the Contract time may also be used to determine the maintenance interval and mortality of the Contract.

The routing table included in the Contract is a simple list of the switch control RTU addresses that, when combined, will form the path between the CR and the CG. This creates a simple, connect-the-dots form of routing. Initially the only routing data that is known is the starting team member and the present source of each Field. The Contract's route during the first pass to the ultimate present source Field is along the path of present source team members. The communication address of each present source team member on each Field through which the Contract passes is appended to the Contract routing table. When the Contract arrives at the ultimate source Field (CG) it will contain all the information necessary to route both directions, regardless of the present state of the system.

In an illustrative implementation of the preferred embodiment, the routing table has finite resources, and cannot store an unlimited amount of routing information. If during the course of routing back to the present source a CA finds that the routing table has overflowed, the CA must reject the Contract and route it back to the origin. The coach on the requesting Field will ultimately be notified through the Player and must then look for another alternate source.

Similarly, the number of Contracts that can be stored is also limited. If there is no room to store a new Contract in any CA, that CA must decline the Contract and return a "decline" CT back to its origin. Of course, it should be realized that sufficient space is provided for all relevant possibilities.

The Field associated with each Contract route is saved in the Contract record as a required value in the data transmit process, and allows the CA to update the line segment count in the Coach record.

Contract Processing Overview

The CA's primary goal is to manage its local database of Contracts. This management includes the job of accepting a Player's request for a new Contract, obtaining control over the Contracted resource by communicating through CI's to a potential CG, maintaining the integrity of Contracts once issued, and dissolving Contracts once they are no longer needed. The CA's resources for doing this consists of a Contract database containing Contract records, a CT which allows the CA to convey Contract information to other CA's, and the Field database.

When a Contract is needed the Player makes a request to the CA to obtain the Contract. The CA creates a CT including a copy of a "draft" version of the Contract with all available information filled in, and sends it toward the present source, normally all the way to the present source Field. As with all other CT's, the Contract State field is used to influence the processing of the Contract as it arrives at the recipient CA.

It should be noted that in a modification to the present illustrative implementation, the Contract may stop at an intermediate CA if the next source side Field does not have a valid Line Segment Limit. In this way the CT process may be more efficient, allowing a CI to become a CG. Otherwise, CT's must pass through a CI in every Field on the way to the present source. CA's at each Field direct and forward the CT, indicating the Contract's present processing state, from the CR to the CG and then back to the CR. It should be noted that the independence of the Coach process and the Contract process simplifies, or eliminates the issues related to restoring Contract status for Coaches recovering from synchronization failures.

The CR has the primary responsibility to maintain, and possibly dissolve, accepted Contracts. Normally the CR is notified by the Coach through the Player when a Contract is no longer required. The CR may then dissolve the Contract by deleting its local copy and issuing a CT containing a "dissolve" status to the CIs and CG, traversing the Contract route.

In general, the CR, with the assistance of the CG and all CI's, maintain the integrity of existing Contracts. This is accomplished by monitoring a Contract's activity timer, Contract Timer, and periodically informing all other CA's of the Contract's presence. To reduce the number of communication transactions necessary to do this, the Timeout of the Contract in the CR is set to be shorter than the timeout in CI's or the CG. Thus the CR can notify the CI's and CG of the continued need for the Contract and prevent them from having to make unnecessary inquiries. However, if for some reason the CR fails to make the notification, the other CA's can initiate sequences of communication transactions to either validate the Contract or delete it from their databases.

The CR starts the normal Maintenance Timer by sending a CT (Contract Maintenance Travel) toward the granting CA. The effect of the receipt of this transaction at intermediate CA's is to restart the Contract's local timer, and to forward the Contract Maintenance Travel CT toward the Contract Grantor. At the Contract Grantor, the Contract's local timer is restarted and the maintenance sequence is complete.

In the event that a Contract Maintenance Travel CT is not received by CI's and/or the CG holding local copies of the Contract, the timers will eventually expire. If this happens, the CA will send a CT toward the CR to induce the CR to start its Maintenance sequence. Various error conditions may occur during this sequence and these are addressed in the logical flow diagrams FIGS. 56-59 and referenced messages and messaging sequences as will be discussed in more detail hereinafter.

Although the CR has the responsibility to maintain accepted Contracts, the CG and CI's assist in this process by monitoring their maintenance timers. If a CG or CI's maintenance timer expires, the CA "Tickles" the CR through the CI's (if present), thus attempting to initiate a timer maintenance sequence by the CR.

There are other ways that CI's and the CG assist in the determination of the continued validity of a Contract. An example of this would be if a CI, in the process of forwarding the Maintenance Request, determined that the source for the circuit had changed. This would most likely occur if a normally-open switch along the alternate circuit path had reopened. That CI would then set the Contract status to "Contract Dissolve Start", thus indicating that the Contract is no longer valid and should be dissolved. CT's would then be generated to dissolve the Contract.

In another example, an intermediate CA may be able to determine that the line segment limit has already been met, possibly due to segments that have been added on another branch of the circuit. In this case the intermediate CA can reject the Contract and send it back to the CR.

Upon acceptance of a Contract, all Contract Agents will inform Coaches associated with Fields along the Contract route of the increase, or decrease, of required circuit resources. The CA is able to do this based on the visibility a CA is given into the Fields. To insure the Coaches receive this information in the most timely manner, the CA will issue an Event message into the Field. The Event message is delivered to every member of the Team, allowing the Coach to receive the data at its present location, i.e. any player/team member in the team.

Contract Agent Methodology—Logical Flow Illustrations

In accordance with important aspects of the present invention and referring now to FIGS. 56-59, described therein are illustrative flow diagram that may be employed and representative of typical operations performed by the present invention at each player, e.g. a single team member. It will be apparent to those skilled in the art that the implementation of a CA also includes many routine tasks and functions as generally discussed hereinafter. For example, any CA activity resulting in the need to send a CT over communications might require a built-in delay or retransmission time to allow a busy communication channel to become available. At any time a database or routing table is updated it is possible that the available size of the database or routing table could be exceeded. As is typical in such illustrations, in the flow diagrams of FIGS. 56-59 logical flow is generally from top to bottom (unless otherwise indicated) and where no exit is shown from a processing box, this means that the immediate processing of the incoming message by the CA has been completed. Also note that a number of the logical branches in the flow diagrams are annotated with designated Contract States. This means that the branch is conditional on a match between that indicated State(s) and the State found in the CT's Contract State field or the State field of the Contract database entry, whichever respective State is being processed. That is, for the flowchart showing the processing of incoming CT's, the State is the state of the incoming CT, rather than the state of a Contract in the Contract database.

Figure 56:
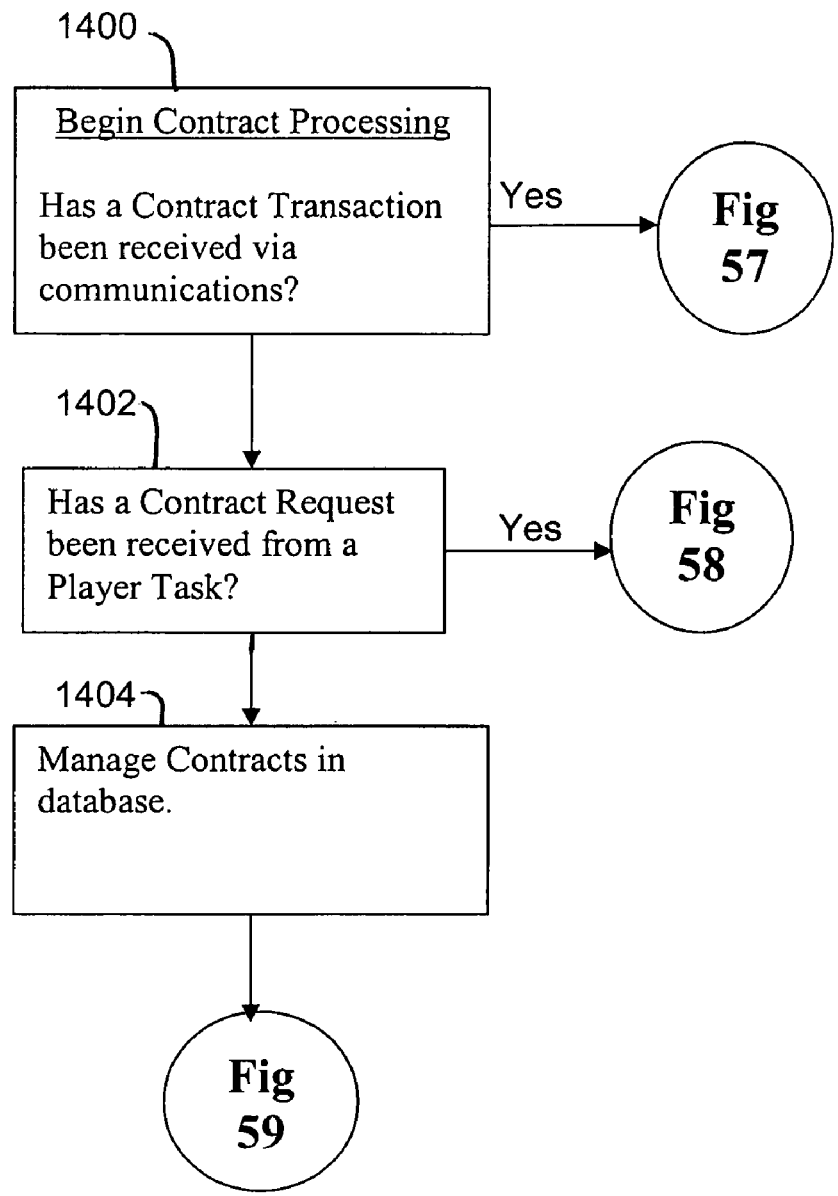
FIGS. 56-59f are illustrative logical flow diagrams that may be employed and representative of typical operations performed at a single team member in accordance with source allocation methodology.

Referring now specifically to FIG. 56, the CA enters its processing loop in processing box 1400 to look for more processing to be performed. Specifically, the CA periodically begins a processing cycle by first processing any incoming CT's received via communications (Yes flow path to FIG. 57), and then requests for new Contracts from Player tasks in processing block 1402 against a local copy of the Contract database (Yes flow path to FIG. 58), and finally in processing block 1404, Contract database entries via flow path to FIG. 59 (based on the contents of the State and Timer data elements). The results of the three types of processing include updating the local Contract database, reporting to Player and Coach tasks, and passing CT's along to other CA's when necessary to secure, maintain, release or reject the Contract, as will be explained in more detail hereinafter.

Figure 57:
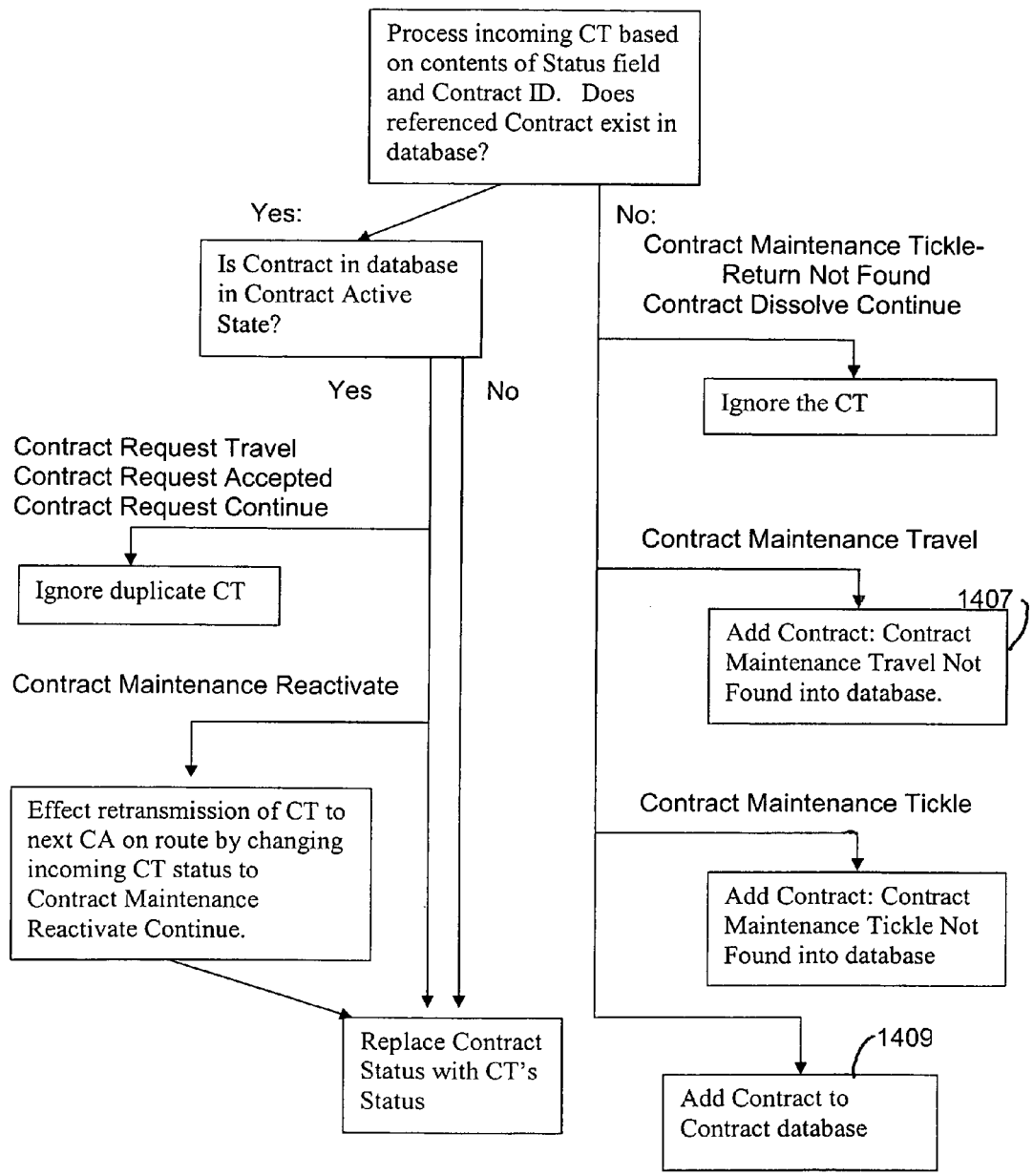

Considering now the detailed logical flow regarding the processing of incoming CT's received over communications and with specific reference to FIG. 57, illustrated therein is the processing applied to a single incoming CT, the individual processing blocks being explanatory of these processing steps. The CA processing repeats for each incoming CT. In some cases this may result in modifications to the local Contract database, and particularly to the Contract State field. The CA then may later take additional action on the request based on the revised Contract State. This technique is applied throughout the various Contract processing flowcharts to control Contract processing.

Figure 58:
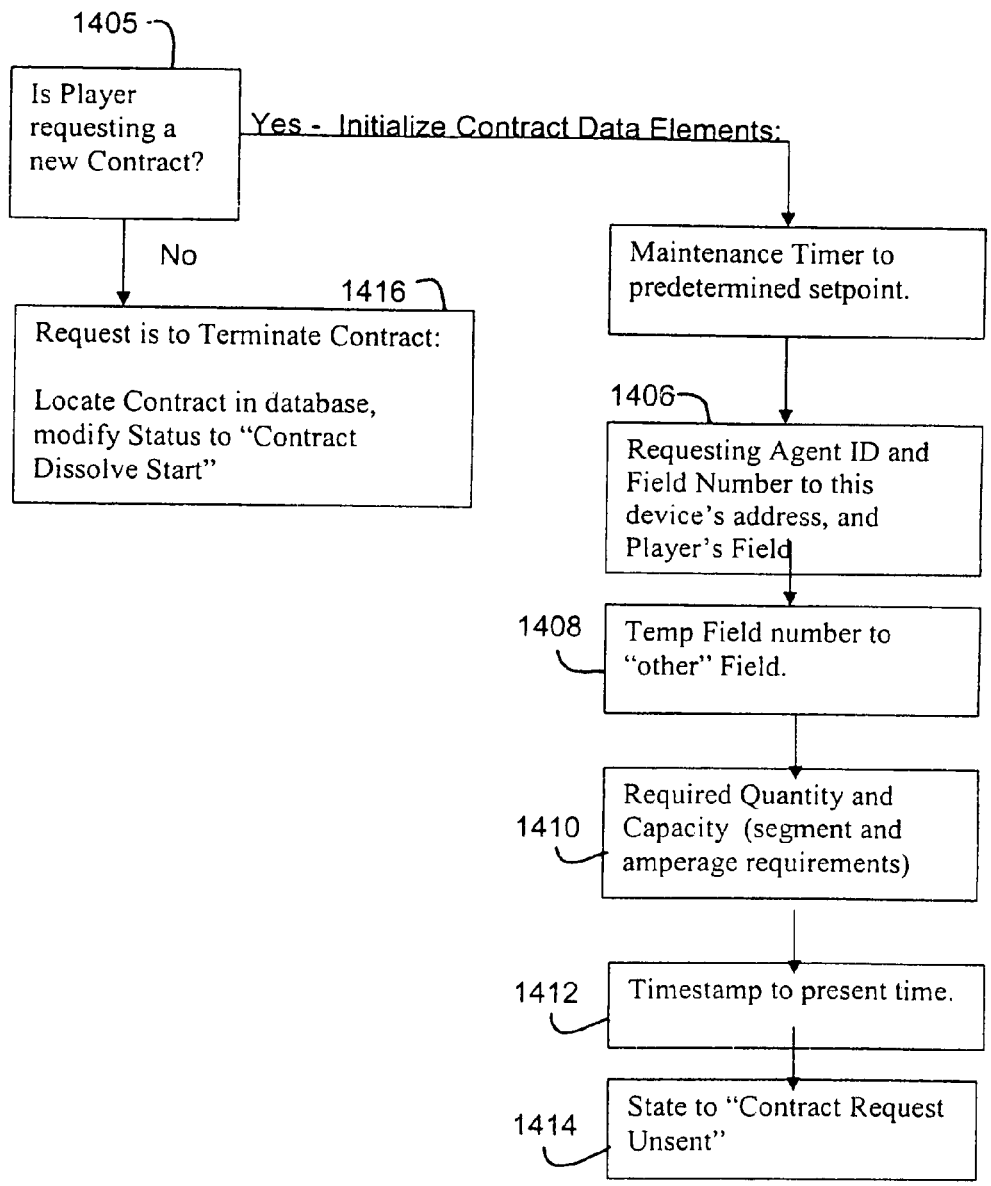

FIG. 58 shows the processing applied to incoming Contract processing requests for a new Contract originating from the local Player task. If the request is to create a new Contract, the Contract data structure is zeroed, initialized with the illustrated data elements and then inserted into the database. Specifically, in processing block 1406, the Field number of the Player requesting the additional capacity via Contract is entered in the database. In processing block 1408, the Temp Field data element is filled in with the source Field where the capacity is being sought. This will be one of the adjacent Fields if one exists. A non-zero (or valid) value in this entry provides additional information to facilitate the ability of the CA to determine where to send the CT. It should also be noted that the Contract Allocation Mechanism is not selecting from one of several alternate sources, but rather is attempting to allocate a limited resource (distribution capacity) from an energized source specified by the Player when the Contract request was issued. As the CT requesting the capacity moves toward a potential granting source, each CA will modify the Temp Field to direct the request toward the present energized source of the circuit. A zero or invalid entry indicates that the CT has reached the nearest Player and nearest Field to the circuit's source. In processing block 1410, the Required Quantity and Capacity data elements include the Segment count if capacity restrictions based on segment count (Required Quantity) is being requested, and/or capacity restrictions based on load amperage (Capacity). If both are specified, the segment count takes priority later when the CA tries to grant capacity to the requester. The Timestamp function in processing block 1412 adds a degree of uniqueness to the Contract because it is set only once, here at the CR and never modified. If for any reason, a duplicate copy of the Contract appears in the database, the timestamp can be used to verify the problem. By setting the Contract State to "Contract Request Unsent" in processing block 1414, the CR will (at a later point in processing) see this Contract in the database and send a Contract Request towards the CG.

If the Player is not requesting a new Contract, flow proceeds via the "No" path of the processing block 1405 to the processing block 1416 to process a request to terminate an existing Contract. The Contract is located in the database based on its Contract ID and Field, and its status is modified to be "Contract Dissolve Start". The CA will, later send the request to dissolve the Contract towards the CG when it services the database (explained in more detail hereinafter).

Considering now the processing of Contract database entries at each CA and with reference to FIG. 59, the processing is based on the contents of the Contract State field with the exception of the Timer management functions. The values of the State field that trigger the specified actions are shown as labels on the arrows leading to the processing blocks. Referring now to FIG. 59a, as discussed, a major activity of the CA is to monitor and take action based on the "Contract State" (or State) field of entries in the Contract database. For existing active contracts (Contract State=Contract Active), this involves starting a Contract Maintenance sequence on a predetermined interval, in processing block 1418. Each CA is monitoring its database's Contract Timers, counting them down, and at this present step in the processing, the CA is looking for an expired timer. Modifying the State to Contract Maintenance Start will subsequently cause the CA to start a maintenance sequence. The "Contract Request Pending" state flow path to processing block 1420 indicates that a request to initiate a Contract is outstanding. No further action is taken unless the Contract's local timer expires, in which case the request is dropped. Since this state only appears in the CR, the player is informed that the request has timed out without being completed. The "Contract Request Unsent" state flow path to processing block 1422 only occurs at the CR and initiates a sequence as shown to travel to a potential CG if not there now, flow path proceeding via "No" determination path to the process block 1424 (FIG. 59a). If there is no travel required, flow proceeds via the "Yes" determination path to the processing block 1426 since this is a potential CG and either the request is granted or denied based on the availability of resources.

Figure 59A:
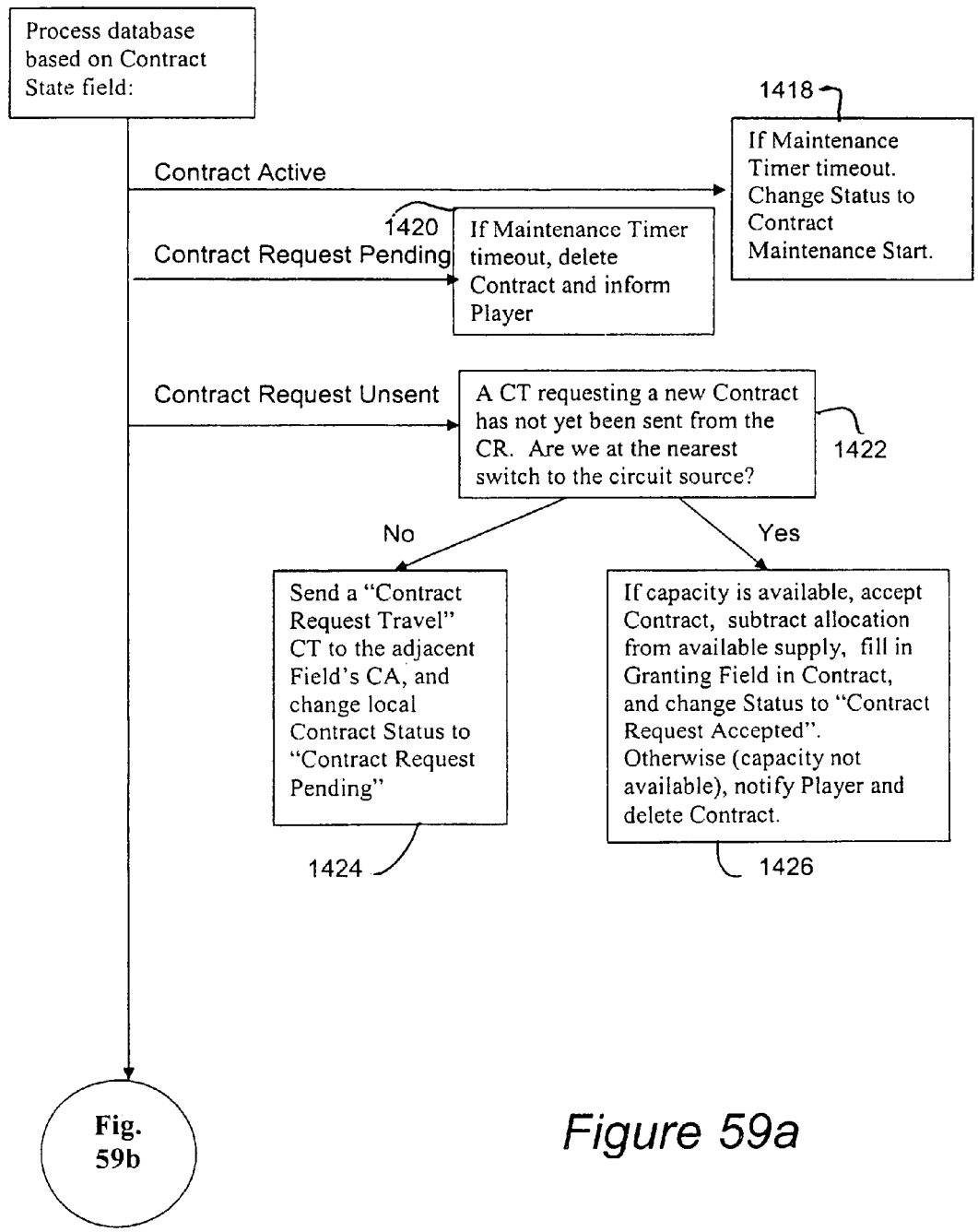
Figure 59B:
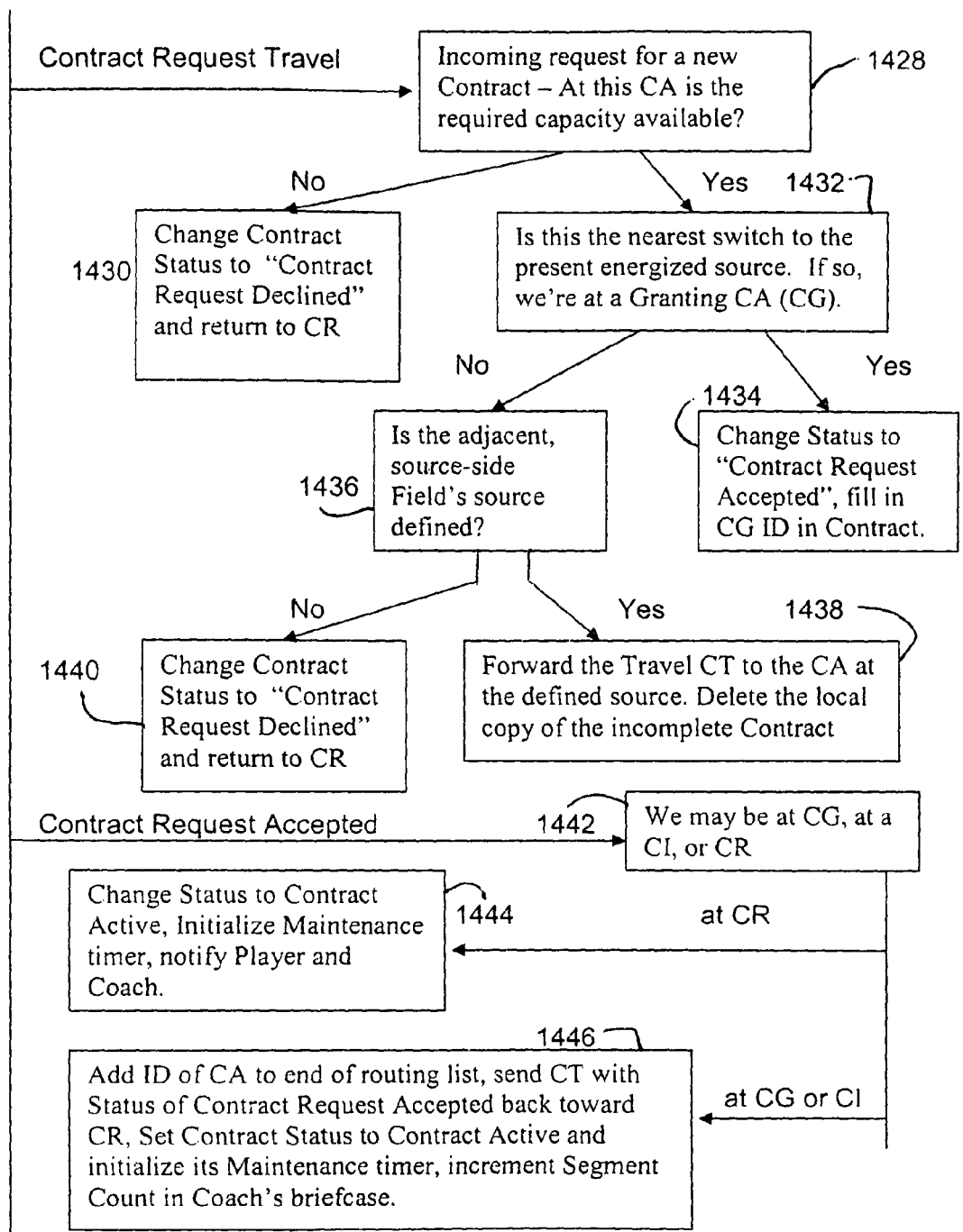

Referring now to FIG. 59b, a "Contract Request Travel" database entry indicates that a request is enroute from a CR toward a potential CG, processing block 1428. At each CA along the route, local capacity must exist to accommodate the additional load (processing block 1428, FIG. 59b). If it does not, the determination in the processing block 1428 is No and the flow proceeds to the processing block 1430 where the request is rejected by altering its state as shown and returned to the CR. If capacity exists at the CA and it is a source switch nearest the circuit's ultimate source, flow proceeds via the Yes determination of the processing block 1428 to the processing block 1432 where it is accepted and therefore designated to be the CG, flow proceeding via the Yes determination of the processing block 1432 to the processing block 1434. Otherwise, flow proceeds via the No determination path of the processing block 1432 to the processing block 1436, where the determination is made "Is the adjacent source-side Field's source defined." If Yes, flow will proceed to processing block 1438 to travel toward the potential CG. If No, flow proceeds to the processing block 1440 to decline the request because it has nowhere else to go, again being returned to the CR. The "Contract Request Accepted" State is encountered as a notification of a granted Contract being returned to the CR. This flow for this state proceeds to processing block 1442. At each step along the path to the CR, this means that the State should now be "Active", and that it is now time to account for the granted resource by informing the Coach. If we're at the CR, flow proceeds to a processing block 1444 and we do not need to send the message any further but we do need to inform the Player. If we are at the CG or a CI, the flow proceeds to a processing block 1446 where the path to the CR continues with appropriate updating and incrementing.

Figure 59C:
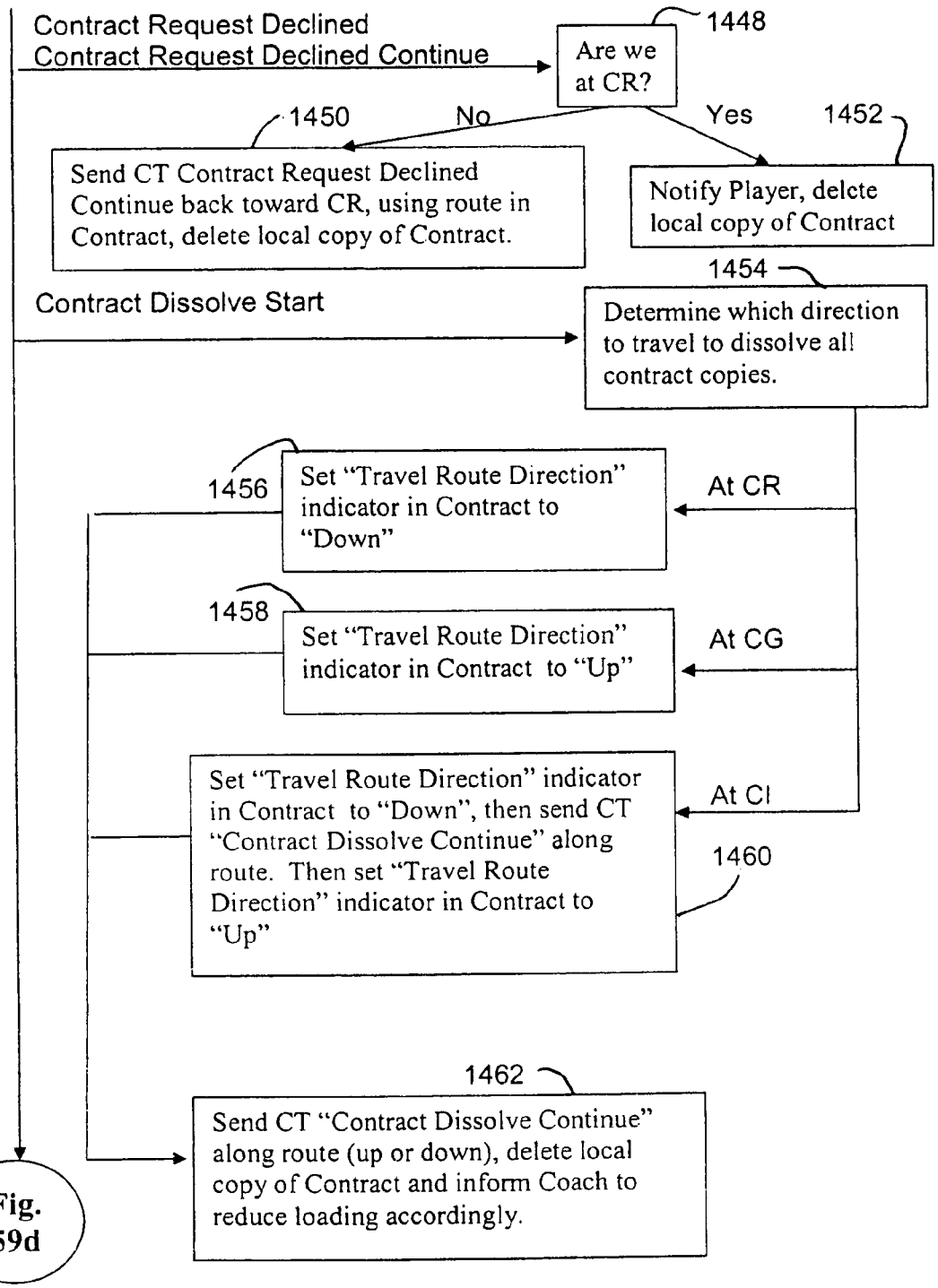

Considering the "Contract Request Declined" and "Declined Continue" states that proceed to a processing block 1448 of FIG. 59c, theses a states are encountered if the Contract is not accepted. If we're not at the CR, flow proceeds via the No determination path of the processing block 1448 to a processing block 1450 where the Declined Continue CT is sent toward the CR and the local copy of the Contract is deleted. If we've arrived at the Player, flow proceeds via the Yes determination path of the processing block 1448 to a processing block 1452 where the Player is notified and the Contract is deleted.

The "Contract Dissolve Start" state proceeds to a processing block 1454 and is initiated when a previously existing Contract is no longer needed. This can be determined and is therefore initiated by a Player at any point along the Contract route of an existing Active Contract. In particular, if it is determined that a line segment is no longer being fed from an alternate source, the Contract is unnecessary. This causes a unique determination in the processing block 1454 to convey the need to dissolve the contract in one of two different directions or both directions via the processing blocks 1456, 1458 or 1460 dependent upon whether the determination in the processing block 1454 is CR, CG, or CI respectively. Once the messages have been sent, the local copy of the Contract is deleted and the resources de-allocated via the processing block 1462.

Figure 59D:
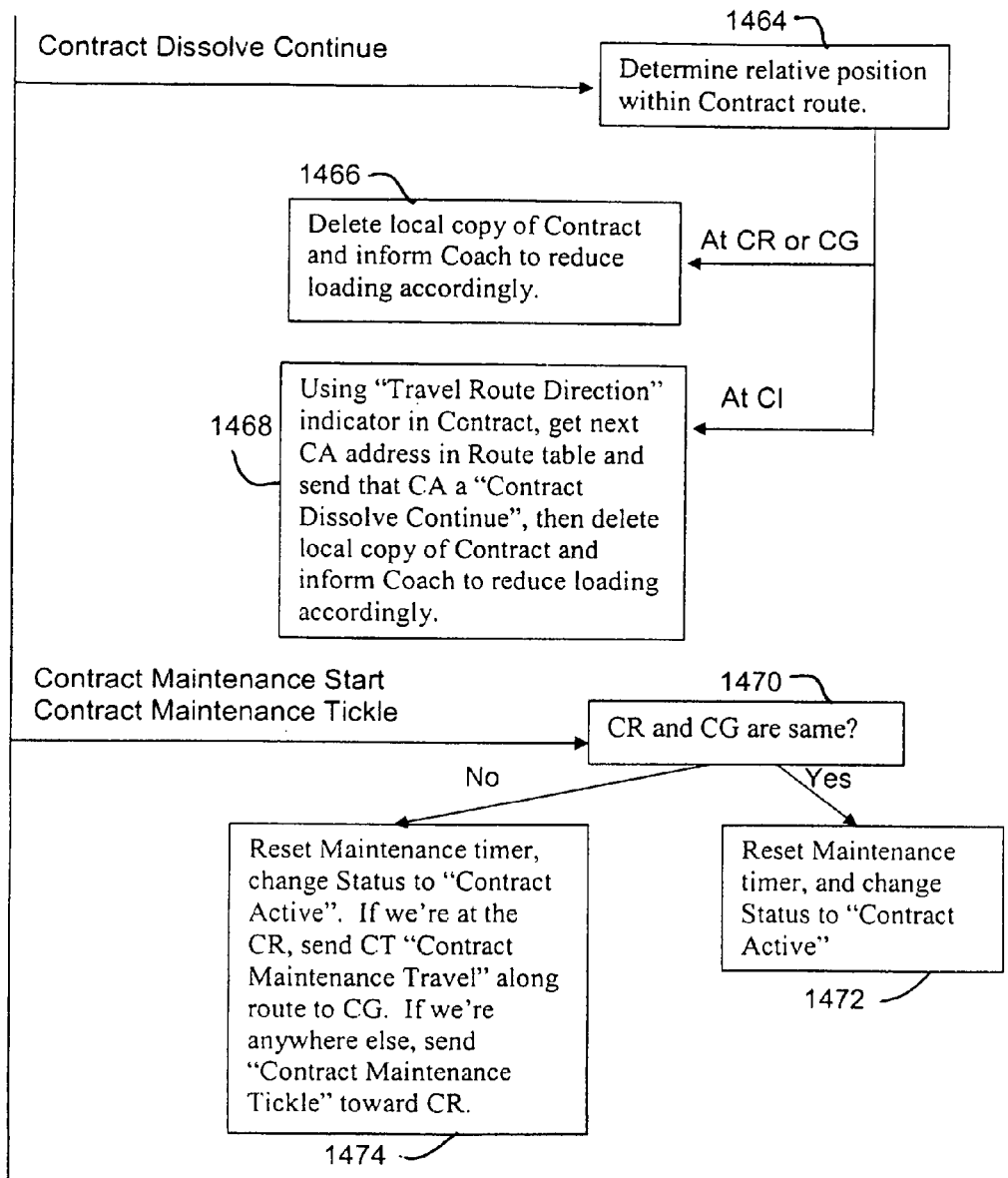

As shown in FIG. 59d, the "Contract Dissolve Continue" state, encountered via receipt of a CT requesting that a Contract be dissolved, proceeds to a processing block 1464 If the relative position along the route as determined in the processing block 1464 is at the CR or CG, terminal points of the route, flow proceeds to a processing block 1466 to terminate the communication sequence, deleting the local Contract copy and requesting the Coach to reduce its contracted reservation of capacity. If the relative position is at a CI, flow proceeds to a processing block 1468 causing it to forward the CT along the present route (up or down) in addition to doing the other steps performed at the CG and CR. The "Contract Maintenance Start" and "Contract Maintenance Tickle Start" States convey the need for the CR to initiate a Maintenance Sequence via the flow path to a processing block 1470. If the CR and CG are determined to be the same in the processing block 1470, flow proceeds to a processing block 1472 where the Timer is reset and the Contract State is set to Contract Active. If not, flow proceeds to a processing block 1474. If these States are encountered at the CR, the Contract State is set to Contract Active, the Timer is reset and a Contract Maintenance Travel CT is sent toward the CG. If these states encountered at the CG or a CI, the Contract State is set to Contract Active, the Timer is reset and a Contract Maintenance Tickle CT is sent toward the CR to start a Maintenance sequence.

Figure 59E:
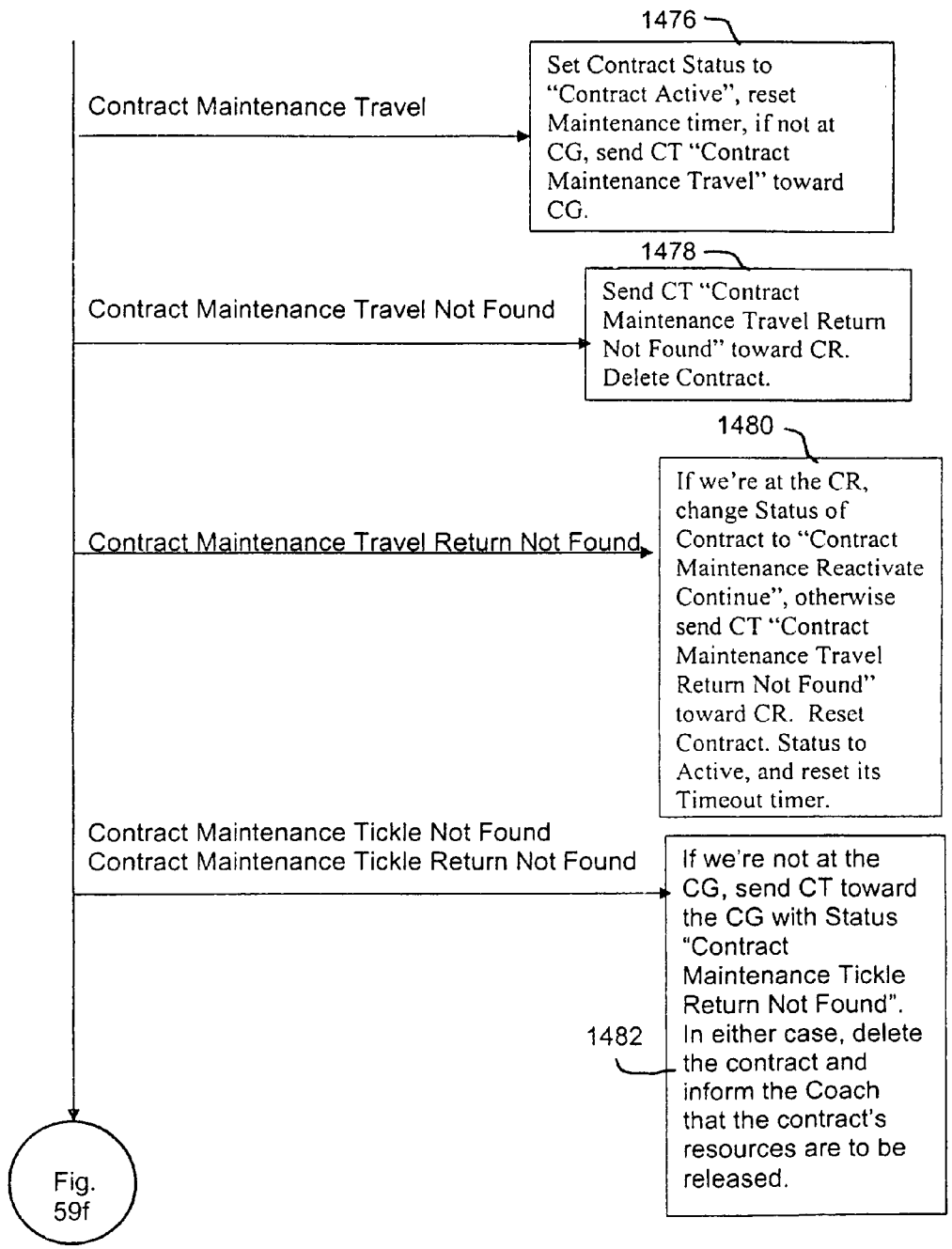

Considering now FIG. 59*e*, a "Contract Maintenance Travel" state is entered when a CT was received with that State, and flow proceeds to a processing block 1476 where the Contract's maintenance Timer is reset, its State is reset to Contract Active. If not at the CG, the CT is retransmitted toward the CG. If, as this CT is received at a CI or the CG, the Contract is not in the database (shown in FIG. 57, block 1407), a "Contract Maintenance Travel Not Found" state will be substituted with flow proceeding to a processing block 1478. This causes a "Contract Maintenance Travel Return Not Found" CT to be sent back toward the CR, and the local copy of the Contract to be deleted. A "Contract Maintenance Travel Return Not Found" state will be encountered in the database with flow proceeding to a processing block 1480 as the "lost Contract" indication is being sent toward the CR. If the database entry is encountered at a CA other than the CR, the Contract is set Active and its timer is reset. If the entry is encountered at the CR, the State is changed to "Contract Maintenance Reactivate Continue" discussed further in connection with FIG. 59*f*.

If when attempting to "tickle" the CR into starting a maintenance cycle, the CA determines that the Contract is lost in either the CR or a CI along the path to the CR, the CA will have inserted a Contract into the database with a State of "Contract Maintenance Tickle Not Found", flow proceeding to a processing block 1482. This is then deleted and a CT with State "Contract Maintenance Tickle Return Not Found" is sent toward the CG. Both of these database entries cause the local copy of the Contract to be deleted, and at all CAs other than the one where the Contract was discovered missing, the Coach is instructed to release the contracted resource.

Figure 59F:
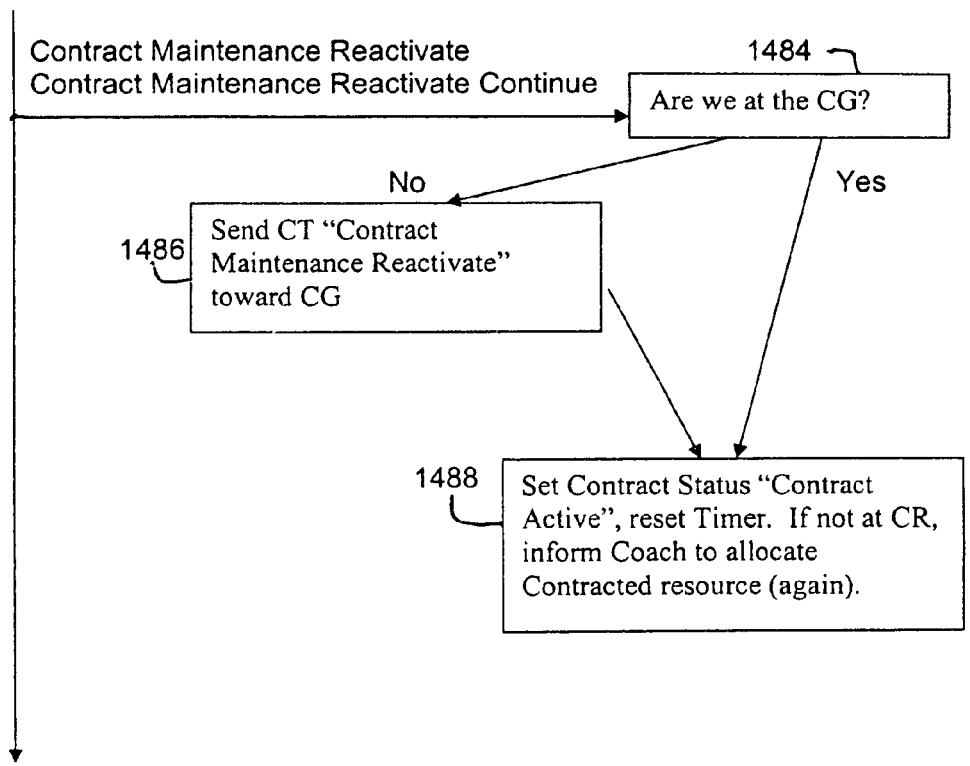

With reference now to FIG. 59*f*, initial processing of the "Contract Maintenance Reactivate" and "Contract Maintenance Reactivate Continue" database entries proceeds to a processing block 1484. If we're not at the CG, flow proceeds to a processing block 1486 where a CT with State Contract Maintenance Reactivate must be sent toward the CG. If we are at the CG or after the processing block 1486, flow proceeds to a processing block 1488 where the Contract becomes reactivated by setting its state to Contract Active and resetting its timer. If the reactivation is being performed at any CA other than the CR, the Coach must be informed to allocate (reallocate) the Contracted resource.

Illustrative Example to Secure a Capacity Allocation

The following illustrative example shows how the CA methodology is used to more-reliably allocate distribution system capacity in a complex power distribution system. FIGS. 29 through 39 illustrate one example of how the logic operated in to reconfigure a complex distribution system, e.g. based on a simple "contract" feature to limit each circuit segment to one segment of additional load from an adjacent segment. The CA methodology is not so restricted or limited and instead seeks out and finds the ultimate source of supply across multiple segments, by being able to allocate and deallocate more than one segment of additional load from that supply, and by being able to account for the allocation along the entire route from load to source. This example is useful to illustrate the CA methodology in the decision making process associated with FIG. 29, i.e. closing Switch 20 in Field L, a normally-open switch. Although the Coach in Field K can determine if the Field locally has the capacity to pick up Field L, it has no way to know if the substation S3 has the necessary capacity, i.e. it is assumed and the Coach in Field L selects its Team member or Player to close Switch 20 because it believes this is the best alternate source for the circuit. However, neither the Coach in Field L, nor the Coach in Field K, have any way of knowing whether or not the preferred source has the necessary capacity all the way back to the circuit's source in substation S3 which is several segments distant. With CA methodology, the necessary capacity at all points along the way to the alternate source will be verified and allocated. By doing so, the CA methodology prevents any potential circuit overload that may be caused by the possibility that other switches in the distribution system might concurrently close to restore service to their own areas of the circuit. The CA methodology also overcomes the necessity of the customer to know in advance that each alternate source can be relied on without regard to the real-time configuration of the distribution system. As discussed, the CA methodology is operative in the flow of the Player at FIG. 22*b* (at the Yes output of the processing block "Is Switch Open?" etc.) corresponding to the Switch 20 being open (It's a Source/Tie or Load/Tie switch or other switch which is energized and could serve as an alternate source to the circuit), and of course, is presently configured to be part of the system. At this point in the logic, the Coach in Field L has selected Switch as the best source for the Field and so directs the Player to attempt to restore power to the Field. The Player in Field L at Switch 20 would now like to close the switch. At the point in the logic noted above, the Player requests the CA to determine if the anticipated capacity can be allocated, and to either return that the capacity exists and has been secured, or to return that the capacity cannot be secured for some reason. If the capacity is contracted, the Player will close the switch. If it is not, the Player will inform the Coach which may then attempt to locate and contract for the capacity with another alternate source.

Referring now to FIG. 56, processing block 1402, the CA at the requesting Player in Switch 20, which is therefore a CR, determines that a new Contract is needed. The logic now moves to FIG. 58, processing block 1405 and in processing blocks 1406-1414 (excluding block 1407) fills in some details forming what will be the equivalent of a new Contract "application". By setting the Contract State to "unsent" (processing block 1414), the contract, which will be placed in the Contract database, will later be recognized as an "application" which needs to be processed (forwarded towards a potential CG).

The destination address of the CA in the adjacent Field along the route to the CG is obtainable from the configuration data base (FIG. 13, Present Source Team Member). In the present implementation, since there is only one route through energized switches from Switch 20 to the ultimate source, S3, the direction of travel of the CT is readily apparent. However it is not readily apparent that the capacity is available at Field I or S3. In addition, Switch 10 in Field G could be simultaneously attempting to pick up load due to an outage affecting Field F. It is a feature of the CA methodology to facilitate this determination in a complex, dynamically varying distribution system.

Referring once again to FIG. 22, processing block 1404 and the continued flow of FIG. 59, the unsent Contract will now be processed by the CR. At processing block 1422, the Contract will be recognized as unsent, and the CR will determine if the request can be fully satisfied locally or needs to be communicated to a CA at another location. It should be noted here that a feature of the CA methodology is that it provides a generic capability to determine if the necessary capacity exists in a complex distribution network. By handling local requests as well as those requiring communication and coordination with other devices, the CA methodology serves to simplify the overall resource allocation process. At processing block 1426 in FIG. 59a, the CR may allocate the resource and grant the Contract. Doing so will require the CA to notify the Coach because the Coach "owns" the amount of available load capacity for the line segment. At processing block 1424, the Contract "application" must be forwarded to another CA in an adjacent field, the CR changes the Contract State field to "Contract Request Pending", and also copies the Contract "application" to an "outbox", changing its State to "Contract Request Travel". By leaving a copy of the Contract at the CR, with an activity Timer running, the CR will be able to monitor the as yet unfilled Contract and handle lost Contract "applications". It should be noted that a requirement of the implementation is to be able to handle a wide variety of typical failure modes due to lost communication messages or processing bottlenecks in such a way as to avoid overloading the circuit, misallocating resources or losing track of resources such that the system is unable to reallocate or redirect the resources at a future time.

Considering the next stage of processing, the "Contract Request Travel" message will arrive at the next CA along the path leading from the selected energized source toward the head of the circuit, in this case it is FIG. 29, Switch 16 in Field K. The logic flow in FIG. 57 at the processing block 1409 will add the copy of the Contract, presently in "Contract Request Travel" State, to the database, since the Contract is new. When the CA inspects the database it will find the Travel message and process it at processing block 1428 of FIG. 59b. Note that the logic at this point requires that there be adequate capacity at this point, and every subsequent CA along the route to the alternate source. If not, the Contract is denied. Also note that from this point on, the request will continue to be routed as a Contract Request Travel message through the system until the message can travel no further and has thus reached the ultimate source switch. In this example, that switch will be Switch 14 in Field I. When the message reaches that point, the logic at processing block 1434 of FIG. 59b will be executed to accept the Contract. This CA is now designated the CG for this Contract.

Along the route from the CR to the CG, the Contract's routing table has been built such that the return path to the CR is known and incorporated in the Contract. At the CG and in each CI along the route to the CR (processing blocks 1442, 1444 and 1446 of FIG. 59b), the Contract State is set to Contract Active and its maintenance timer is initialized. Also, as the message passes back to the CR, at each device (including the CG, the CIs and the CR), the Coach is informed that the Contracted amount of load is now committed to the Contract and is therefore subtracted from the Field's available capacity.

When the Contract Request Accepted message reaches the CR, in addition to the processing described above, the Player is notified of Contract acceptance and the Player will close the switch to restore the circuit segment. If for some reason the Contract could not be issued, the Contract is declined, the Player and Coach are notified and can either attempt to pick up the load from a different source, retry the request indefinitely or give up trying to restore service.

Overview of Contract Processing Steps

It should be clear from the example above that there are many eventualities that the CA's must handle as they route the CTs throughout the distribution system. Each situation must be processed in such a way as to minimize the possibility that a circuit is overloaded due to duplicate allocation of resources, the possibility that a field is not energized because a Contract could not be issued due to a lost CT, or the possibility that a Contract could not be issued because of a loss of control over the allocation. These various circumstances are minimized through the application of the processing and rules identified in the CA methodology flow illustrated in FIGS. 56-59.

The strategy for negotiating, maintaining and dissolving a Contract are summarized below:

1. The Coach on the requesting Field of the transfer event requests the Player to close an alternate source switch to energize the Field.
2. The Player summons the Coach of the granting Field for the purpose of coordination and verification of circuit resources.
3. If the Player finds that the transfer restrictions have not yet been met, and that a Contract is required, the Player issues a request to the local CA. While the CA attempts to obtain a Contract, both the requesting Coach and the granting Coach must remain at the location of the CR, except for an occasional visit to an adjacent team member to satisfy the visit timer. The Player is also essentially in a holding pattern while the Contract is being obtained.
4. The CR assembles the necessary information into a Contract record (CA ID, Field number, time, etc.) and sends the record to the CA at the present source of the granting Field. This requesting CA then monitors for the return of the record along with its State. After a predefined period of time, if a response has not been received, the requesting agent will assume the requested Contract has been lost (presumably due to communications failure), and will issue a Declined response back to the Player, ultimately causing the Coach to reevaluate the selection of the alternate source, and potentially starting the entire process over again.
5. The CA receiving the new Contract request evaluates the contents of the Contract. Since it is a new request the CA verifies that the circuit resources are available from the perspective of this switch location. If resources are not available, possibly due to transfers that are occurring at the same time on a different branch, the CA flags the Contract as declined and returns it to the origin. If the Contract is allowed based on local data, the CA adds its ID to the routing list, and forwards the Contract to the present source team member of the next Field toward the absolute source.
6. Assuming that the next CA to receive the new Contract request is at the source/sub switch this is the point where the Contract will reside. If adequate circuit resources are not available, the CA flags the Contract as declined and returns it to the origin using the now complete routing table. If circuit resources are available the CA flags the Contract as being accepted, assigns itself as the granting CA ID, and sends the Contract back toward the origin, keeping of copy of the Contract locally. The count of circuit segments that have been transferred is also incremented (see note below).

7. Using the Contract routing table the Contract will return to the next CA going back up the list. This CA will again examine the contents of the Contract. If the Contract was declined it will simply continue forwarding the Contract toward the point of origin. If the Contract was accepted the CA will store a copy of the Contract in its local Contract database, and increment the local allocation for the amount of load that have been transferred. The allocation of resources then, stored within the Coach's data (e.g. like a briefcase), can be used to make immediate decisions regarding additional transfers that may be requested. The Contract will then again be forwarded toward its origin.

8. Assuming that the next CA to receive the Contract is at the point of origin, if the Contract was flagged as Declined the CA will report back to the Player that the transfer is not allowed. The Contract will then dissolve. If the Contract was flagged as accepted the CA will report back to the Player that the transfer may continue as normal, allowing the desired switch to close. The Contract is then stored locally, and the allocation of resources is incremented.

9. Once a Contract is stored in the CA's database it must be maintained. Maintenance of the Contract is normally only initiated by the CR, although a CI may "tickle" the requesting agent for maintenance if the Contract appears to be getting stale. A maintenance timer is associated with each Contract, with the CR having a shorter time interval than other CAs. When the timer expires the CR will send a copy of the Contract, marked as Maintenance Travel, toward the CG.

10. A CI receiving this maintenance request will look for the Contract in its database, and if found will update the local maintenance timer associated with that Contract, then forward the maintenance request (Maintenance Travel) toward the CG. If the Contract is not found in the local database, the CA will return the Contract back to the CR flagged as not found (Contract Maintenance Travel Return Not Found). Upon receiving the indication of Contract not found, the CR may reactivate the Contract by issuing the Contract again and propagating the reactivation toward the CG (Contract Maintenance Reactivate). Any CA still holding the original Contract will just forward the reactivation message. Any CA without the Contract will accept the Contract immediately and again increment its local resource allocation as necessary, then forward it again toward the CG.

11. If a CA other than the CR finds that a Contract maintenance timer has expired for an active Contract, that CA will send a "tickle" Contract message to the requesting agent. This function is intended to prevent a Contract from remaining in place for an extended period unnecessarily. The reception of the "tickle" Contract message at the CR signals the requesting agent to start a Contract maintenance cycle.

12. If a "tickle" Contract message routed to the CR is received by an agent with no matching Contract, a Contract Maintenance Tickle Return Not Found message is propagated back toward the CG. As the Contract travels it is removed at each location where it still exists, and the appropriate adjustments are made to the local resource allocation. If the Contract was actually still required by the CR, a subsequent maintenance process from the CR will result in a Contract reactivation process (Contract Maintenance Reactivate).

13. While in an alternative embodiment discussed hereinafter the CA may find a reason for the Contract to be dissolved, presently automatic operation by the Coach and Player may result in the Player immediately asking for the removal of the Contract. This would likely be the result of a Return-to-Normal operation being performed locally, but may also be a second contingency event that causes additional reconfiguration of the circuit. Again in this case, the CA flags the Contract to be dissolved and forwards it down the Contract route. The Contract is then removed by each CA, and all appropriate actions are taken to restore the resource restrictions for the next transfer event. Incrementing and decrementing the local allocation of resources is performed at this point in the flow. The allocation of resources then, stored within the Coach's data (e.g. like a briefcase), can be used to make immediate decisions regarding additional transfers that may be requested.

Considering such an alternative embodiment, a task is included for the requesting CA to watch for any reason to dissolve the Contract directly. For example, a manual switching operation that moves this circuit segment to another source would be grounds to dissolve the Contract. This may be a manual operation on the Field that was the origin of the Contract, or a manual operation at another Field seen locally only by the clearing of the alternate source flag. The Contract would then be dissolved in accordance with the foregoing discussion.

In accordance with another alternative embodiment, capacity is temporarily allocated as the CT traverses intermediate line segments that may be limiting segments. A timer is assigned to the temporary allocation such that if the Contract is not granted, the temporary allocation is assured of eventually being utilized or deleted. This would account for the remote possibility where two Contracts have been sent to a common CG upstream from a CI with the two Contracts requiring capacity at an intermediate line segment, which, in combination, exceeds its capacity.

While there has been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

The invention claimed is:

1. A system for automated reconfiguration of a distribution system, comprising:
   a plurality of switches, switches in the plurality of switches being located in the distribution system; and
   a plurality of switch controllers;
   switch controllers in the plurality of switch controllers controlling respective switches of the plurality of switches and including first resources which monitor the distribution system and respond to predetermined abnormalities; and
   second resources for providing a control/coordination function, said second resources being communicated between and exchanging information with said switch controllers to determine a negotiated plan between two or more teams for reconfiguration of the distribution system and controlling operation of said switch controllers to perform reconfiguration of the distribution system in accordance with the negotiated plan, the switch controllers being organized into two or more teams of team members with at least one of the team members in each of the two or more teams being identified with at least two of the two or more teams so as to be a common team member to each of the two or more teams, each of said two or more teams comprising separately identified second resources, each of said second resources comprising means for supervising the performing of actions at said switch controllers as identified by said second resources and causing said first resources to respond to detected conditions and said second resources based on the negotiated plan between the two or more teams.

2. The system of claim 1 wherein said negotiated plan comprises implementation rules which are acted upon by said second resources in response to the information from said switch controllers.

3. The system of claim 1 wherein said negotiated plan comprises task identifiers.

4. An electrical distribution system including first resources at nodes which monitor the distribution system and respond to predetermined abnormalities, means for communicating information between said nodes, and second resources for providing a control/coordination function, said second resources being communicated between said nodes and utilized at said first resources to respond to and act on the information communicated by said information communicating means to reconfigure the electrical distribution system in response to detected conditions based on a negotiated plan between two or more teams established by the second resources, the nodes being organized into two or more teams with at least one of the nodes in each of the two or more teams being identified with at least two of the two or more teams so as to be a common team node to each of the two or more teams, each of said two or more teams comprising separately identified second resources, the negotiated plan comprising task identifiers and implementation rules that represent and define responses to a combination of information received from the one or more common team nodes, said separately identified second resources of each of said two or more teams being utilized at said at least one of the nodes being identified with at least two of the two or more teams to provide said control/coordination function based on the negotiated plan between the two or more teams.

5. A method for responding to abnormalities in a commodity distribution system having two or more teams, each of the two or more teams including two or more team members functioning as commodity control devices, at least one of each of the two or more team members in each team being assigned to at least two of the two or more teams so as to be a common team member to each of the two or more teams, the method comprising establishing by the common team members a negotiated plan for reconfiguration of the commodity distribution system, communicating a separate control/coordination resource between team members of each team based on the negotiated plan between the two or more teams, and communicating information between and controlling the commodity control devices of the two or more teams via communication between individual team members and the information received by the one or more common team members from the teams of which it is a member, each of the separate control/coordination resources comprising means for controlling the team members in accordance with stored control/coordination information and the negotiated plan including information on how to respond to particular detected conditions, one or more team members of a first team responding to detected conditions based on information communicated from a second team, the communicated information representing the negotiated plan, task identifiers and the status of detected system conditions external to the first team.

* * * * *